US012145246B1

(12) United States Patent
Schmidt et al.

(10) Patent No.: US 12,145,246 B1
(45) Date of Patent: Nov. 19, 2024

(54) WORKPIECE PROCESSING SYSTEM

(71) Applicant: Kurt Manufacturing Company, Inc., Minneapolis, MN (US)

(72) Inventors: David L. Schmidt, Zimmerman, MN (US); Steven John Tschida, Harris, MN (US)

(73) Assignee: KURT MANUFACTURING COMPANY, INC., Minneapolis, MN (US)

( * ) Notice: Subject to any disclaimer, the term of this patent is extended or adjusted under 35 U.S.C. 154(b) by 552 days.

(21) Appl. No.: 16/847,503

(22) Filed: Apr. 13, 2020

Related U.S. Application Data

(60) Provisional application No. 62/893,629, filed on Aug. 29, 2019, provisional application No. 62/833,636, filed on Apr. 12, 2019.

(51) Int. Cl.
*B25B 5/02* (2006.01)

(52) U.S. Cl.
CPC .................................... *B25B 5/02* (2013.01)

(58) Field of Classification Search
CPC ........... B25B 1/02; B25B 1/04; B25B 1/2405; B25B 3/00; B25B 5/02; B25B 5/04; B25B 1/2452; B25B 5/08; B25B 5/163; B25J 15/0475; B23B 31/16233; B23B 31/16237; B23B 31/16245; B23B 31/16254; Y10T 279/1973; Y10T 279/1193; Y10T 279/1986
USPC ............................ 269/3, 6, 43, 45, 216, 246
See application file for complete search history.

(56) References Cited

U.S. PATENT DOCUMENTS

| | | | |
|---|---|---|---|
| 4,403,801 | A | 9/1983 | Huff et al. |
| 4,458,566 | A | 7/1984 | Tajima |
| 4,555,844 | A | 12/1985 | Palfery et al. |
| 4,599,759 | A | 7/1986 | Price et al. |
| 4,894,103 | A | 1/1990 | Bailey |
| 4,949,444 | A | 8/1990 | Kojima et al. |
| 5,149,072 | A | 9/1992 | Sartorio et al. |
| 5,186,593 | A | 2/1993 | Tsukada et al. |
| 5,256,128 | A | 10/1993 | Neumann |

(Continued)

FOREIGN PATENT DOCUMENTS

| | | | |
|---|---|---|---|
| DE | 102004029051 B3 * | 7/2005 | .......... B25B 1/2405 |
| DE | 102006003985 A1 | 7/2007 | |

(Continued)

OTHER PUBLICATIONS

DE102004029051—Machine Translation (Year: 2005).*

*Primary Examiner* — Tyrone V Hall, Jr.
*Assistant Examiner* — Alberto Saenz
(74) *Attorney, Agent, or Firm* — Steven M. Koehler; Westman, Champlin & Koehler, P.A.

(57) ABSTRACT

A gripping assembly for a robot includes a body and a pair of jaw supports supported for slidable movement on the body toward and away from each. Each jaw support has a pair of spaced apart apertures for receiving spaced apart securing posts of a jaw. Each jaw support includes a support body and a pair of locking slides. Each locking slide has a first end configured to engage a securing post when the securing post is disposed in a corresponding aperture. At least one actuator is configured to drive the locking slides away from each other to engage the securing posts. A jaw support actuator is configured to drive the jaw supports toward and away from each other.

20 Claims, 50 Drawing Sheets

(56) References Cited

U.S. PATENT DOCUMENTS

| | | | | |
|---|---|---|---|---|
| 5,309,368 | A | 5/1994 | Chern | |
| 5,330,205 | A * | 7/1994 | Norton | B23B 31/16245 279/124 |
| 6,293,750 | B1 | 9/2001 | Cohen et al. | |
| 6,357,994 | B1 | 3/2002 | St. Onge | |
| 6,371,717 | B1 | 4/2002 | Grams et al. | |
| 6,516,935 | B1 | 2/2003 | McLennan | |
| 6,557,235 | B1 | 5/2003 | Katz | |
| 8,215,624 | B2 | 7/2012 | Tomioka et al. | |
| 9,351,569 | B1 | 5/2016 | Lucey et al. | |
| 9,656,395 | B2 | 5/2017 | Youngwerth et al. | |
| 10,981,282 | B2 * | 4/2021 | Haruna | B25J 15/0028 |
| 2002/0117380 | A1 | 8/2002 | Downs et al. | |
| 2010/0243501 | A1 | 9/2010 | Monti | |
| 2010/0282037 | A1 | 11/2010 | Fujimoto et al. | |
| 2013/0154293 | A1 | 6/2013 | De Koning | |
| 2013/0245823 | A1 | 9/2013 | Kimura et al. | |

FOREIGN PATENT DOCUMENTS

| | | | | |
|---|---|---|---|---|
| FR | 2566635 | A1 | 1/1986 | |
| FR | 2586908 | A1 | 3/1987 | |
| JP | 2010076006 | A | 4/2010 | |
| WO | 2010035655 | A1 | 4/2010 | |
| WO | WO-2018235545 | A1 * | 12/2018 | B25J 15/0028 |

* cited by examiner

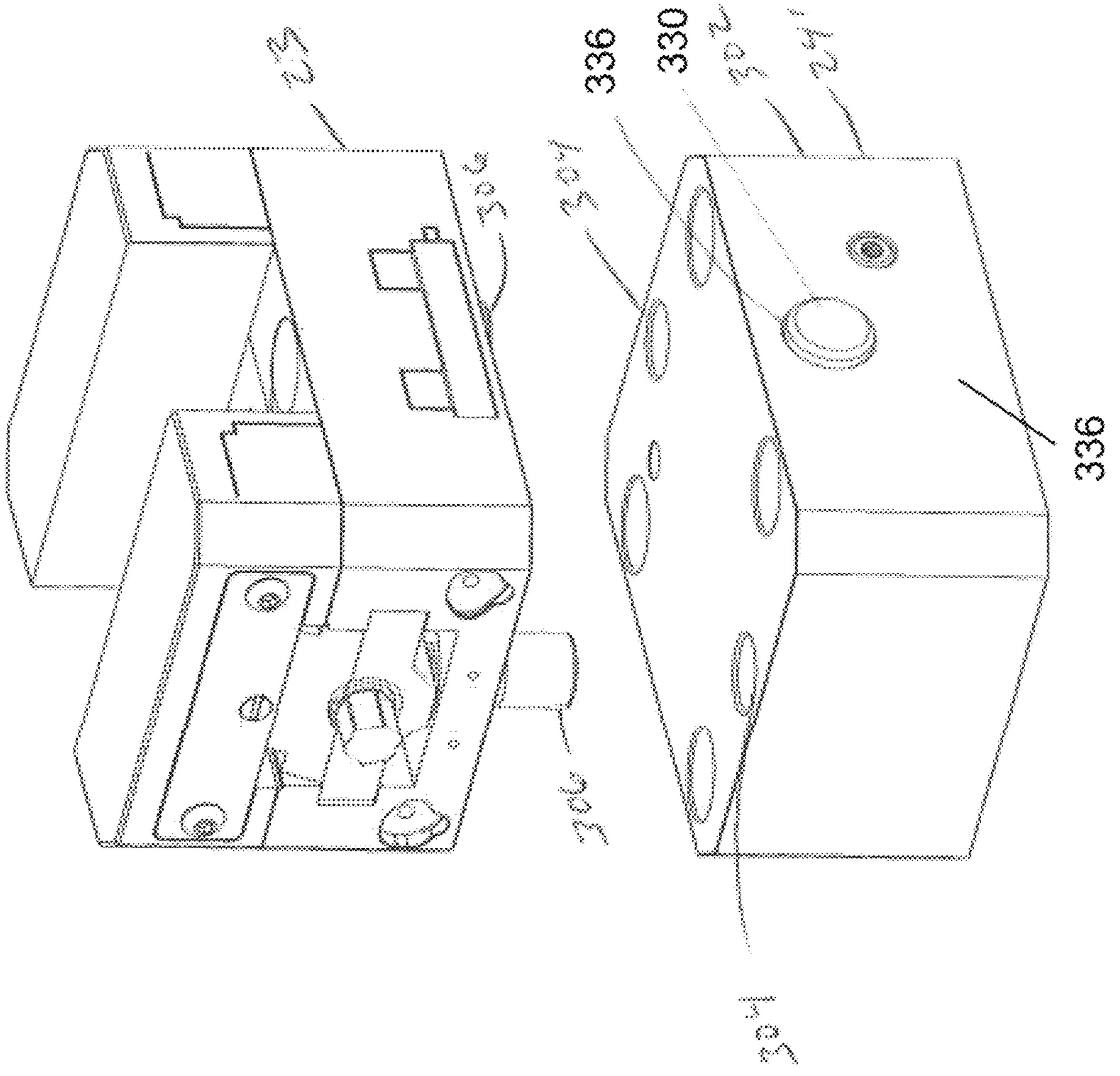
336
330
336

306
404
402
450
404
306

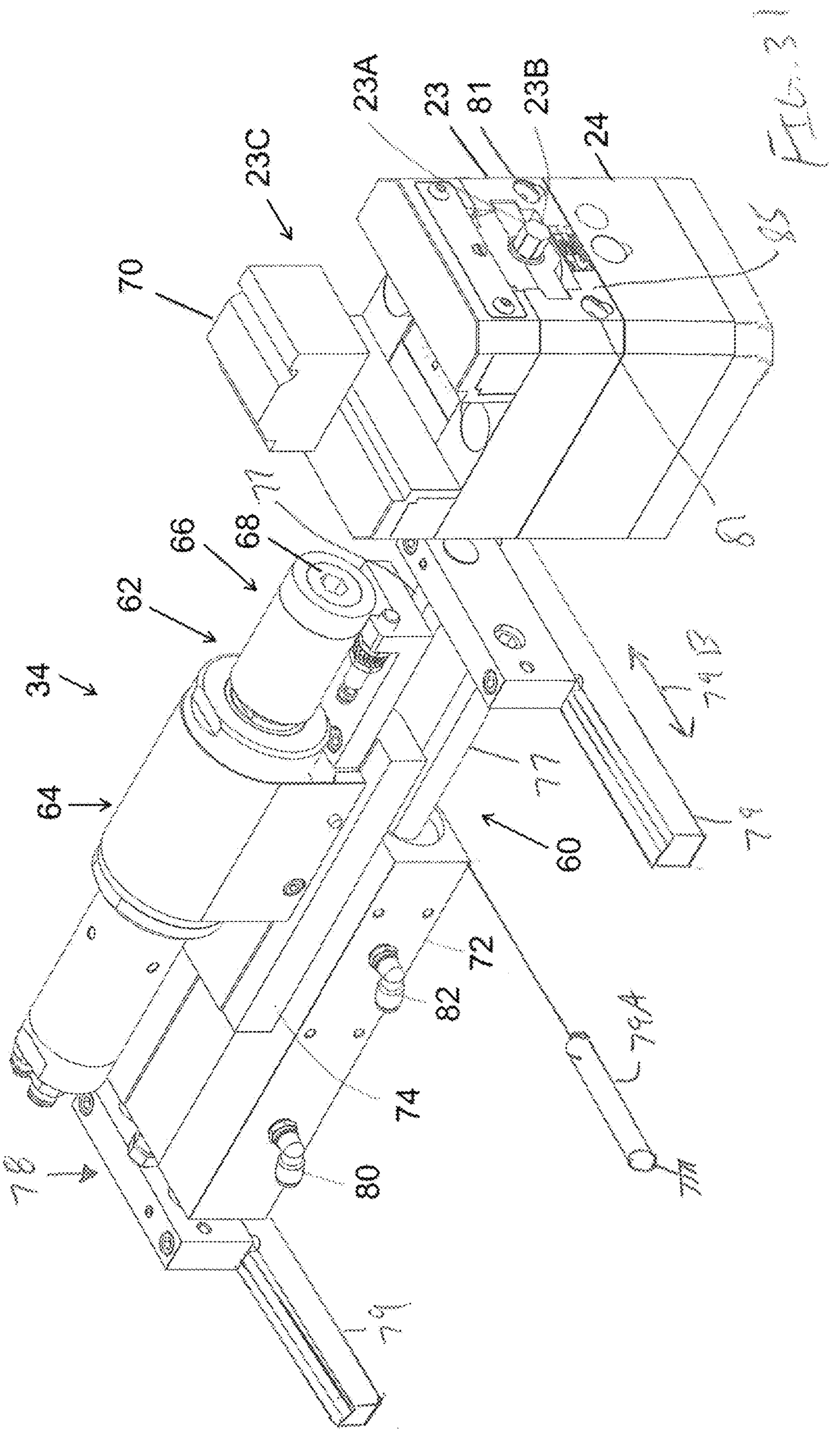
23A
23
81
23B
24
23C
70
66
68
62
34
64
60
72
82
74
80

WORKPIECE PROCESSING SYSTEM

CROSS-REFERENCE TO RELATED APPLICATIONS

The present application is based on and claims the benefit of U.S. provisional patent application Ser. No. 62/833,636, filed Apr. 12, 2019 and U.S. provisional patent application Ser. No. 62/893,629, filed Aug. 29, 2019, the content of which are hereby incorporated by reference in their entirety.

BACKGROUND

The discussion below is merely provided for general background information and is not intended to be used as an aid in determining the scope of the claimed subject matter.

Aspects of the present invention relate to workpiece processing systems. The use of robots to handle both unprocessed and processed workpieces is generally known. In such a system, the robot will pick up a workpiece to be processed and transfer the workpiece to a processing area whereat work or inspection of the workpiece is performed. Such work can include but is not limited to cutting, drilling, honing, grinding and painting to name just a few. Many times it is critical that the workpiece be placed accurately in the processing area so as to ensure required manufacturing tolerances are achieved. Improvements in workpiece handling are always desired so as to improve the quality and quantity of workpieces produced. In addition, a system. or one or more parts thereof, that enhances flexibility, allowing the workpiece processing system to easily switch and produce different workpieces and/or to produce different types of workpieces at the same time would also be of value.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

A workpiece processing system herein disclosed includes a broad number of different aspects. Without limitation some of the aspects are provided below.

A gripping assembly for a robot includes a body and a pair of jaw supports supported for slidable movement on the body toward and away from each. Each jaw support has a pair of spaced apart apertures for receiving spaced apart securing posts of a jaw. Each jaw support includes a support body and a pair of locking slides. Each locking slide has a first end configured to engage a securing post when the securing post is disposed in a corresponding aperture. At least one actuator is configured to drive the locking slides away from each other to engage the securing posts. A jaw support actuator is configured to drive the jaw supports toward and away from each other.

An apparatus includes a gripping assembly for selectively holding a fixture. The gripping assembly includes a pair of movable jaws configured to hold the fixture with a coupling formed between each jaw and the fixture. Each coupling includes a securing post mounted to one of the jaws or the fixture and an aperture provided in the other of the jaws or the fixture. Each securing post includes an enlarged head having inclined head surfaces and each aperture comprises internal inclined wall surfaces. The inclined head surfaces and the internal inclined wall surfaces are configured to urge the fixture and the jaws together with relative movement between the securing posts and the apertures.

A system for processing workpieces includes a staging area for handling at least one of unprocessed workpieces or processed workpieces. The staging area has at least one fixture support, a fixture, a robot having a gripping assembly, a first pair of jaws removably attached to the gripping assembly configured to hold and move a workpiece, and a second pair of jaws removably attached to the gripping assembly configured to hold and move the fixture.

A method for processing workpieces with a gripping assembly having replaceable jaws comprising a first pair of jaws configured to hold a workpiece and a second pair of jaws configured to hold a fixture support, the gripping assembly mounted to a robot, the method comprising: operating the robot to position the gripping assembly to engage the first pair of jaws; operating the gripping assembly to secure the first pair of jaws to the gripping assembly; positioning the first pair of jaws adjacent the workpiece with the robot; gripping the workpiece with the first pair of jaws; positioning the workpiece on a fixture with the robot; operating the gripping assembly to release the first pair of jaws from the gripping assembly; operating the gripping assembly to secure the second pair of jaws to the gripping assembly; and gripping the fixture with the second jaws to lift and move the fixture and workpiece.

A fixture support includes a body having spaced apart apertures configured to receive portions of a fixture, and pair of retaining members. Each retaining member is rotatably supported in the body. Each retaining member has a projection configured to engage one of the portions in a first position when the portion is disposed in an associated aperture. Each retaining member is rotatable to a second position wherein at least some of the portion is removed from the associated aperture.

A fixture support includes a body having spaced apart apertures configured to receive portions of a fixture, and a pair of locking slides. Each locking slide has a first end configured to engage a portion when the portion is disposed in a corresponding aperture. An actuator is configured to drive the jaw locking slides toward and away from each other.

An assembly includes a fixture having a pair of jaws on a body. At least one jaw is movable on the body. A fixture drive is configured to selectively displace the at least one jaw. The jaws are configured to selectively hold and release a workpiece by the fixture drive. The body has a pair of spaced apart securing posts. A fixture support includes a body with spaced apart apertures. Each aperture is configured to receive a securing post. A mechanism is disposed in the body to selectively engage and release the securing posts to hold and release the fixture from the fixture support. A drive is configured to selectively engage and operate the fixture drive of the fixture, the drive comprising an end movable toward and away from the fixture.

A work table for use in processing workpieces includes a frame. At least one drawer is slidable from a closed position to an open position on the frame. The drawer has a pin receiver. An actuator is mounted to the frame and having a movable pin configured to be moved into and out of the pin receiver of the drawer in at least one of the closed position and the open position.

BRIEF DESCRIPTION OF THE DRAWINGS

FIGS. 19 and 20 are perspective views of the fixture support with parts removed.

FIG. 21 is a perspective view of the fixture separated from the fixture support.

FIG. 31 is a perspective view of a drive to operate a fixture mounted to a fixture support.

FIG. 32 is a top plan view of the drive and the fixture.

DESCRIPTION

Figure 1:
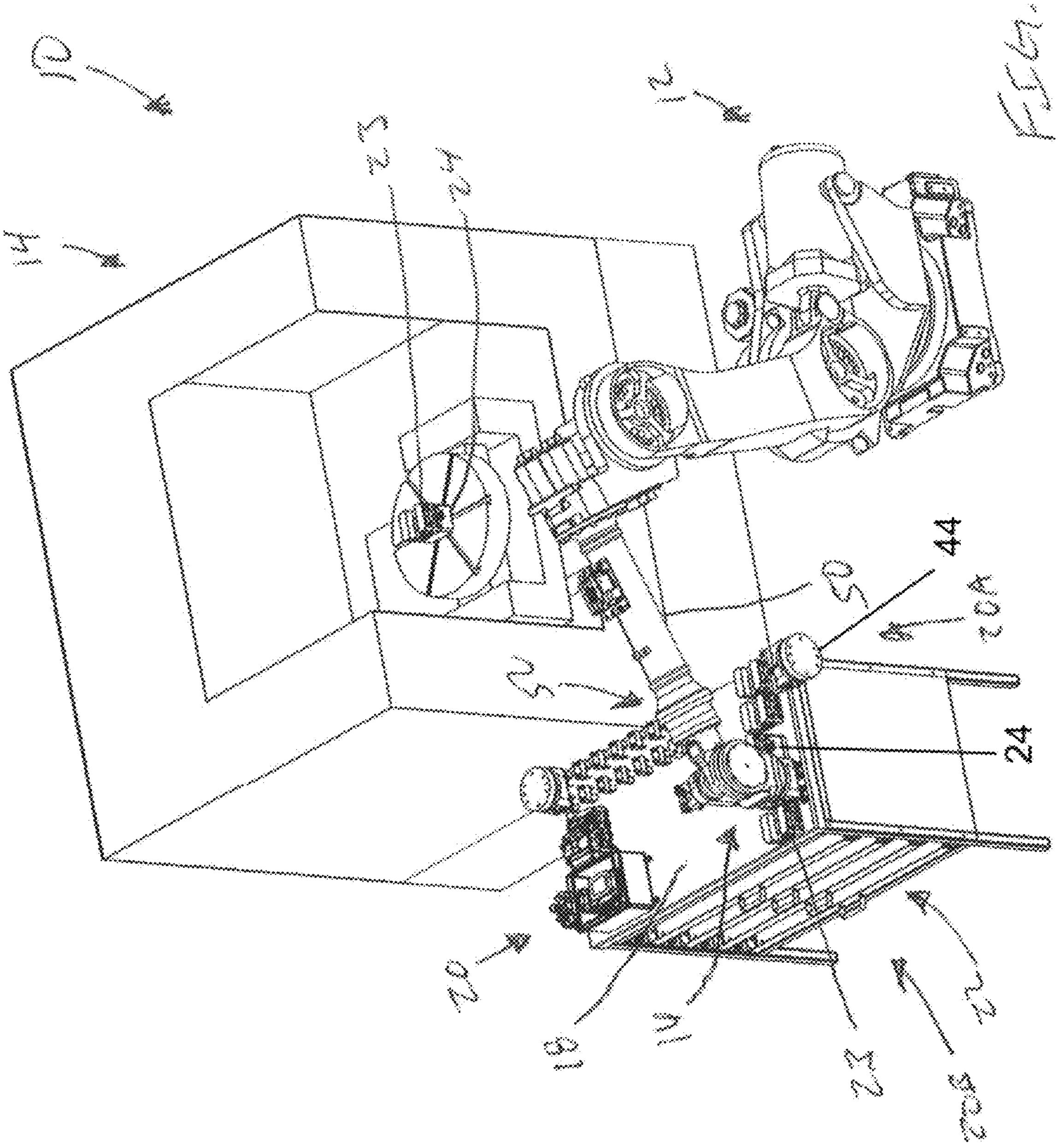
FIG. 1 is a perspective view of a workpiece processing system.

FIG. 1 illustrates a workpiece processing system 10 for processing workpieces without human intervention after configuring the system. The workpiece processing system 10 includes a robot 12 movable in multiple degrees of freedom so as to transfer workpieces to a processing area 14 from a staging area 16. In the embodiment illustrated, a single staging area 16 is used for both unprocessed workpieces as well as processed workpieces. If desired, additional staging areas can be utilized, for example, one staging area being for unprocessed workpieces while another staging area is used for receiving processed workpieces. The staging area 16 includes a workpiece handling surface 18 herein embodied as an elevated surface such as a table or bench 20. In a further embodiment, surface 18 can be embodied as a conveyor, cart, etc. If desired, the table 20 can include one or more drawers 22 which can open in one direction, or two directions as will be explained below.

Generally, the staging area 16 is used by the robot 12 to mount unprocessed workpieces on a fixture 23 such as but not limited to a vise. The fixture 23 is removably supported by a fixture support (commonly referred to as a pallet) 24. The robot 12 is configured to mount and dismount the fixture 23 to the fixture support 24, load and unload workpieces to be processed on the fixture 23 and remove processed workpieces from the fixture 23. If desired, the robot 12 can also move the drawers 22 as necessary to transfer, for example, unprocessed and processed workpieces to and from the drawers 22.

Figure 4:
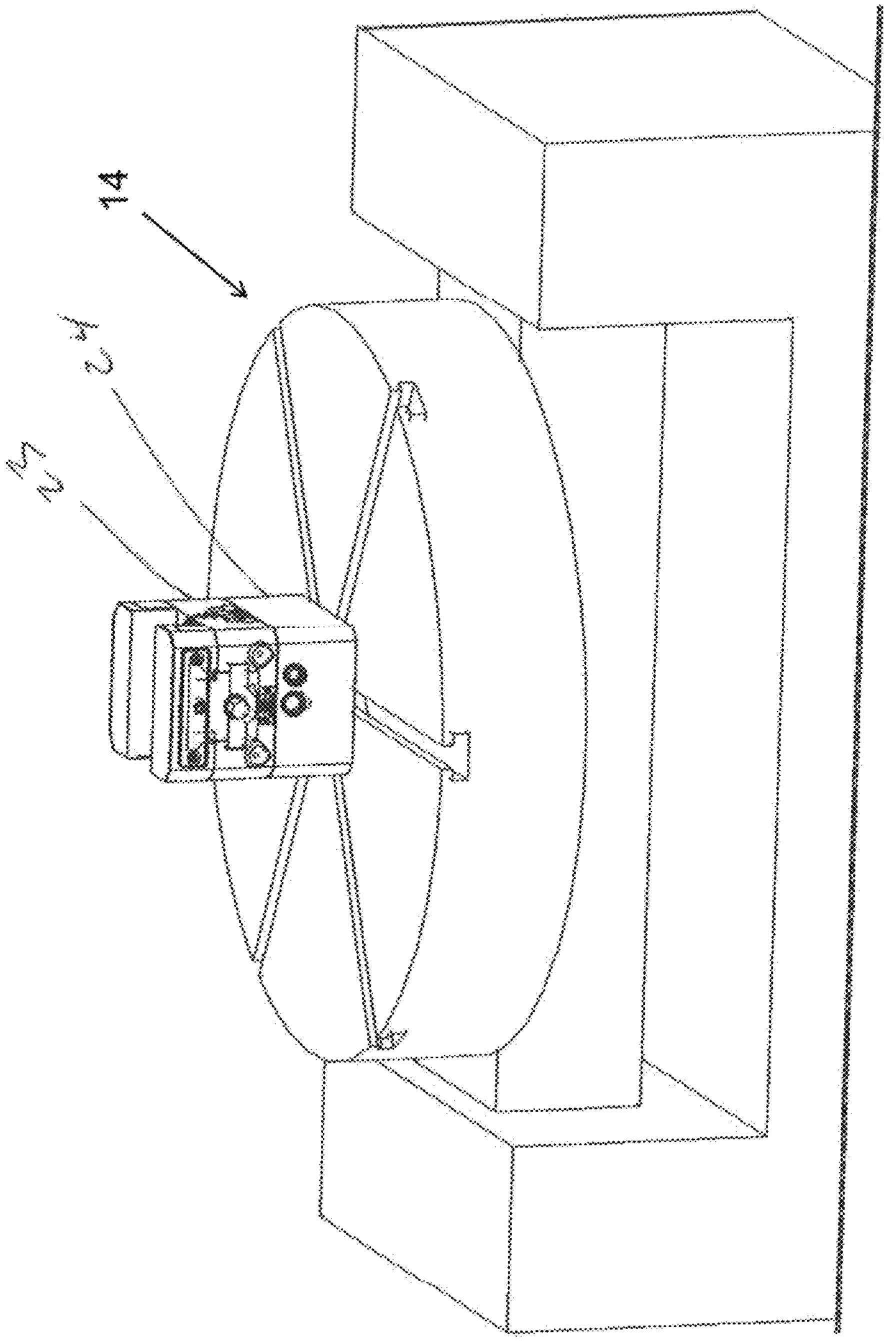
FIG. 4 is a schematic view of a processing area.
Figure 5:
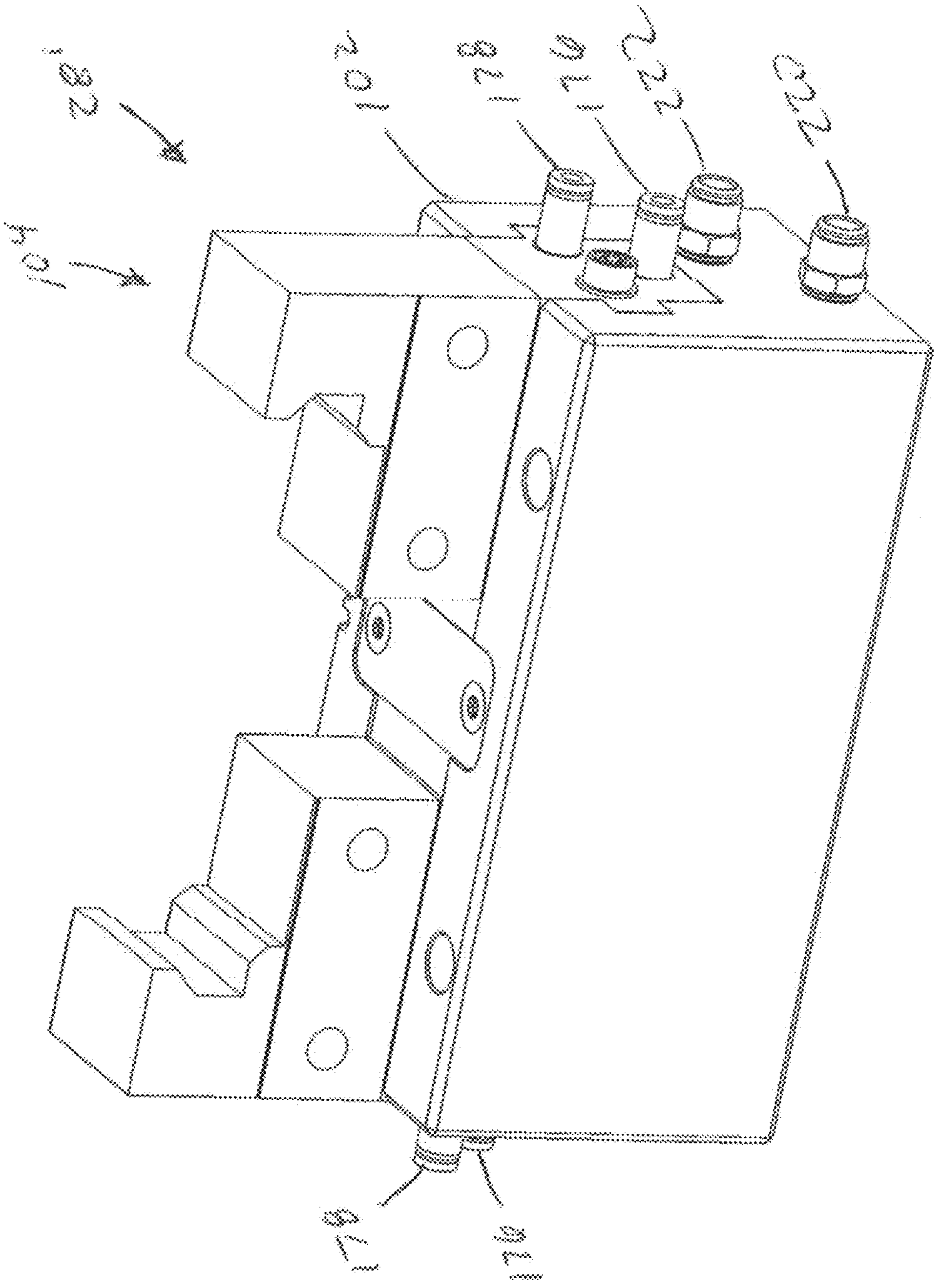
FIG. 5 is a perspective view of a gripping assembly.

As indicated above, the processing area 14 is provided separate from the staging area 16 and processes the workpieces. Processing can take any number of forms including inspecting, painting, all forms of machining, etc. In one particular advantageous embodiment, the processing area 14 includes a machine to perform work on the workpiece such as drilling, milling and cutting. The robot 12 transfers the fixture 23 to a fixture support 24 provided on the staging area 16, loads or mounts an unprocessed workpiece on the fixture 23, transfers the fixture 23 and unprocessed workpiece as a unit to the processing area 14 as illustrated in FIG. 4 whereupon the fixture 23 is mounted upon another fixture support 24 and where processing is then performed upon the workpiece. During processing, the robot 12 can return back to the staging area 16 and perform post processing or preprocessing steps. For instance, the robot 12 can remove a processed workpiece from its corresponding fixture 23 and locate them in a selected area such as but not limited to a selected drawer 22, and load another unprocessed workpiece on the fixture 23 from another selected area such as but not limited to the selected drawer 22 or another drawer 22. If necessary, this can include mounting another fixture 23 to the fixture support 24 in the staging area 16. However, once processing is complete, the robot 12 will remove the fixture 23 and processed workpiece thereattached from the processing area 14 as a unit, and move the fixture 23 and processed workpiece to a post processing area, which can be the staging area 16, and mount another unprocessed workpiece in the fixture 23, if not already performed, and transfer the next unprocessed workpiece and fixture 23 together as a unit to the processing area 14. As appreciated by those skilled in the art, the processing time for processing a workpiece may be greater than or less than the time needed to unload a finished workpiece and load an unprocessed workpiece onto the fixture; hence, the actual order of when loading and unloading of the workpieces to and from the fixture 23 and transferring the unprocessed workpiece and fixture 23 to the processing area 14 and retrieving a processed workpiece and fixture 23 can be adjusted as necessary. One general aspect of the present disclosure is the robot 12 having a staging area 16 where workpieces can be loaded upon and removed from each corresponding fixture 23 and moving the unprocessed workpiece and fixture 23 as a unit to and from the processing area 14.

It should also be noted that the staging area 16 and processing area 14 may not be dedicated to processing workpieces of the same type over and over, but rather, the staging area 16 can be used for processing different types of workpieces requiring different processing in the processing area 14 or another adjacent processing area within reach of the robot 12 (not shown but could be for example to the right of the robot 12 or below the robot 12 in FIG. 1), where aspects of the present disclosure allow a single robot 12 to handle different types of workpieces. Generally, the robot 12 includes a gripping device 28 for handling workpieces and fixtures 23 by using different sets of jaws 30 that are installed and removed as necessary to handle the different workpieces or fixtures 23.

Figure 2:
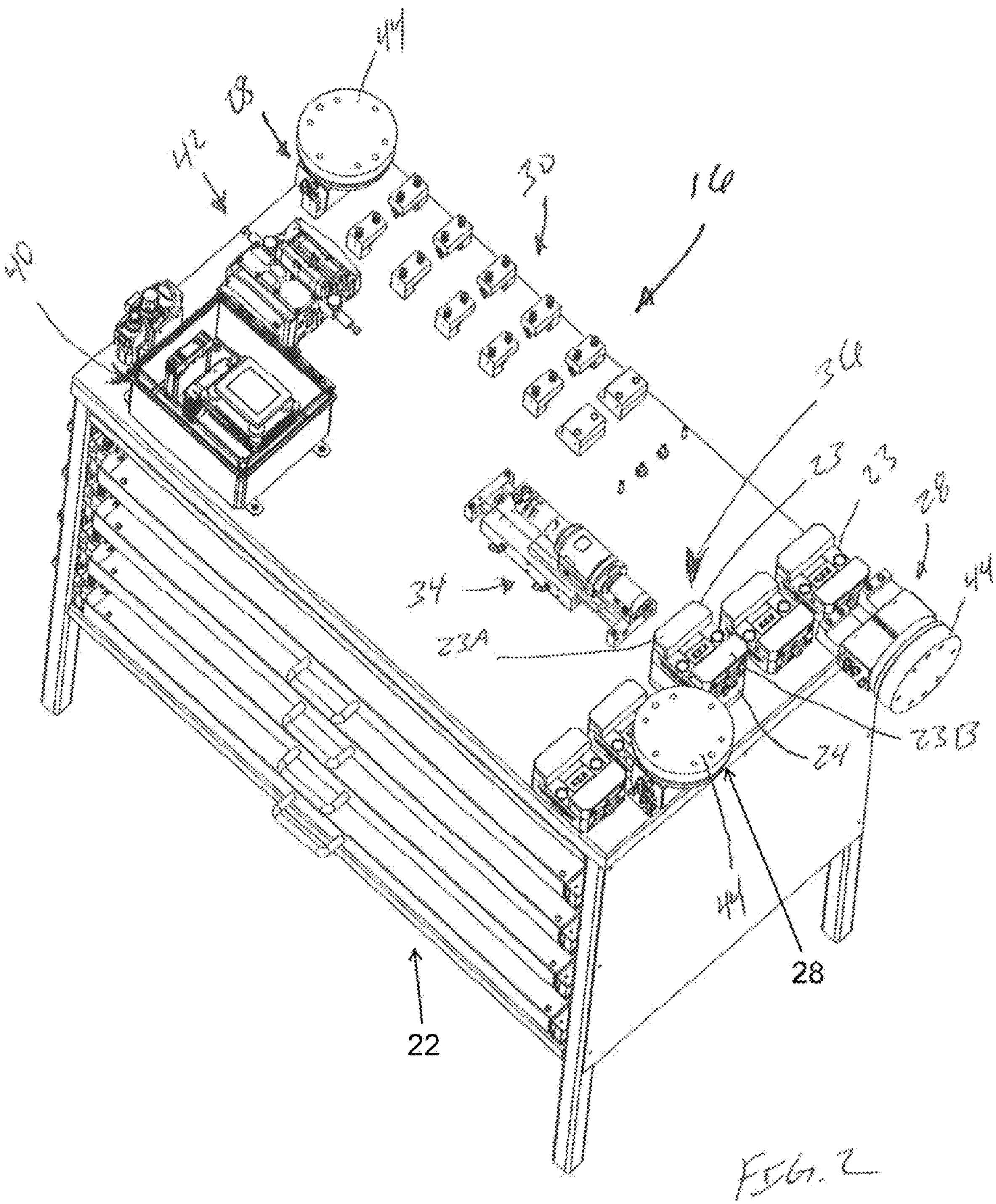
FIG. 2 is a perspective view of a staging area.

An exemplary staging area 16 is illustrated in more detail in FIG. 2. Generally, the staging area 16 includes a workpiece loading and unloading area 36 whereat workpieces are loaded upon and removed from one or more fixtures 23. Since the fixture 23 and workpiece are transferred as a unit to the processing area 14 one or more fixture supports 24 are provided in the workpiece loading and unloading area 36. Each fixture support 24 provides an accurate and secure mount for the fixture 23, so that workpieces can be loaded in the fixture 23 in an accurate manner. In addition, commonly the fixture 23 needs to be operated so as to secure the workpiece thereon. In one exemplary embodiment, the fixture 23 comprises a vise having a screw which when rotated displaces one or both jaws 23A, 23B toward and away from each other. In this embodiment, a drive 34, which will be described further below, is operated so as to engage the screw on the fixture 23 to tighten the jaws 23A, 23B upon the workpiece as well as loosen the jaws 23A, 23B in order that the processed workpiece can be removed.

At this point, it should be noted that a controller 40 is provided to control all operations of staging area 16, and possibly robot 12 and/or processing area 14. In many embodiments, the controller 40 may only control operation of the staging area 16, but communicate with controller(s) of the robot 12 and processing area 14 so as to allow these machines to work together with minimal or no other human interaction. Generally, the controller 40 includes a human interface such as a display, keyboard, touch screen, mouse, pointer, etc. to allow configuration of the system for various workpieces and general operation. Such controllers for operating machines robots, devices and the like are well known and will not be discussed further in detail. Typically, the controller 40 operates electrical, hydraulic and/or pneumatic devices by controlling hydraulic and/or pneumatic valves, relays or other power control devices which are generally indicated at 42. In the embodiment illustrated, these devices 42 and controller 40 are illustrated as being located in the staging area 16; however, this should not be considered limiting in that such devices can be located in any convenient location.

Figure 3:
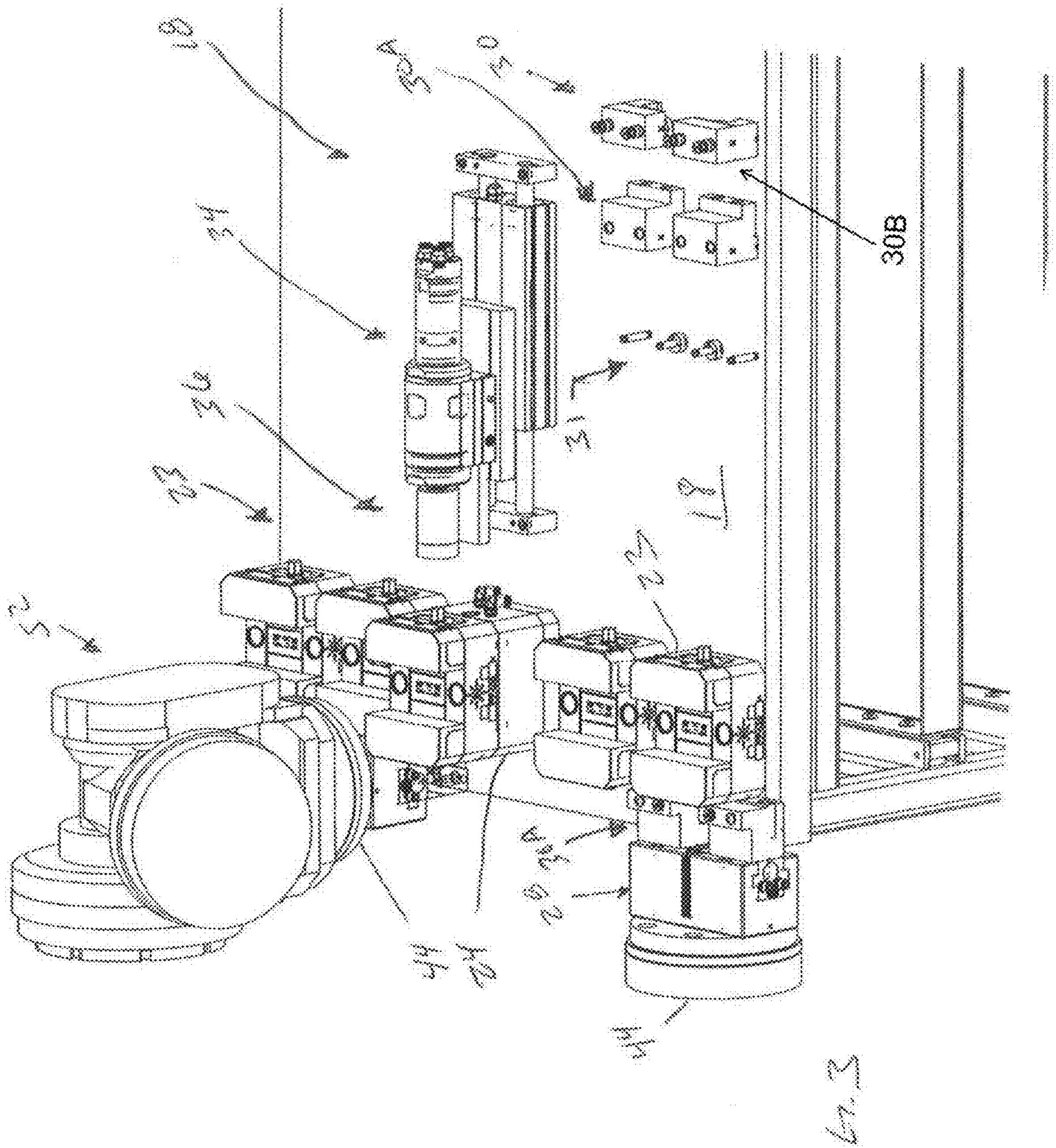
FIG. 3 is an enlarged perspective view of the staging area.

As stated above, the robot 12 is used both for handling workpieces and for handling fixtures 23 with or without the workpieces mounted thereon. The gripping device 28 is mounted to the robot 12 and uses different jaws for 30 handling the workpieces and the fixtures 23. Referring to FIG. 3, a gripping device 28 is illustrated attached to a fixture 23 that is resting on or otherwise supported by surface 18. The gripping device 28 includes jaws 30A that are used to attach to fixture 23. With these jaws 30A, gripping device 28 can move the fixture 23 with or without a workpiece where desired. When necessary, the jaws 30A can be removed by operation of the gripping device 28 as described below and replaced with jaws 30B that are configured to grip the workpiece, not shown. The jaws 30B can be used to hold both an unprocessed workpiece or a processed workpiece. If necessary or desired, different jaws 30 can be used for an unprocessed workpiece and a processed workpiece, being carved to have desired support surfaces or otherwise configured as desired to handle workpieces A set of jaw holders 31 are illustrated mounted to surface 18 but can be located in any convenient location for the robot 12. A set of jaw holders 31 is provided for each of the individual jaws available for use by the robot 12. Each set of jaw holders 31 holds each associated set of jaws in a known position and location such that the gripping device 28 can be operated to release a set of jaws currently on the gripping device 28, locating the jaws 30 on a certain set of jaw holders 31. The robot 12 can then move the gripping device 28 to another set of jaws and operate the gripping device 28 to mount the new jaws thereon. Generally, the controller 40 is configured to know the position and type of each set of jaws (e.g. 30A,30B), position and type of fixture(s) 23, position and type of fixture support(s) 24, position and type of gripping devices 28, location of unprocessed and processed workpieces, etc. in the system and maintains this information during workpiece processing. If desired, proximity sensors such as contact sensors can be provided on the surface 18, in the gripping devices 28, in the pallets 24 and/or in the fixtures 23 so as to provide indications of the presence of each corresponding device in the system, or an element being connected to or mounted in the gripping devices 28, the pallets 24 and/or the fixtures 23. In addition or in the alternative, each of the jaws 30A,30B, the gripping devices 28, the pallets 24 and/or the fixtures 23 can be equipped with optical, tactile or electronic indicators such as but not limited to barcodes, RFID elements or the like that can be sensed in order to ascertain which element is which.

In the embodiment illustrated in FIG. 3, the gripping device 28 is illustrated as being mounted to a mount 44 that in turn is secured to the robot 12. In the exemplary embodiment illustrated, the robot 12 is a robot that has a single arm 50 moveable in multiple degrees of freedom. If desired, an end 52 can also move in one or more degrees of freedom such as rotation about a fixed or moveable axis. In FIG. 3, only the end 52 is illustrated, while in FIG. 1 the end 52 is mounted on the arm 50. The mount 44 couples to the end 52 in well-known forms, the details of which are not necessary for purposes of understanding the present invention.

In one embodiment, the mount 44 includes one or more passageways for fluid such as air to be provided to the gripping device 28 so as to control the operation thereof. If provided, electrical connectors can also be provided on the mount 44 so as to be coupled to the robot 12 on the end 52. In another embodiment, the mount 44 does not include any passageways or conductors, but rather the fluid lines and/or electrical lines that are external to the mount 44 and extend along the arm 50 of the robot 12. The arm 50 can carry a valve assembly that includes valves to control fluid flow from a fluid power source to the ports of the gripping assembly 28 to separately control the actuators therein if operated by fluid (gas or liquid). Typically, the valve assembly is controlled by electric solenoids or the like. If one or more of the actuators of the gripping assembly 28 include electric actuators, the mount 44 can include suitable connections to the gripping assembly 28, the connections being connected to power cables providing electrical power from an electric power supply, not shown.

Figure 6:
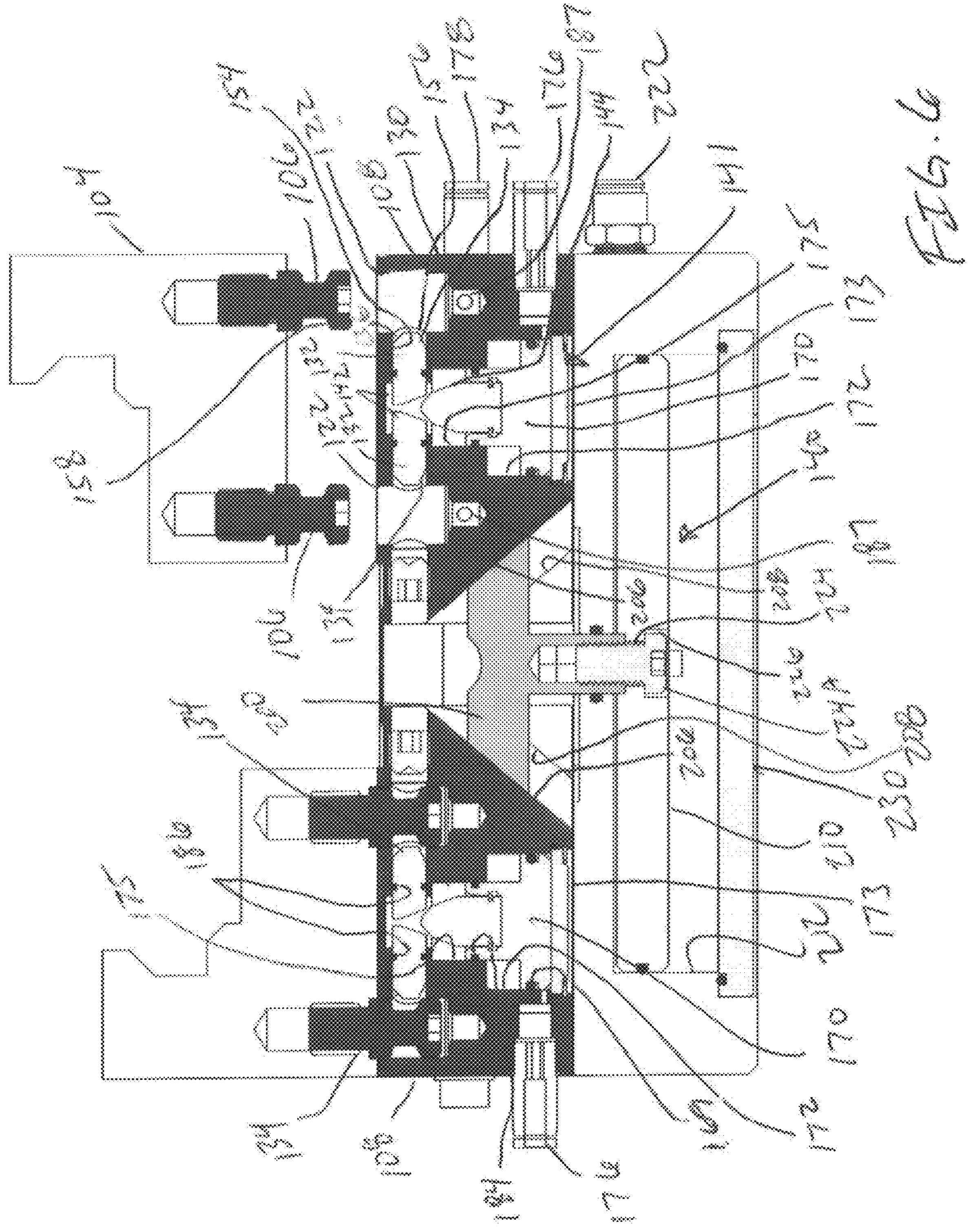
FIG. 6 is a sectional view of the gripping assembly of FIG. 5.
Figure 7:
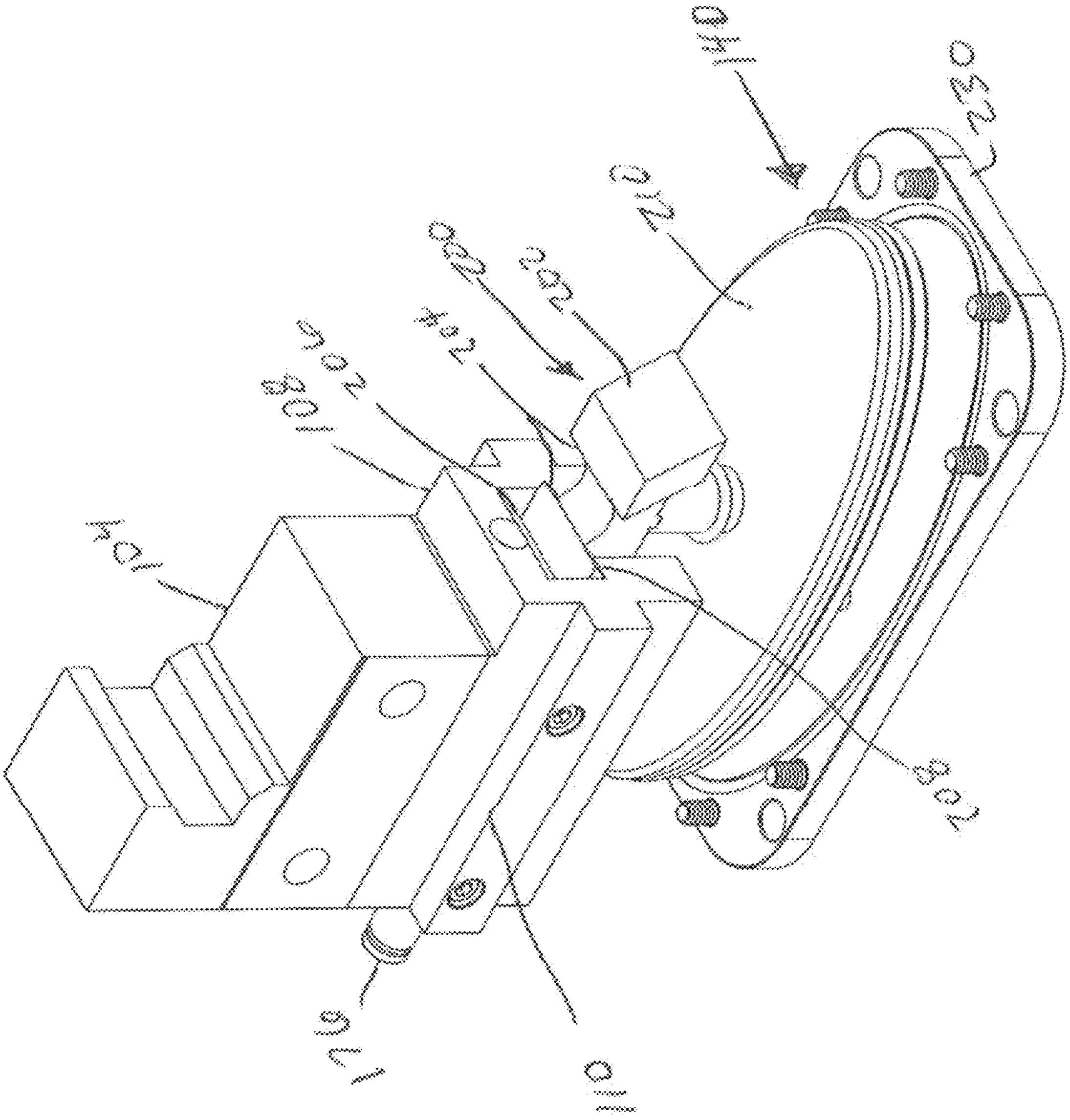
FIG. 7 is a perspective view of the gripping assembly of FIG. 5 with parts removed.

FIGS. 5 through 9 illustrate a first embodiment of a gripping device 28' of the present disclosure. Gripping device 28' includes a body 102 that supports a pair of exemplary gripping jaws 104 (another example illustrated in FIG. 3 at 30B) for a workpiece, by way of example, but gripping device 28' could have jaws 30A mounted thereon for a fixture 23. Each jaw for the gripping device 28' includes spaced apart securing posts 106, preferably being pull studs. A pair of jaw supports 108 is supported for slidable movement on the body 102 toward and away from each other. Referring to FIG. 7, complementary channels or guides and projections inserted in the guides are used to couple the jaw supports 108 to the body 102 for slidable movement. In the illustrated exemplary embodiment, projections 110 are provided on the jaw supports 108 while the complementary channels 112 (FIG. 9) are formed on inner surfaces of the body 102. As appreciated by those skilled the in art, the jaw supports 108 could include the channels while the inside surface of the body 102 comprises the projections.

Each jaw support 108 includes a pair of spaced apart apertures or holes 122 for receiving the spaced apart securing pull studs 106. Each jaw support 108 includes a support body 130 and a pair of locking slides 132 configured for sliding movement in the support body 130. Each locking slide 132 has a first end 134 configured to engage one of the pull studs 106 when the pull stud 106 is disposed in a corresponding hole 122. At least one actuator 140 is configured to draw the jaw supports 108 toward and away from each other.

Figure 8:
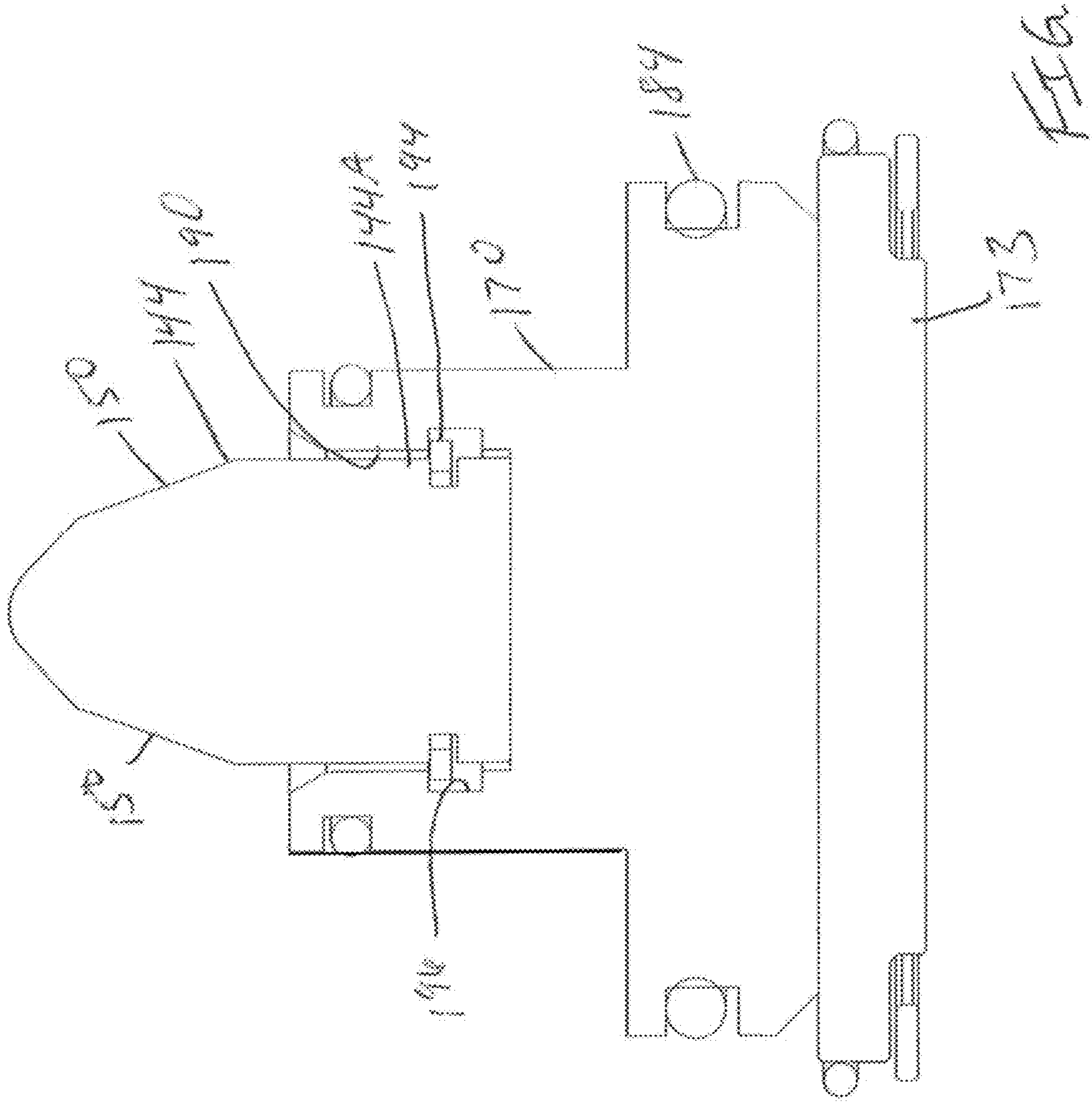
FIG. 8 is a sectional view of a piston for an actuator.

Each locking slide 132 includes a second end 142. The second ends 142 are disposed in the body 130 closer to each other than the first ends 134. A drive member 144 is disposed between the second ends 142 and is configured to drive the locking slides 132 such that the first ends 134 extend into or out of each corresponding hole or bore 136 to selectively engage one of the pull studs 106 to secure the jaw 104 to the support body 130. At least one actuator 141 is coupled to the drive member 144 and operated to selectively displace the drive member 144. Referring also to FIGS. 6-8, the drive member 144 has opposed inclined surfaces 150 upon which the second ends 142 slidably engage. Each locking slide 132 is disposed in a guide bore 154, where the bores 154 and locking slides 132 are arranged such that longitudinal axes of the locking slides 132 are aligned along a common axis. Preferably, a longitudinal axis of the drive member 144 is orthogonal to the axes of the locking slides 132.

In a manner similar to the inclined surface engagement between the second ends 142 and the drive members 144, an inclined surface 156 on the first end 134 selectively engages an inclined surface 158 provided on the pull studs 106. Besides locking the pull stud 106 into each corresponding hole 122, the inclined surfaces 156 and 158 urge the securing post 106 into the hole 122 providing a force driving the pull stud 106 into the hole 122, thus ensuring a complete and proper orientation of the gripping jaw 104 upon the corresponding jaw support 108.

The actuator 141 can take many forms as appreciated by those skilled in the art such as but not limited to a fluid based actuator (pneumatic or hydraulic) or an electric actuator or solenoid. Generally, an actuator includes a first portion displaceable relative to a second portion. For a fluid based actuator, the first portion can comprise a piston 170 having a seal 169 moveable relative to a cylindrical chamber 172 formed in the support body 130. End caps 173 are secured to the bodies 130 so as to form each of the chambers 172. The piston 170 is coupled to the drive member 144. Fluid pressure provided to ports 176 and 178 controls movement of the pistons 170 in each of the cylindrical chambers 172. In particular, fluid pressure provided through port 176 displaces the pistons 170 so as to drive the drive members 144 into the second ends 142 causing sliding engagement therewith which displaces the locking slides 132 away from each other and into the corresponding holes 122. Port 178 is also fluidly coupled to the cylindrical chambers 172 so as to selectively displace the pistons 170 and drive members 144 away from the ends 134.

In a particularly advantageous embodiment, the locking slides 132 are drawn toward each other when the drive member 144 is pulled away from the ends 142. Although biasing devices such as springs and the like can be used to bias the locking slides 132 toward each other, in the present disclosure, fluid pressure is controlled upon the locking slides 132 to urge the locking slides 132 together when each drive member 144 is moved away from the corresponding first ends 122. In the present disclosure, fluid pressure on both sides of the locking slides 132 is controlled, although it may only be necessary to control the fluid pressure on one side of the pins 132 to urge the locking slides 132 together. Fluid pressure can be controlled in a chamber 175 formed between the piston 170 and each of the locking slides 132. The chamber 175 is defined by a seal 184 provided on the piston 170 and a seal 186 on each of the locking slides 132. When the port 178 is pressurized, the piston 170 and the drive member 144 are driven so as to increase the volume defined by the chamber 175, which creates a vacuum in the chamber 175 that tends to pull each of the locking slides 132 toward each other.

Figure 9:
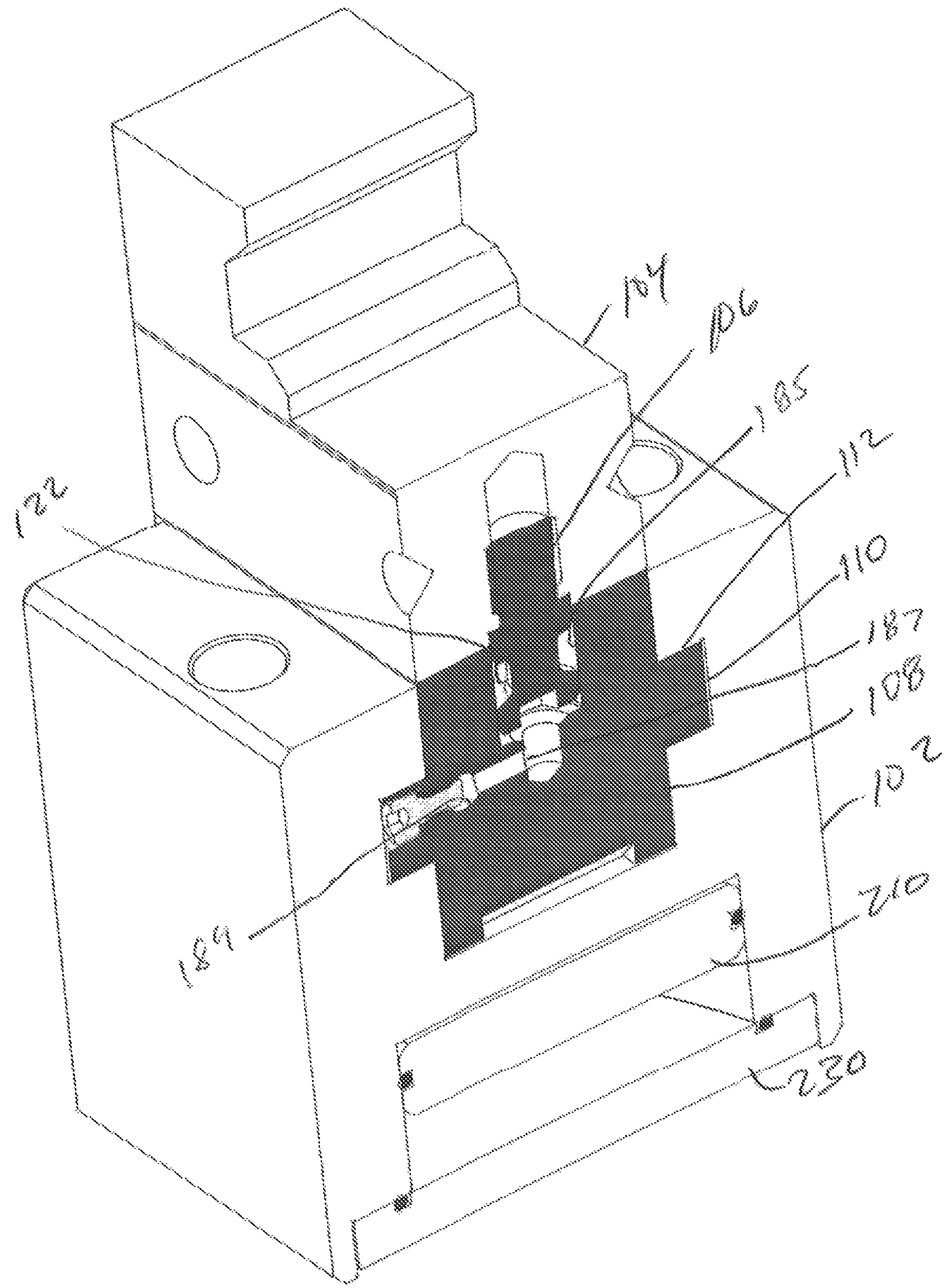
FIG. 9 is a sectional view of the gripping assembly of FIG. 5.

In addition or in the alternative, fluid pressure can also be controlled on the side of the locking slides 132 having the first ends 134. In particular, a chamber 185 is defined by seals 186 and the engaging surfaces of the support body 130 and the lower surface of the gripping jaw 104 made therewith. This chamber 185 includes the space in the hole 122 around the pull stud 106. Referring to FIGS. 6 and 9, each chamber 185 receives pressurized gas through a port 187. A passageway 189 fluidly couples ports 187 together and to port 178 such that fluid pressure provided at port 178 also pressurizes the chambers 185 so that the locking slides 132 are urged toward each other. In the embodiment illustrated, the hole 122 for each of the pull studs 106 is of a size slightly larger than the diameter of the pull stud 106 such that fluid pressure from port 187 provided below the pull stud 106 can fully pressurize each of the chambers 185.

It should also be noted that although the drive member 144 can be securely mounted to the piston 170, such as being formed integral therewith from a single unitary body or coupled using a suitable fastener, in a preferred embodiment, the drive member 144 is allowed to move relative to the piston 170 so as to center the drive member 144 between the locking slides 132 and balance the forces supplied to each of the locking slides 132. Referring to FIG. 8, the piston 170 includes a hole 190 of size slightly larger than a base portion 144A of the drive member 144. A fastener 194 that allows movement of the drive member 144 relative to the piston 170 is used to retain the drive member 144 in the hole 190. In the embodiment illustrated, a snap ring 194 is provided on the drive member 144 and interlocks with a groove 196 provided in piston 170 so that the drive member 144 will move with the piston 170 when the piston 170 moves in the chamber 172. Preferably though, the drive member 144 is supported by the piston 170 so as to allow slight radial (translational) movements relative to a longitudinal axis of the piston 170 and/or rotational movements relative to an axis orthogonal to the longitudinal axis of the piston 170. In this manner, the drive member 144 may move with contact of the drive member 144 with the second ends 142 so as to center the drive member 144 between the locking slides 132 to balance the forces between each locking slide 132 and the drive member 144 where the forces are transferred through the locking slides 132 to each of the pull studs 106. Movement of the drive member 144 relative to the piston 170 thus compensates for variances in contact of the locking slides 132 with each pull stud 106, the difference in lengths of the locking slides 132, and the variance in contact between the locking slide 132 and the drive member 144. It is believed by centering the drive member 144 with respect to the locking slides 132 can substantially balance the forces between the drive member 144 and each locking slide 132 and allow the drive member 144 to move relative to the piston 170 so as to inhibit a rotational displacement of the piston 170 in the chamber 172 (about an axis orthogonal to movement of the piston 170 in the chamber 172) since the drive member 144 is not rigidly connected to the piston 170.

The actuator 140 selectively drives the jaw supports 108 toward and away from each other. The actuator 140 includes a drive member 200 that has inclined surfaces 20 and 204 that slidably engage inclined surfaces 206 and 208, respectively of the jaw supports 108. In particular, sliding engagement of surfaces 202 and 206 between the drive member 200 and each of the jaw supports 108 with movement of the drive member 202 upward in FIGS. 6 and 7 causes the jaw supports 108 to move away from each other, while sliding engagement of the surfaces 204 and 208 of drive member 200 and the jaw supports 108 with movement of the drive member 200 in the opposite direction (downward) causes the jaw supports 108 to move toward each other. Like the actuators 141 described above, the actuator 140 can operate using fluid pressure or an electric actuator or solenoid. Generally, actuator 140 includes a first portion coupled to the drive member 200 and a second portion that the first portion moves relative thereto. In the embodiment illustrated, the actuator 140 comprises a fluid operated actuator having a piston 210 and a chamber 212 formed in the body 102. Fluid pressure from a first port 220 (FIG. 5) that is fluidly coupled to the volume below the piston 210 with a passageway not shown in FIG. 6 causes movement of the piston 210 and the drive member 200 to move upwardly so as to drive the jaw supports 108 away from each other. Similarly, fluid pressure provided to port 222) that is fluidly coupled to the volume above the piston 210 with a passageway not shown in FIG. 6 causes the piston 210 and drive member 200 there attached to move in the opposite direction downwardly thereby drawing the jaw supports 108 towards each other.

In a manner similar to coupling of the drive member 144 to the piston 170, the drive member 200 is also coupled to the piston 210 so as to allow mostly slight radial (translational) relative to a longitudinal axis of movement of the piston 210 but maybe also rotational movements relative to an axis orthogonal to the longitudinal axis of the piston 210. In this embodiment, a fastener 224 is secured the drive member 200 and has an enlarged head 224A that engages the piston 210, herein being disposed in a recess 226 formed in the piston 210. The recess 226 is slightly larger than the head 224A and the fastener 224 is secured to the drive member 200 such that the enlarged head 224A can move relative to the piston 210. Again, this coupling centers the drive member 200 between the jaw supports 180 and substantially balances the forces between the drive member 200 and each of the jaw supports 108 to inhibit any substantial torque from being developed that would tend to otherwise rotate the piston 210 within the cylindrical chamber 212 about an axis orthogonal to movement of the piston 210. An end cap 230 is secured to the body 102 to form the sealed chamber 212.

Figure 10:
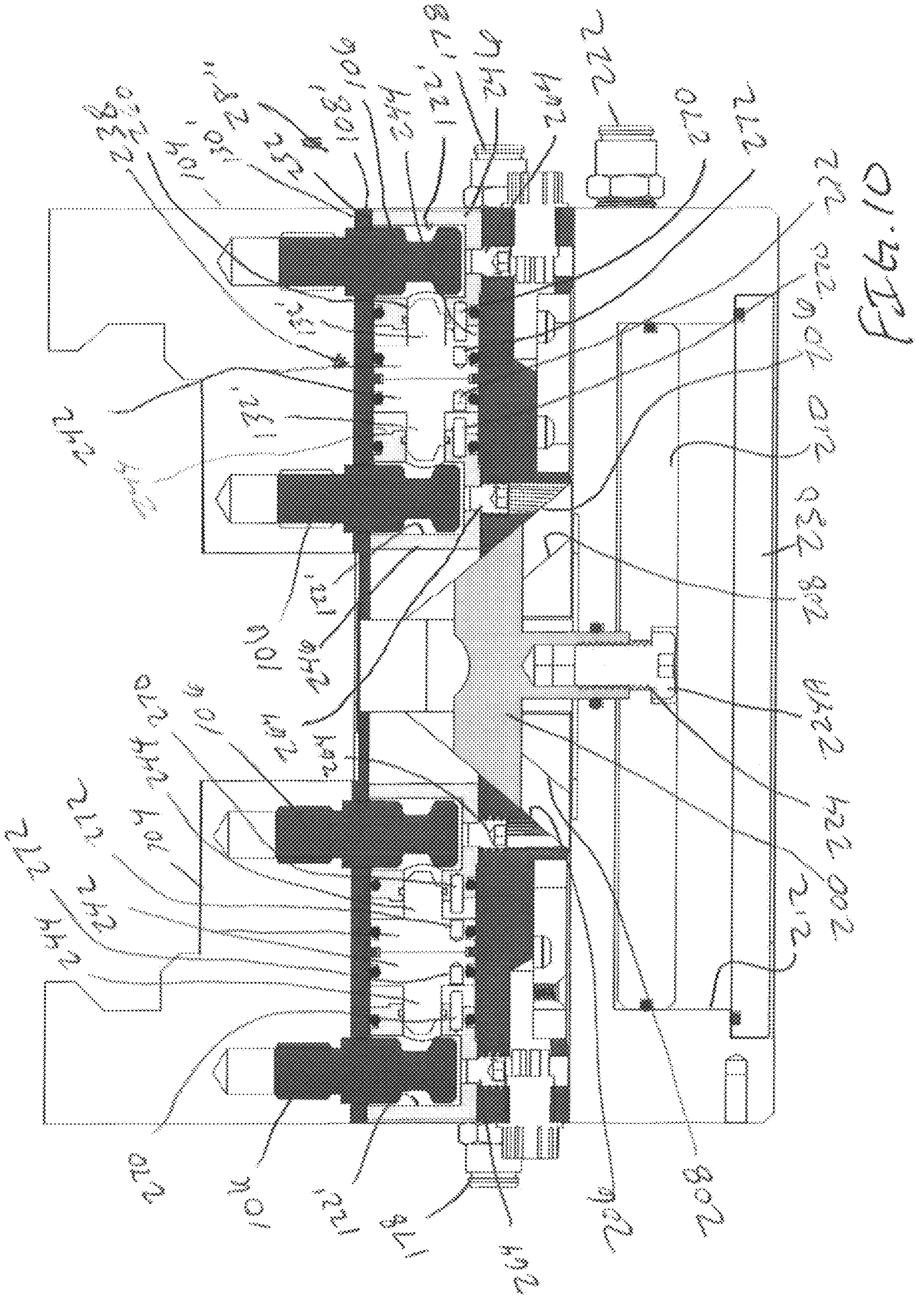
FIG. 10 is a sectional view of a second embodiment of a gripping assembly.
Figure 11:
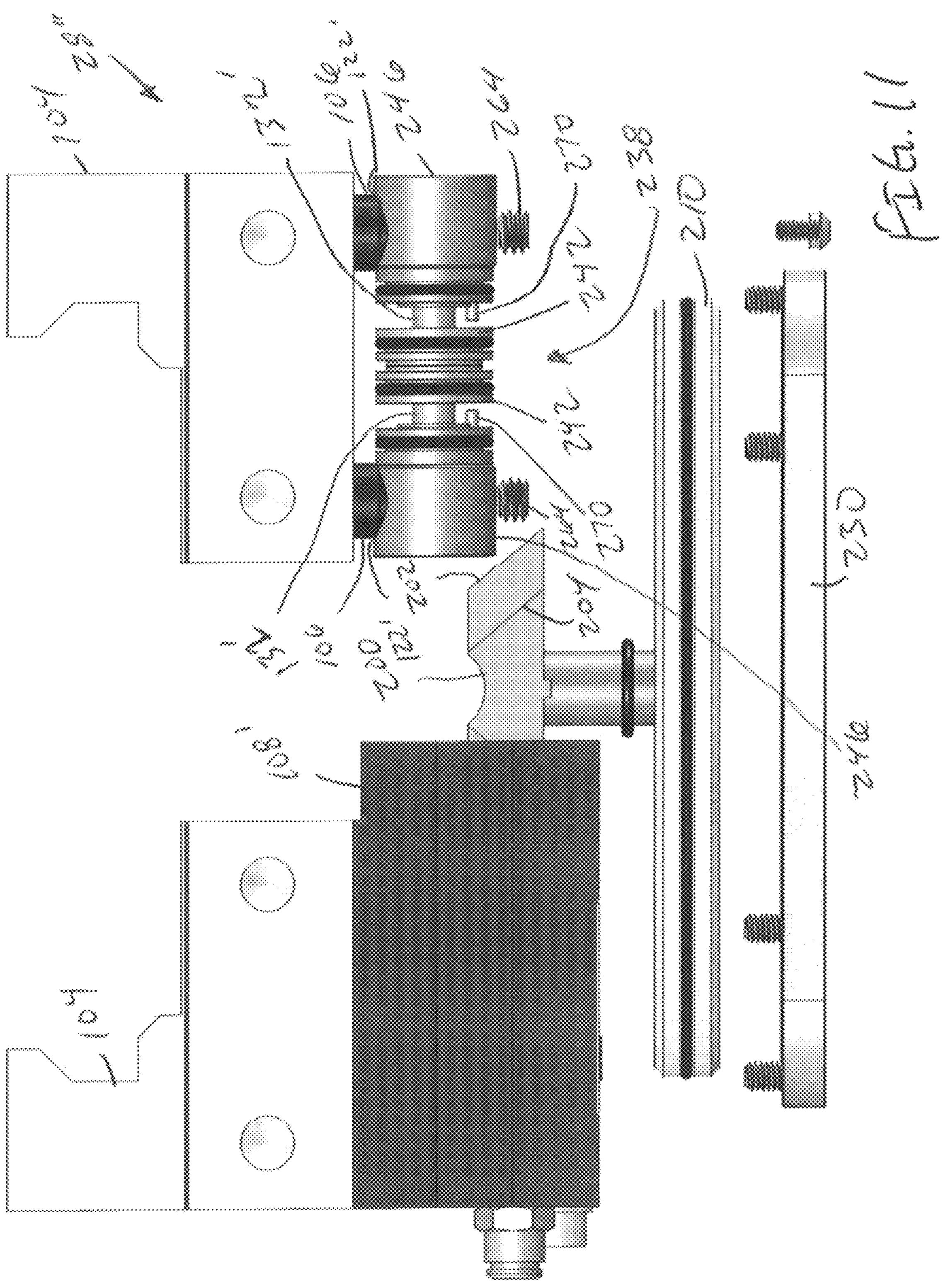
FIG. 11 is a perspective view of the gripping assembly of FIG. 10 with parts removed.
Figure 12:
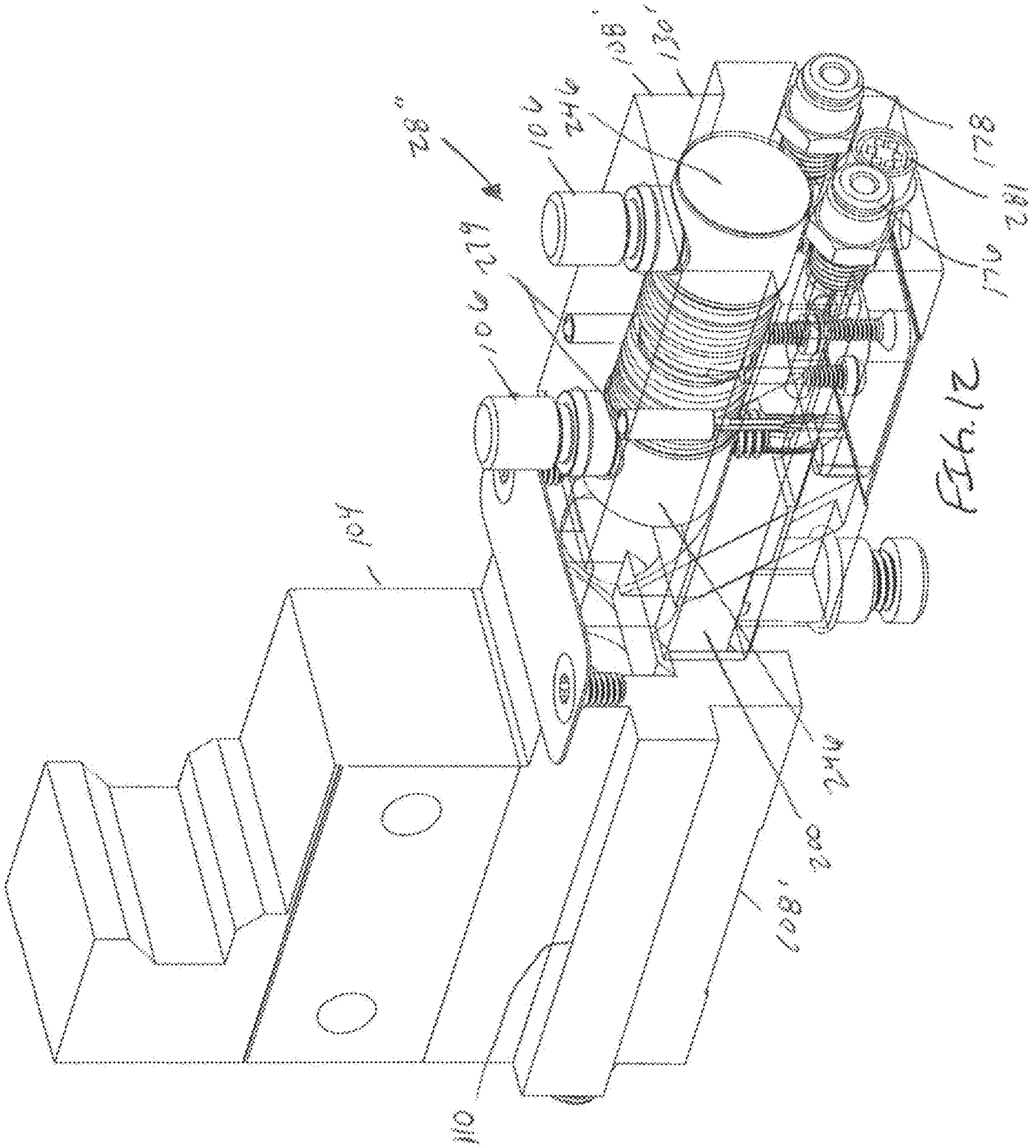
FIG. 12 is a perspective schematic view of the gripping assembly of FIG. 10 with parts removed.
Figure 12A:
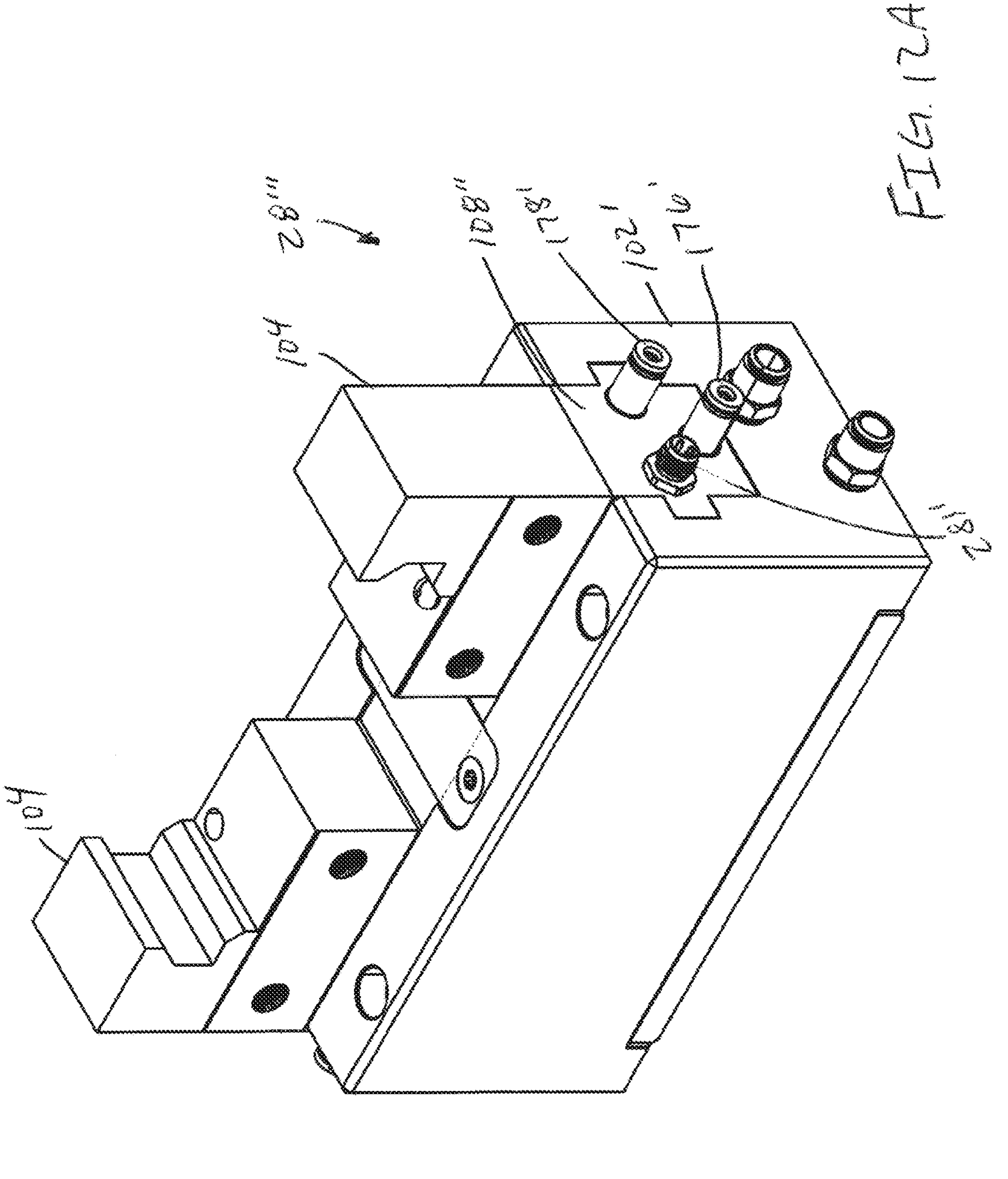
FIG. 12A is a perspective view of a third embodiment of a gripping assembly.
Figure 12S:
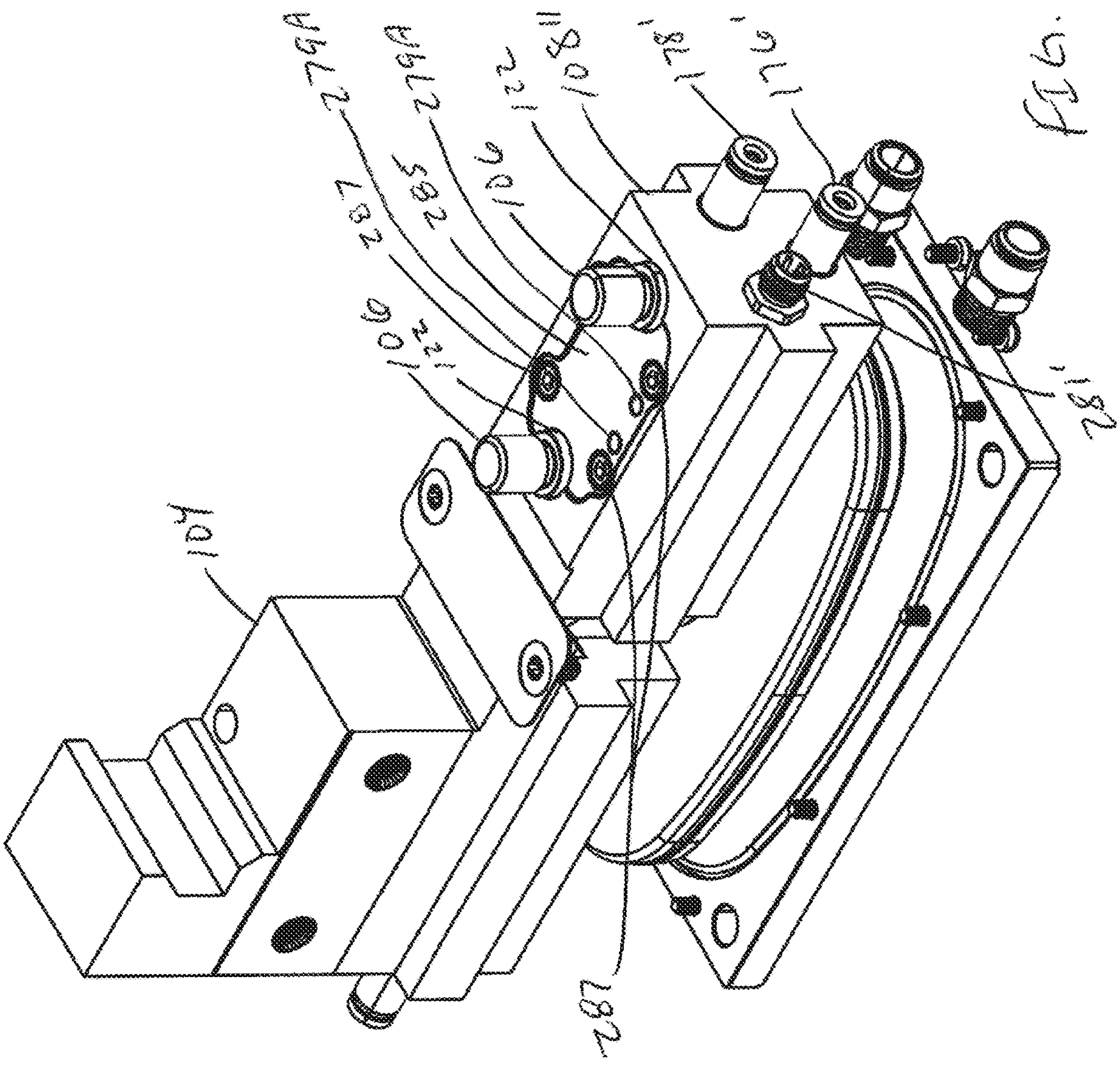
FIGS. 12B and 12C are perspective views of the gripping assembly of FIG. 12A with parts removed.
FIG. 12D is a sectional view of the gripping assembly of FIG. 12A.
FIG. 12E is a perspective view of the gripping assembly of FIG. 12A with parts removed.
FIG. 12F is a sectional view of the gripping assembly of FIG. 12A.
Figure 12C:
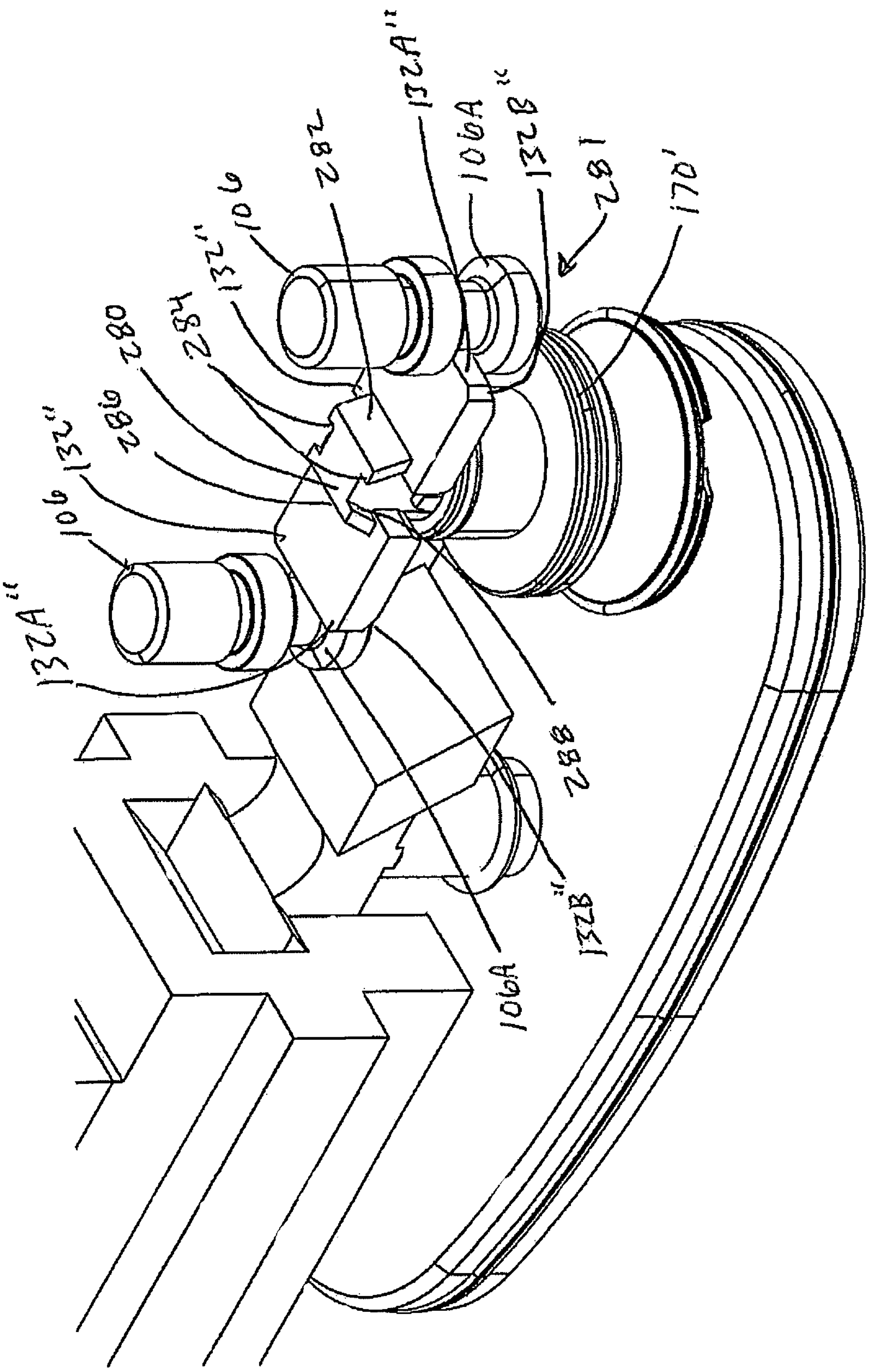

FIGS. 10 to 12 illustrate another embodiment of a gripping device 28". In FIGS. 10 to 12, the same or similar reference numbers have been used to identify like-elements described above.

Generally, gripping device 28" includes an actuator 238 in each jaw support 108' configured to drive each of the locking slides 132'. In this embodiment, each of the locking slides 132' is formed integral with a piston 242 from a single unitary body; however, if desired, the locking slides 132' can be fastened to the piston 242 in a conventional manner using suitable fasteners. The pistons 242 are located in a common cylindrical chamber 244 formed in the support body 130' in the jaw support 108'. Pressurized fluid provided to port 176 (FIG. 12) and through passageway 176A causes the pistons 242 to move away from each other thereby driving each of the locking slides 132' toward and in engagement with each pull stud 106. In this embodiment, hole 122' for the pull stud 106 is formed in part with a pull stud receiver 246 secured at opposite ends to the jaw support 108'. In addition to an opening 252 so as to create the hole 122', each receiver 246 includes an aperture 260 for each corresponding locking slide 132'. Each receiver 246 is secured to the support body 130' herein using a fastener 264, although if desired, other forms of fastening such as welding can be used.

In the embodiment illustrated, each of the pistons 242 is configured so as to not rotate about its longitudinal axis which would cause incorrect mating between the inclined surfaces locking slide 132' and pull stud 106. A guide pin 270 and pin receiver 272 cooperate together to inhibit rotation of each piston. In this embodiment, the guide pin 270 is secured to the receiver 246 wherein the pin receiver 272 is provided on the piston 242.

Gripping device 28" also illustrates in FIG. 12 exemplary proximity sensors 279 that sense the presence of each jaw 104 being properly mounted on the corresponding jaw support 108'. Sensors 279 are connected to connector 281. Proximity sensors 279 in general are well known and utilize different mechanisms to sense an element. For instance, a proximity sensor can be a mechanical switch that is operated when there is physical movement between two parts, a stationary member and a driven member, whereby the element to be sensed in this case the presence of jaw 104 contacts and drives the driven member. Other forms of proximity switches are contactless, for example, but not limited to the use of magnetic fields. In the embodiment illustrated, a contactless sensor senses a magnet 279A (FIG. 11) mounted in the jaw 104 when the jaw 104 has been properly mounted on the support 108'. Similar sensors can be used on gripping device 28' as well as on the fixtures 23, fixture supports 24, work surface 18, etc.

FIGS. 12A to 12F illustrate another embodiment of a gripping device 28'". In FIGS. 12A to 12F, the same or similar reference numbers have been used to identify like-elements described above.

Referring to FIGS. 12A-12F, gripping device 28'" includes an actuator 281 in each jaw support 108" configured to drive each of the locking slides 132". The actuator 281 selectively drives the locking slides 132" toward and away from each other. The actuator 281 is similar in structure to actuator 140 in that it includes a drive member 280 that has inclined surfaces 282, 284 that slidably engage inclined surfaces 286 and 288 of the locking slides 132". In particular, sliding engagement of surfaces 282 and 286 between the drive member 280 and each of the locking slides 132" with upward movement of the drive member 280 in FIGS. 12C and 12D causes the locking slides 132" to move away from each other, while sliding engagement of the surfaces 284 and 288 of drive member 280 and the locking slides 132" with downward movement of the drive member 280 causes the locking slides 132" to move toward each other. Like the actuators described above, the actuator 281 can operate using fluid pressure or an electric actuator or solenoid. Generally, actuator 281 includes a first portion coupled to the drive member 280 and a second portion that the first portion moves relative thereto. In the embodiment illustrated, the actuator 281 comprises a fluid operated actuator having a piston 170' and a chamber 172' formed in the body 102'. Fluid pressure from a first port 176' causes movement of the piston 170' and the drive member 280 to move so as to drive the locking slides 132" away from each other so as to engage each of the pull studs 106. Similarly, fluid pressure provided to port 178' causes the piston 170' and drive member 280 thereattached to move in the opposite direction thereby drawing the locking slides 132" towards each other and away from each of the pull studs 106. Preferably, centerline longitudinal axes of the locking slides 132" are aligned along a common axis, while an axis of the drive member 280 is orthogonal to the axes of the locking slides 132". An end 132A" of each locking slide 132" can include a chamfered or inclined surface 132B" that is configured to engage a corresponding inclined surface 106A provided on each pull stud 106 so that driving engagement of the inclined surface 132B" with inclined surface 106A urges each pull stud 106 downwardly to secure the locking jaw 104 against the jaw support 108".

Figure 12D:
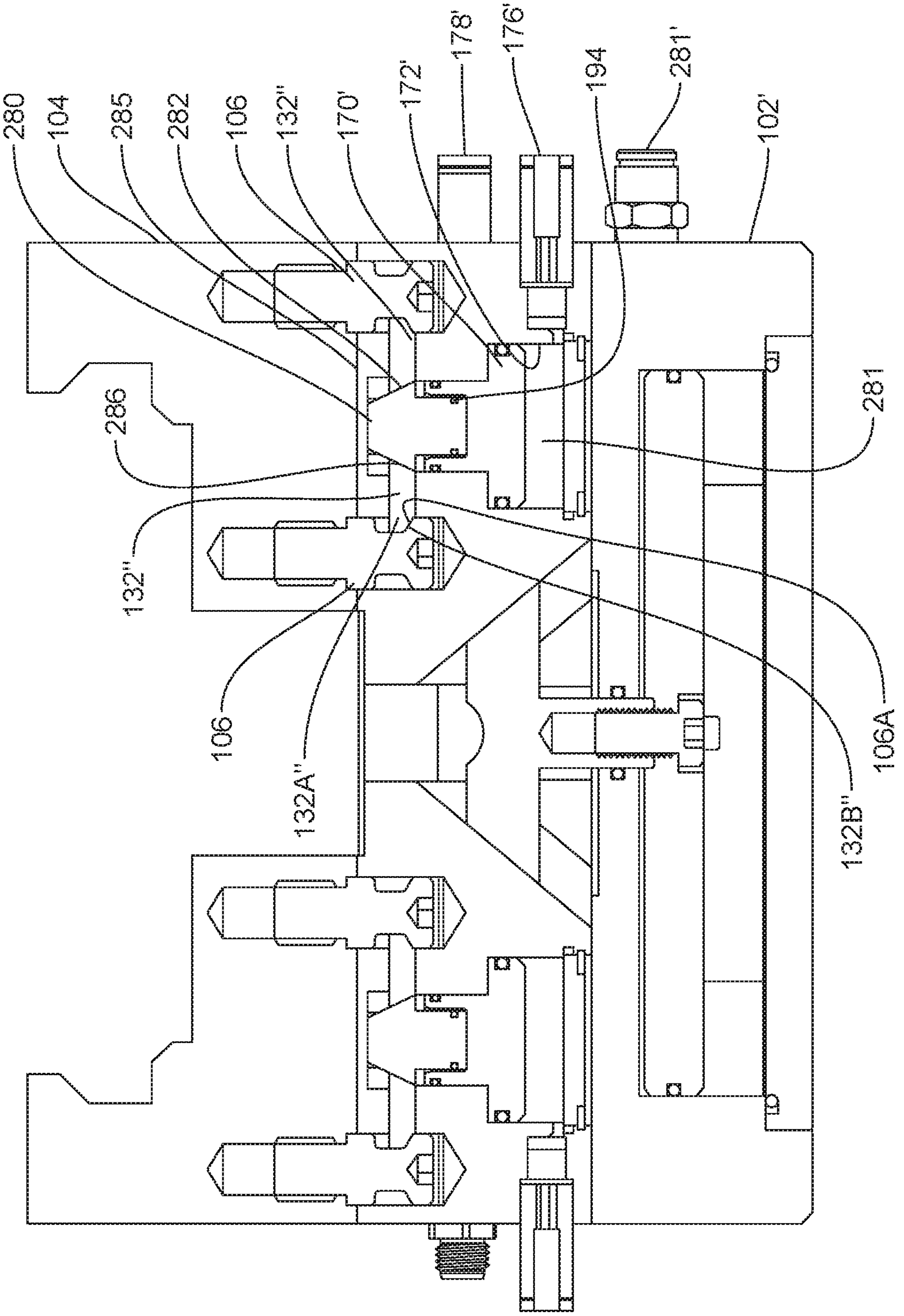

Referring to FIGS. 12B and 12D, a cover plate 285 provides a bearing surface and retains the locking slides 132" within the jaw supports 108" using fasteners 287. It is noted that the apertures 122 for the pull studs 106 are formed in part by the cover plate 285.

In a manner similar to coupling of the drive member 144 to the piston 170 as illustrated in FIG. 8, the drive member 280 is also coupled to the piston 170' with the fastener 194 so as to allow mostly slight radial (translational) relative to a longitudinal axis of movement of the piston 170' but maybe also rotational movements relative to an axis orthogonal to the longitudinal axis of the piston 170'.

Figure 12E:
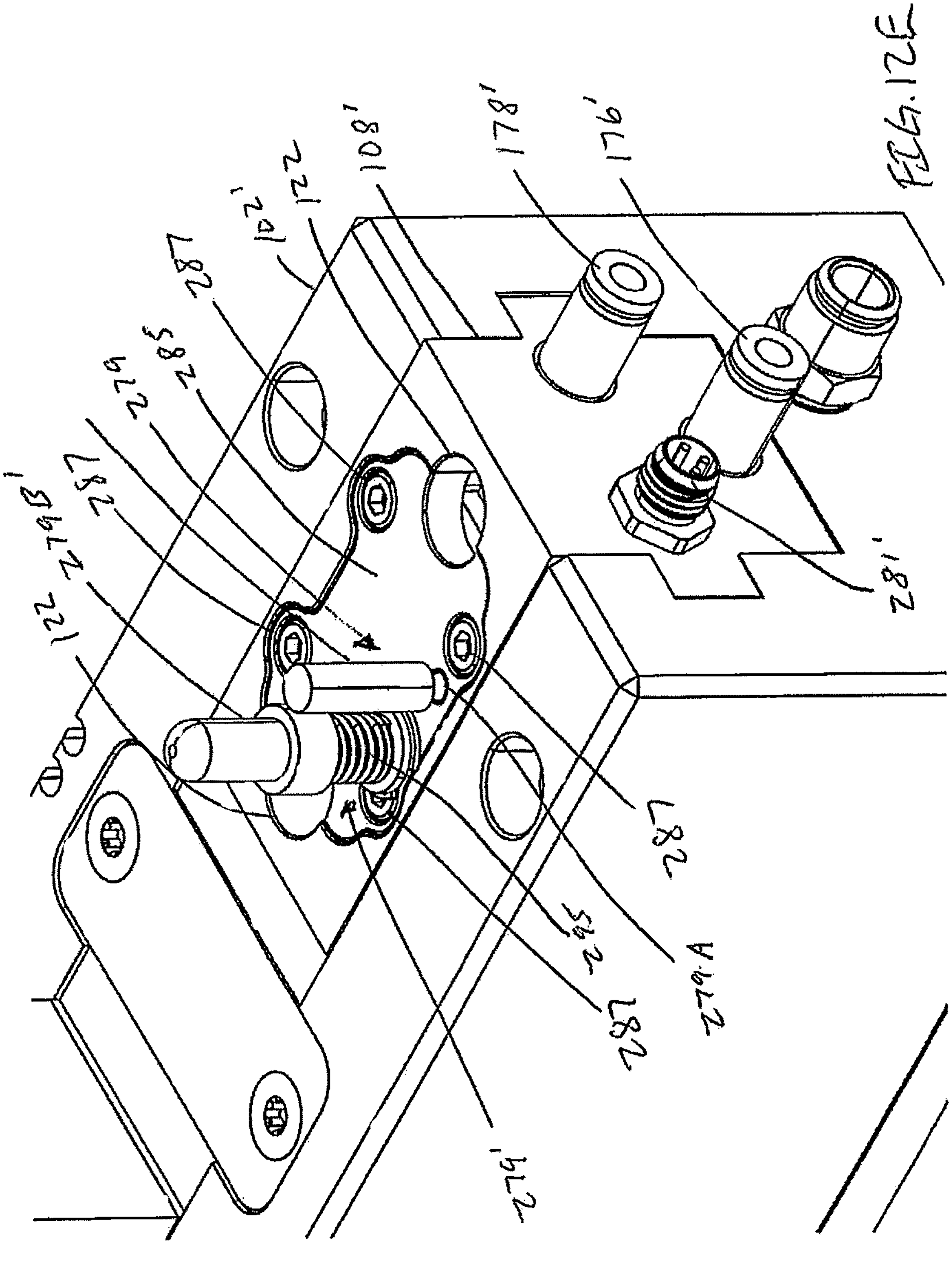
Figure 12F:
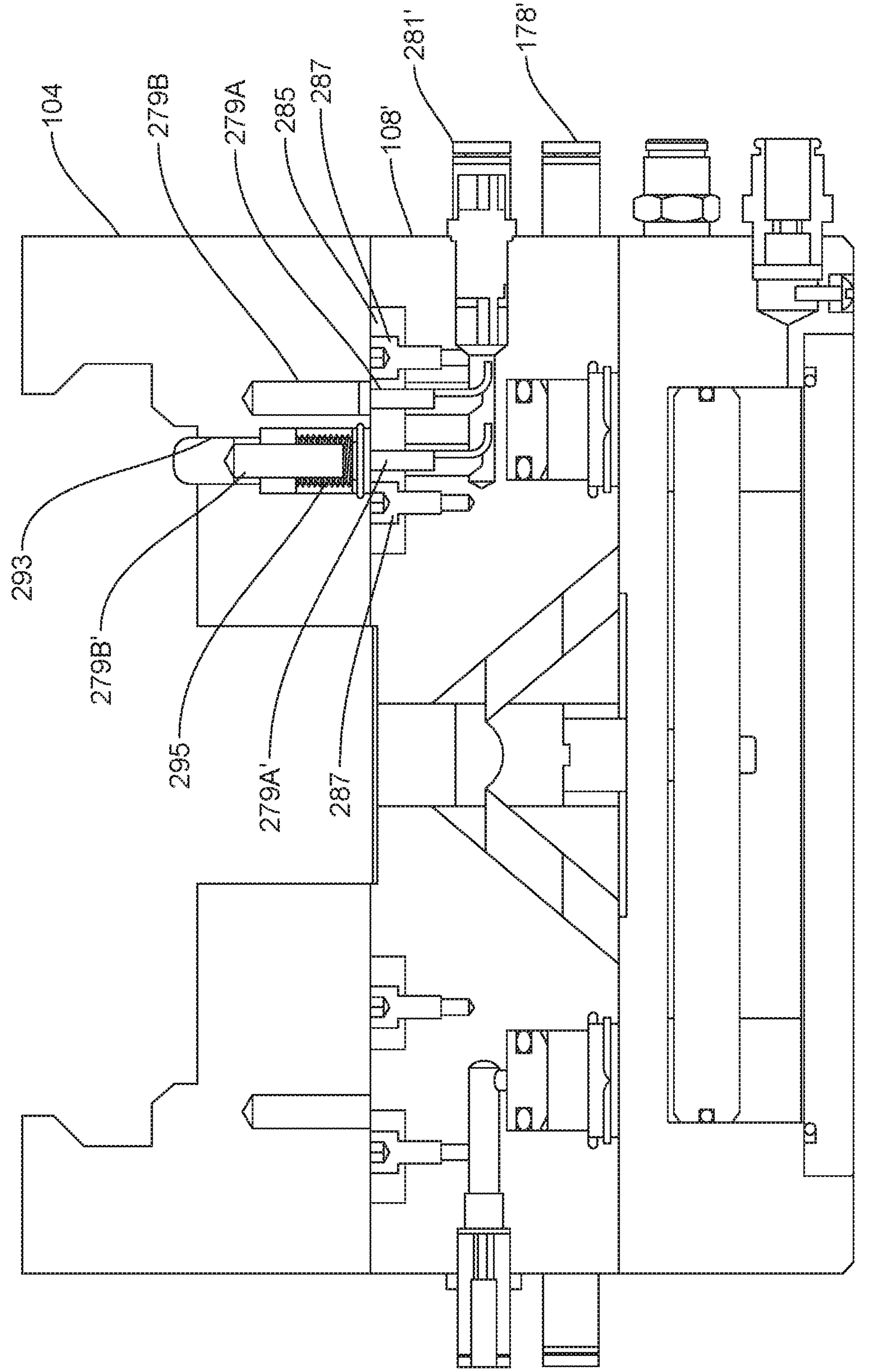
Figure 13:
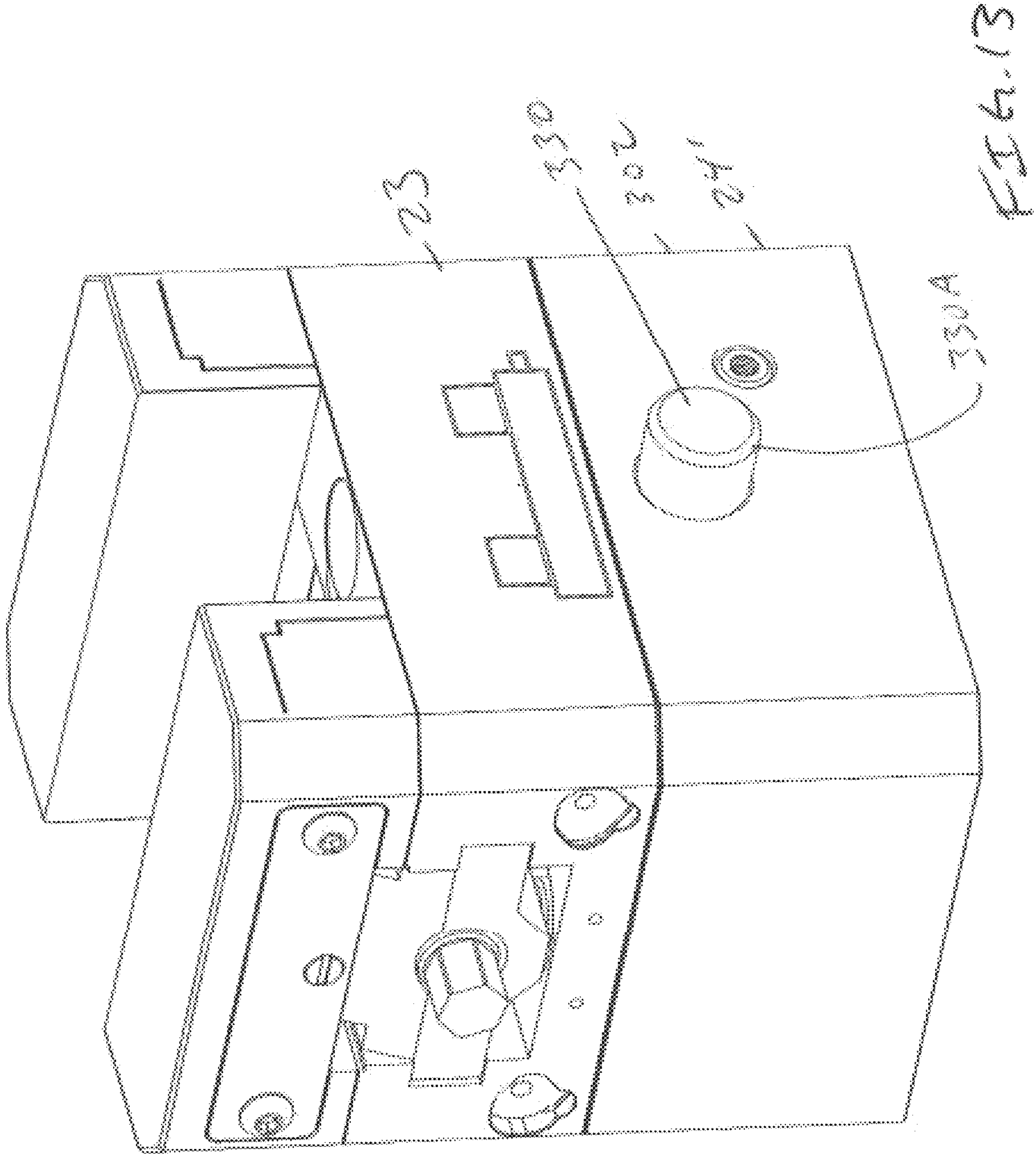
FIG. 13 is a perspective view of a fixture mounted to a fixture support.

Referring FIGS. 12E and 12F, the gripping device 28'" also uses proximity sensors 279 to sense the proper mounting of the jaws 104 on the jaw support 108'. However, in this embodiment it is shown that a second proximity sensor 279' can be provided to sense a workpiece in contact with the jaw 104. In this embodiment, both the proximity sensor 279 and the proximity sensor 279' are contactless. Each sensor 279 and 279' have a stationary portion 279A, 279A', such as a magnetically operated switch connected to connector 281', and a portion 279B, 279B', such as a magnet, that moves with the jaw 104. Proximity sensor 279 is similar to the previous embodiment and provides a signal when the magnet 279B is proximate the switch 279A when the jaw 104 is properly disposed on the jaw support 108'. However, magnet 279B' moves within jaw 104 being disposed within a guide aperture 293. The movable magnet 279B' moves when the workpiece is in contact with the jaw 104. In this embodiment, the magnet 279B' includes an end remote from and facing the switch 279A' that extends beyond a surface of the jaw 104 such that when the jaw 104 engages the workpiece, the magnet 279B' is displaced within the guide aperture 293 toward the switch 279A' is as to operate the switch 279A'. In this embodiment, a spring 295 biases the magnet 279B' away from the switch 279A' when the jaw 104 is not in contact with the workpiece.

FIGS. 13-24 illustrate a fixture support 24' used to support a fixture 23 such as a vise herein illustrated, which is configured to hold a workpiece not shown. The fixture support 24' includes a body 302 having spaced apart apertures 304 configured to receive portions of securing posts 306 of the fixture 23. A pair of retaining members 308 are rotably supported in the body 302. Each retaining member 308 includes a flange or projection 310 configured to engage one of the securing posts 306 when the retaining member 308 is in a first position ("locked position" FIGS. 15-17) and the securing post 306 is disposed in an associated aperture 304. In the locked position, ends 338 of each of the retaining member 308 engages a portion 340 of the control pin 330, which inhibits rotation of the retaining members 308 thus maintaining the projections 310 in each of the securing posts 306.

Each retaining member 308 is rotatable to a second positon ("loading/unloading position" FIGS. 19 and 20) wherein the securing posts 306 is removed from each associated aperture 304.

Figure 14:
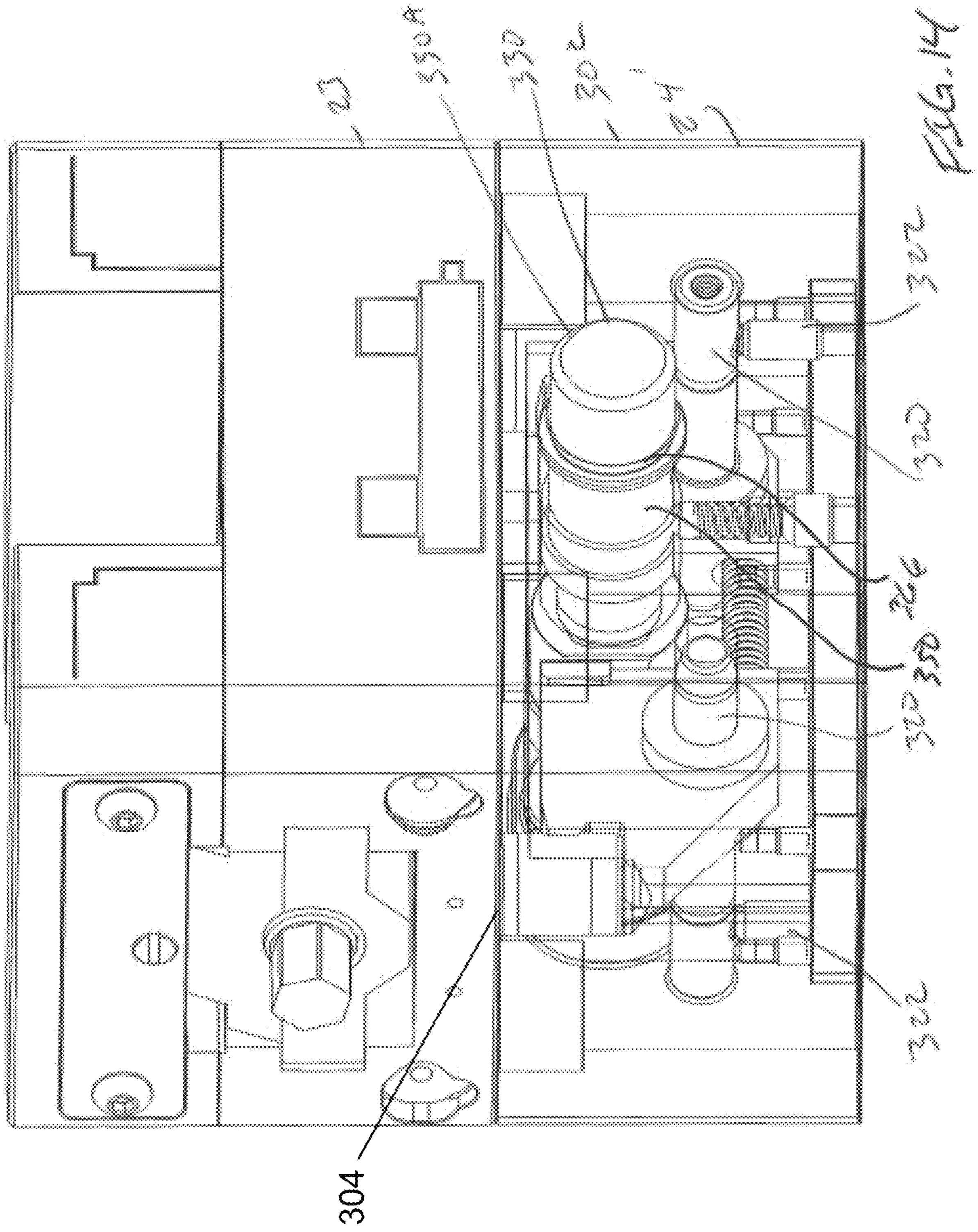
FIG. 14 is a schematic perspective view of the fixture mounted to the fixture support.
Figure 15:
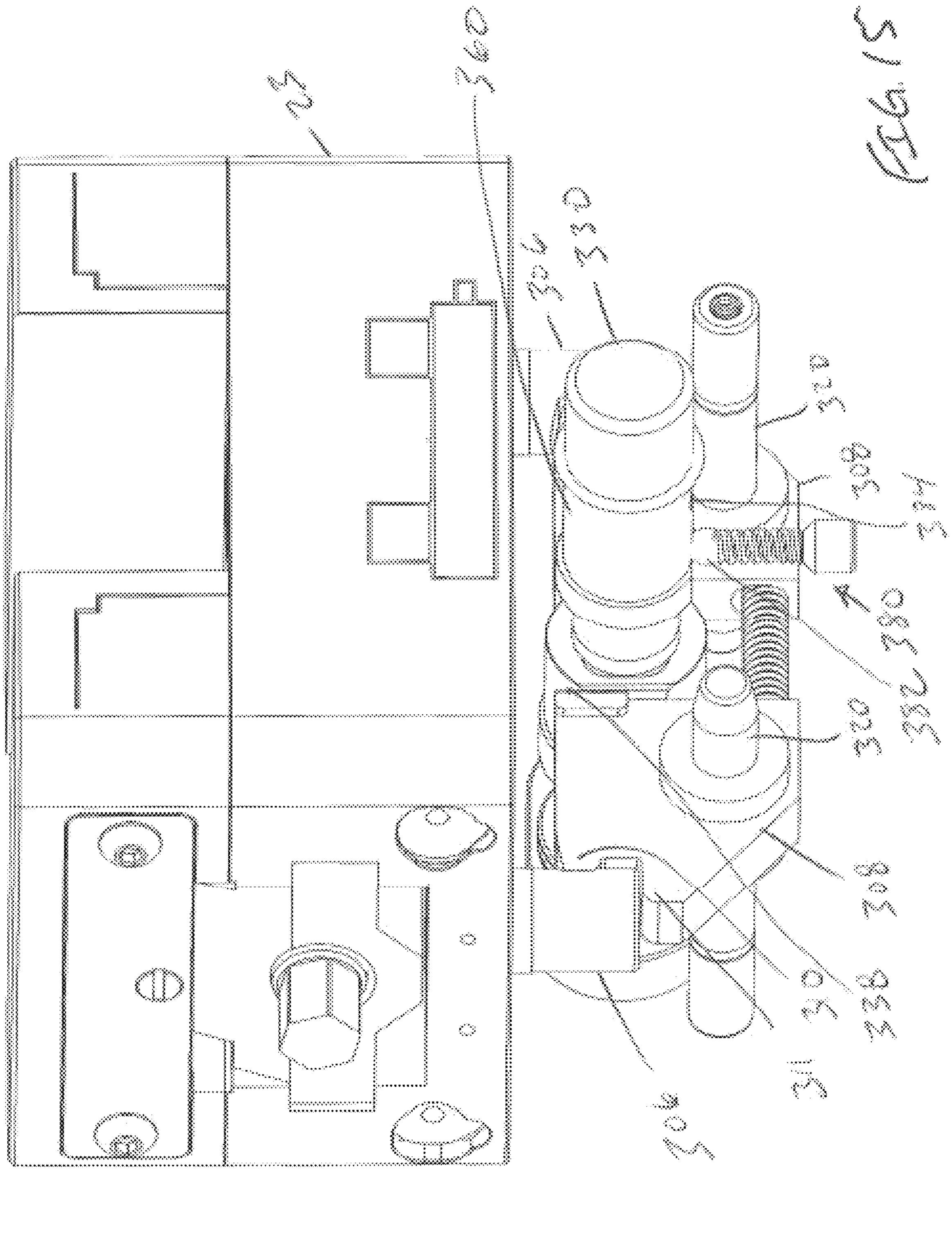
FIG. 15 is a perspective view of the fixture mounted to the fixture support with parts removed.
Figure 16:
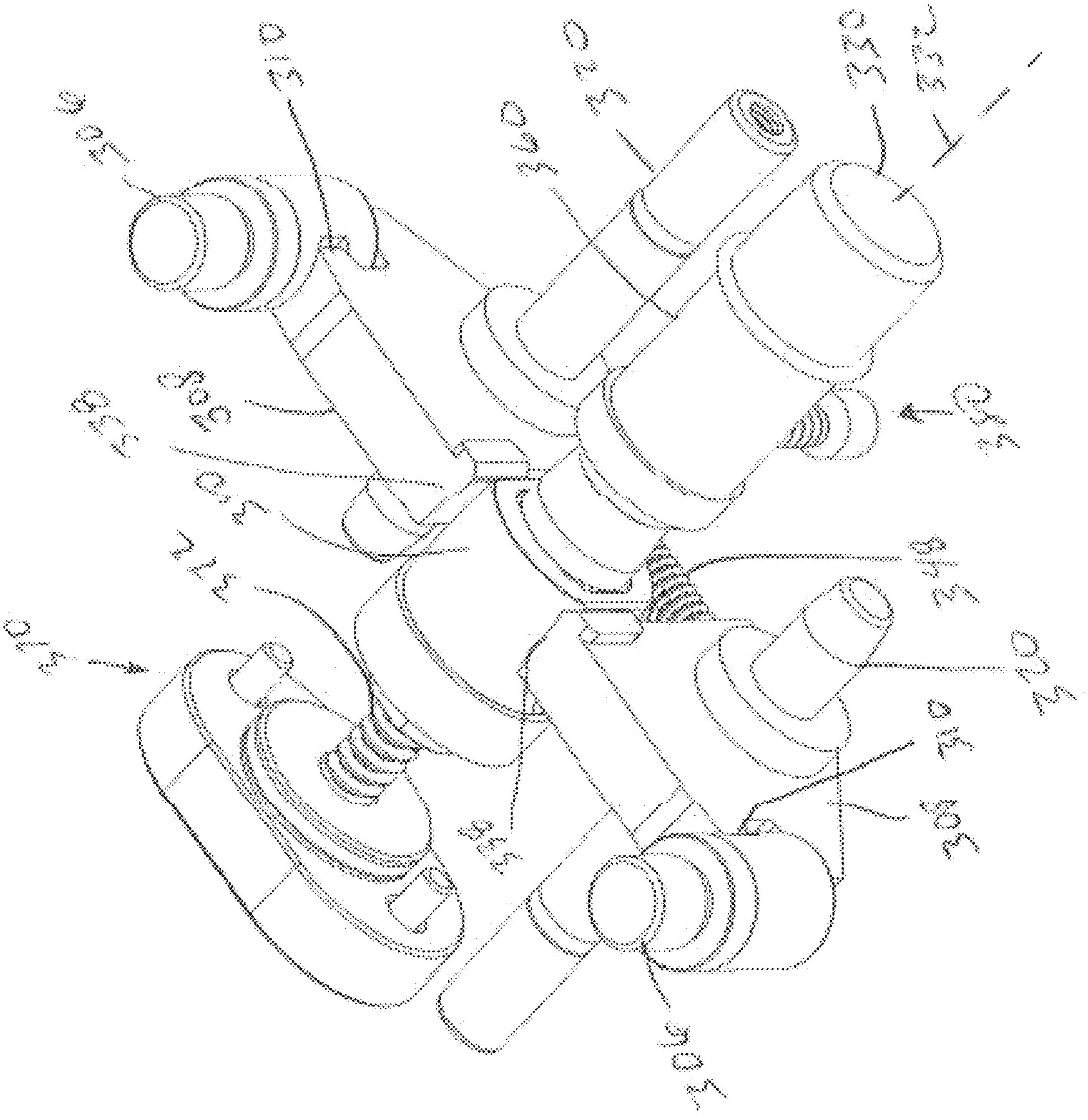
FIGS. 16 and 17 are perspective views of the fixture support with parts removed.
Figure 17:
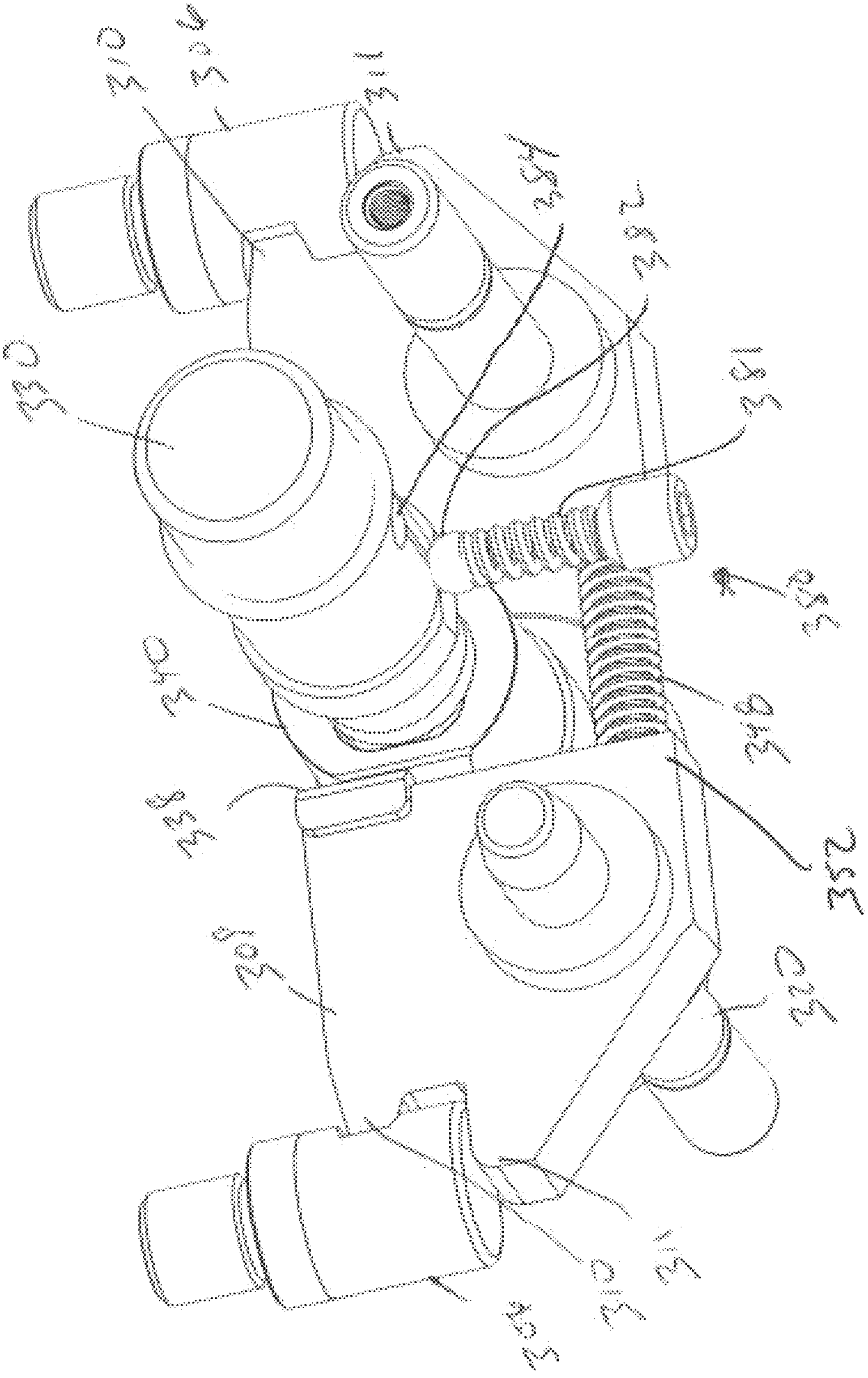
Figure 18:
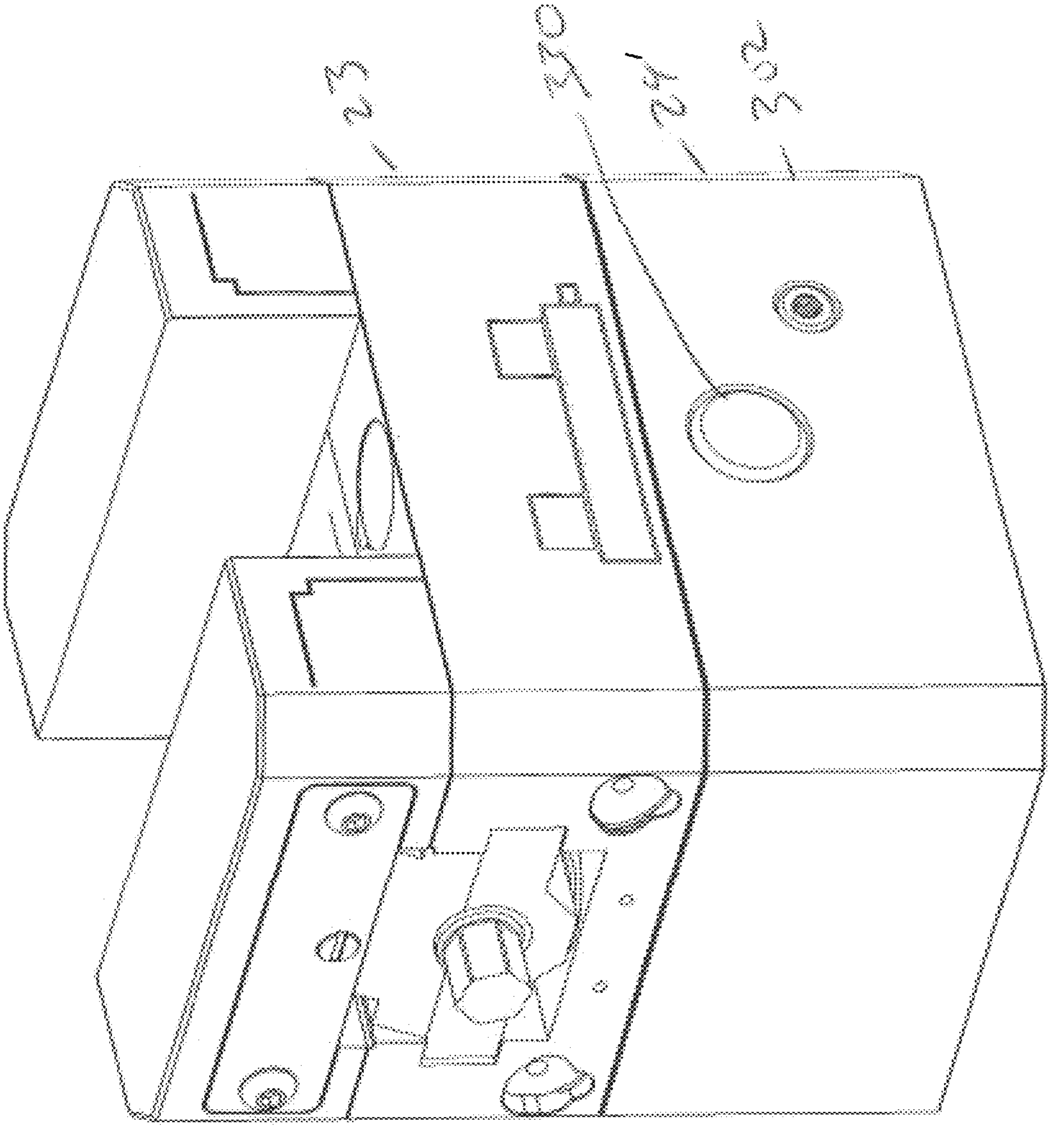
FIG. 18 is a perspective view of the fixture mounted to the fixture support.
Figure 19:
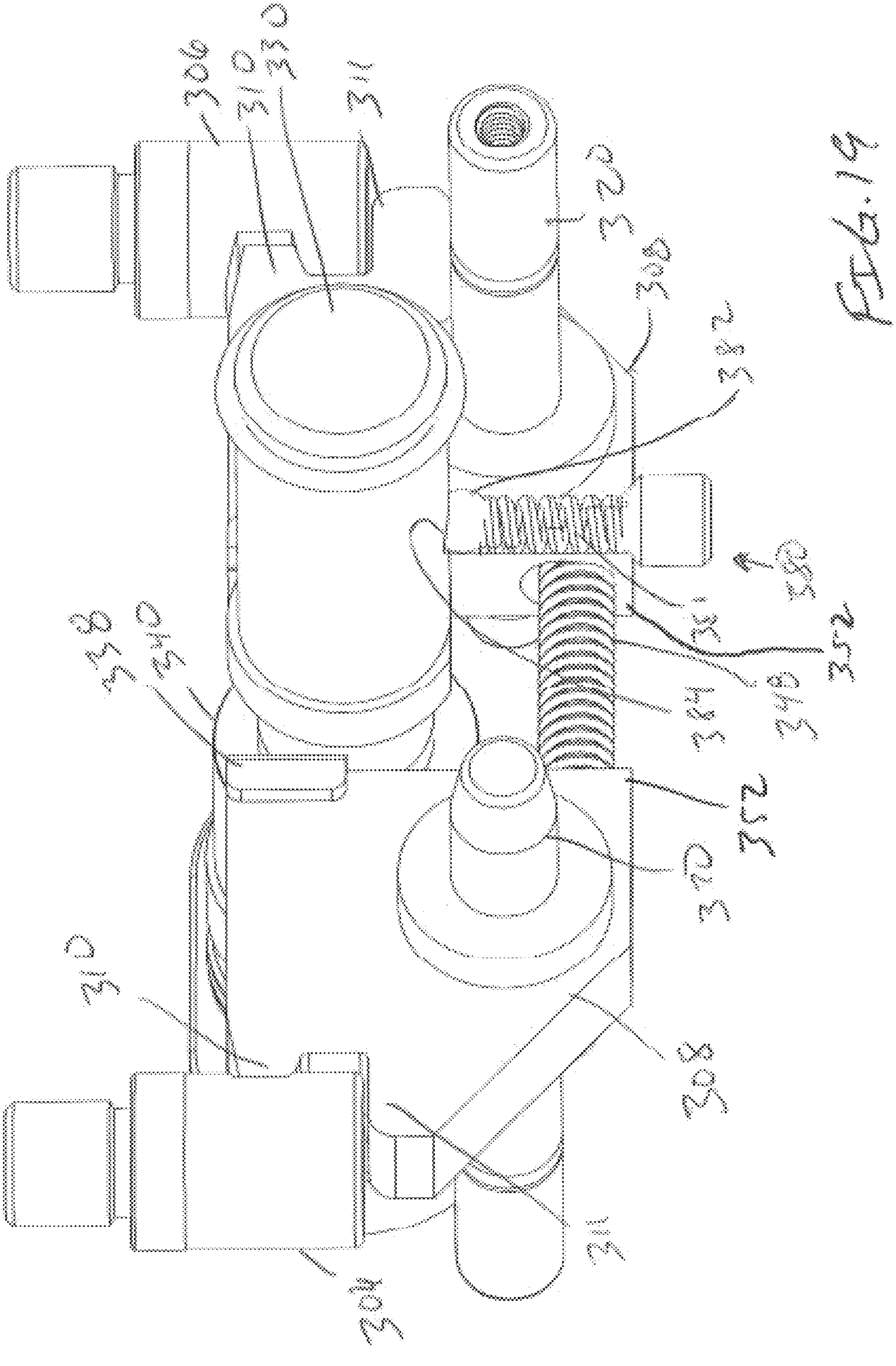
Figure 2D:
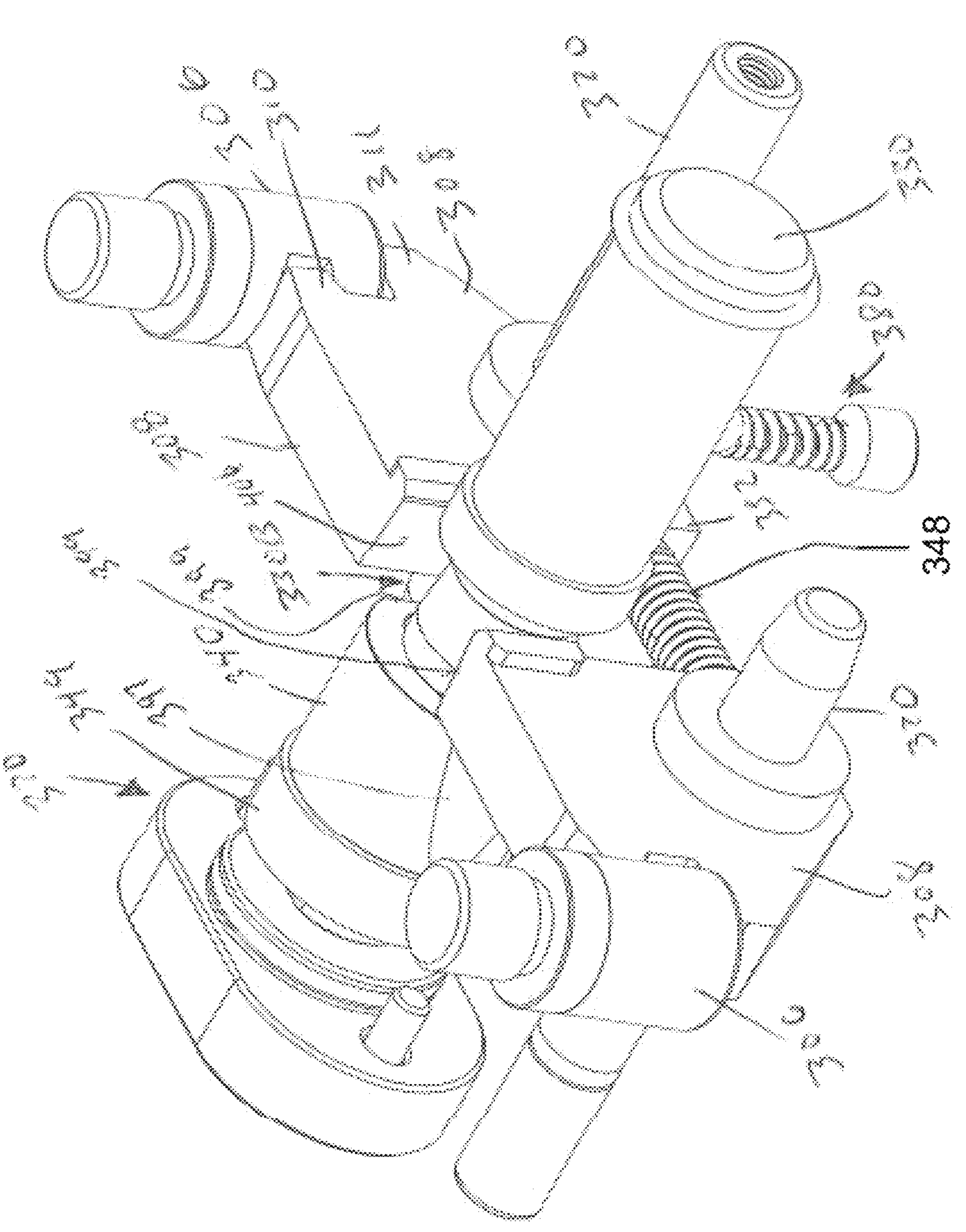

Each retaining member 308 is configured so as to freely rotate on a support shaft 320 that in turn is secured within the body 302 being held in place with suitable fasteners such as set screws 322 (FIG. 14). As appreciated by those skilled in the art, other forms of mounting the support shafts 320 to the body 302 can be used.

At least one control pin 330 is slidable in the body 302 so as to allow the retaining members 308 to remain in a given position or to move or allow the retaining members 308 to move to or from a given position. In this embodiment, a single control pin 330 is used being disposed in between the retaining members 308. The control pin 330 is displaceable along a longitudinal axis 332 whereby different portions of the control pin 330 are positioned adjacent the retaining members 308 so as to control or allow movement thereof. The longitudinal axis 332 is disposed in the body 302 so as to be substantially parallel to the axis of rotation of each of the retaining members 308. As appreciated by those skilled in the art, separate control pins can be used, one for each of the retaining members 308; however, this would increase the complexity of the fixture support 24' and typically would require simultaneous operation so as to release or engage the securing post 306. A single control pin 330 is thus preferable.

Figure 24:
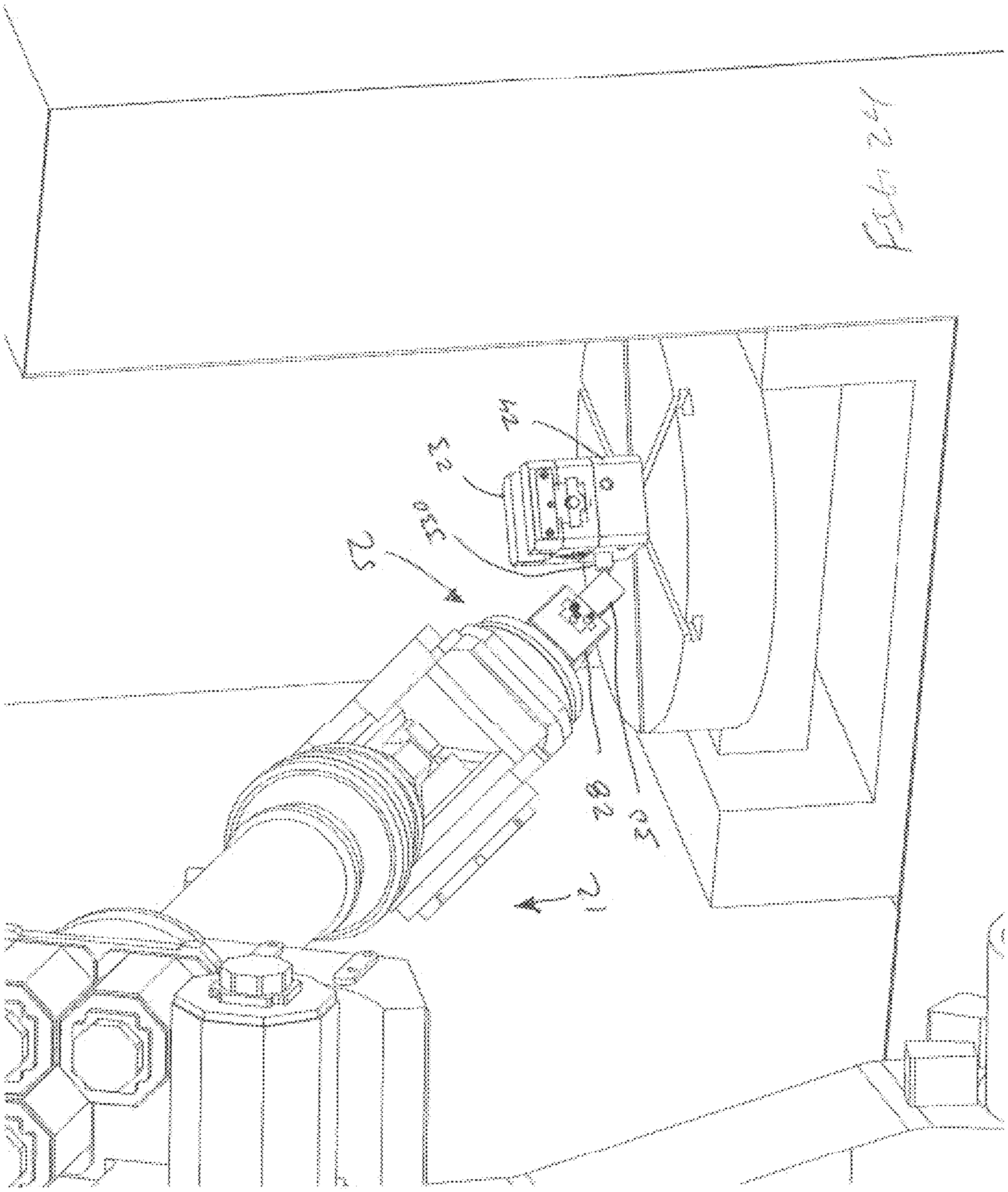
FIG. 24 is a perspective view of the processing area.
Figure 25:
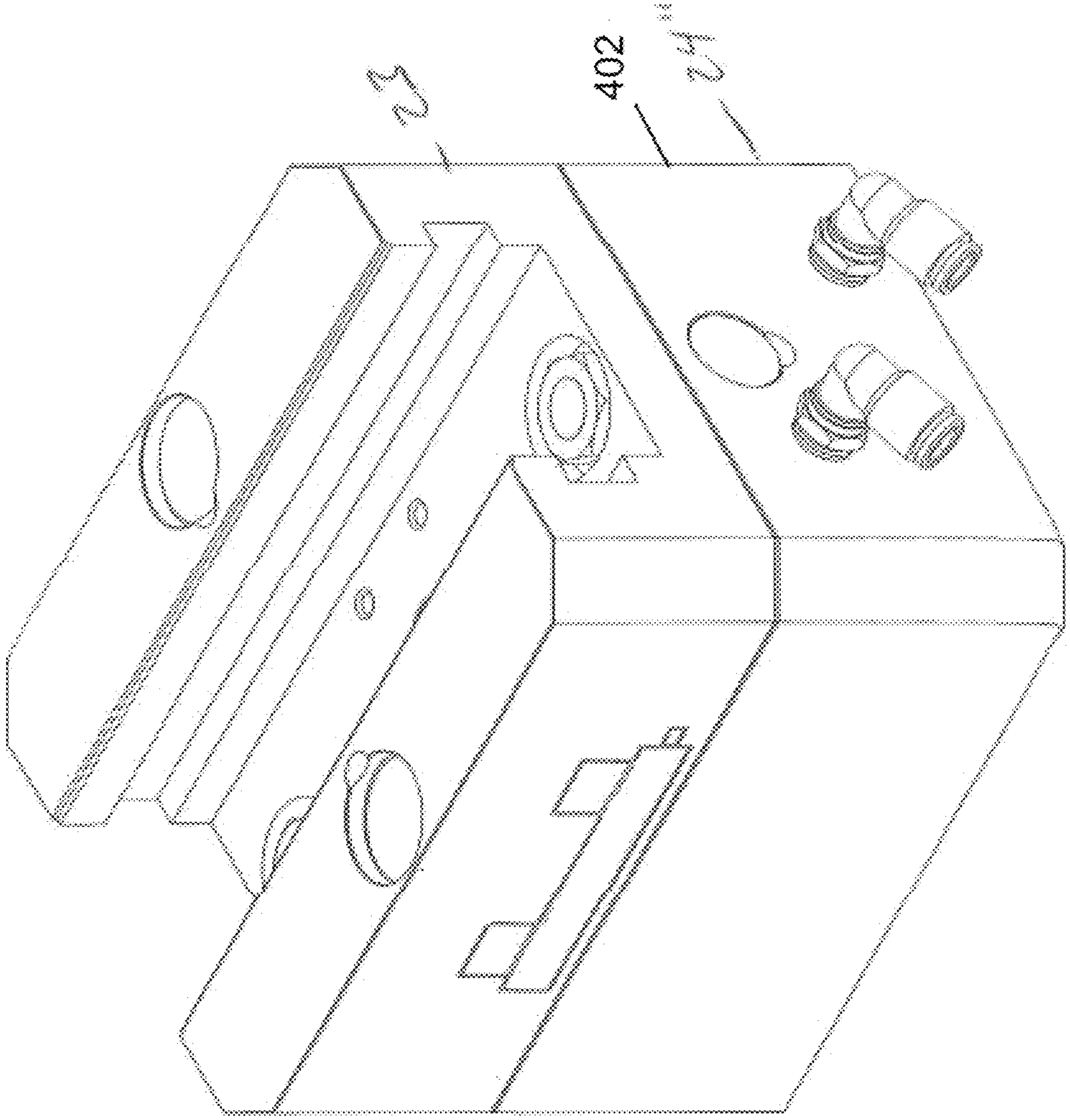
FIG. 25 is a perspective view of the fixture mounted to a second embodiment of a fixture support.
Figure 26:
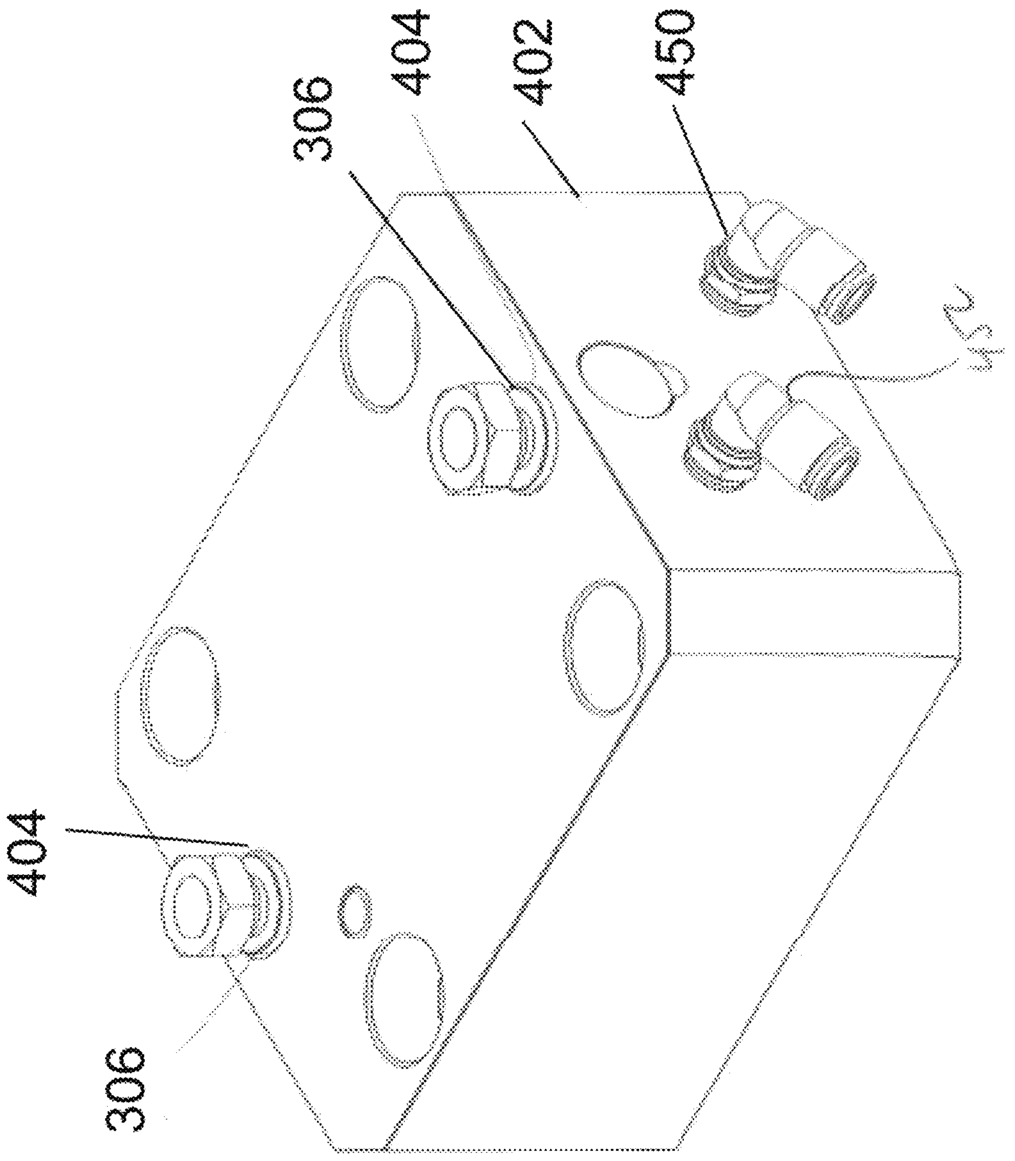
FIG. 26 is a perspective view of the fixture support of FIG. 25.

The control pin 330 is disposed in the body 302 such that an end portion 330A preferably extends outwardly from a side surface 336 of the body in the locked position wherein the retaining members 308 engage each of the securing posts 306 so as to hold the fixture 23 securely upon the fixture support 24'. To eventually obtain the loading/unloading position illustrated in FIGS. 21-23, the control pin 330 is slidable inwardly into the body 302 so that a relief portion or portion of reduced diameter 330B of the control pin 330 is adjacent ends 338 of the retaining members 308. Since in this position the fixture 23 is still mounted upon the fixture 24' where the securing posts 306 extend into each aperture 304 and the projections 310 engage each securing post 306, the retaining members 308 do not rotate because of contact between the securing posts 306 and each projection 310. This position, where the control pin 330 has been pushed in but the fixture 23 is still on the fixture support 24', is called herein the "release position" because the control pin 330 is no longer preventing rotation of the retaining members 308. FIG. 24 illustrates the robot 12 operating the control pin 330 so as to release the fixture 23 from the fixture support 24.

The control pin 330 is supported on the body 302 for slidable movement with a portion 350 received in a bore 366. At an end opposite the portion 350, the control pin 330 is supported with a washer 349. A bias assembly 370 can include a biasing spring 372 that urges the control pin 330 toward the locked position. However, a holding mechanism 380 is provided to hold the control pin 330 in the release position. In this embodiment, the holding mechanism 380 is a detent mechanism that includes a spring 381 having an element 382 received in a recess 384, herein provided in the control pin 330. When the control pin 330 is displaced to the release position, the element 382 is received in the recess 384 thereby holding the axial position of the control pin 330 against the force of the spring 372.

In the release position, each of the securing posts 306 is allowed to be lifted or separated from the corresponding apertures 304. As the securing posts 306 depart each aperture 304, each of the securing posts 306 further rotate, or allow the retaining members 308 to rotate so that the ends 338 move closer together. Eventually each retaining member 308 disengages from each securing post 306 when the securing post 306 exits or almost has completely exited the aperture 304. In one embodiment, it is preferable to rotate the retaining members 308 further such that each projection 310 sufficiently clears the aperture 304, or that the retaining members 308 are prevented from rotating back such that one or both projections 310 partially block the apertures 304, which could prevent the securing posts 306 from being inserted. To prevent this from occurring, the retaining members 308 can be biased so as to urge the retaining members 308 to the loading/unloading position. Various spring devices can be used to achieve such a biasing force. In the embodiment illustrated, a spring 348 is disposed between portions 352 of the retaining members 308. Spring 348 urges the portions 352 away from each other when the portion 340 is no longer present between ends 338.

Figure 22:
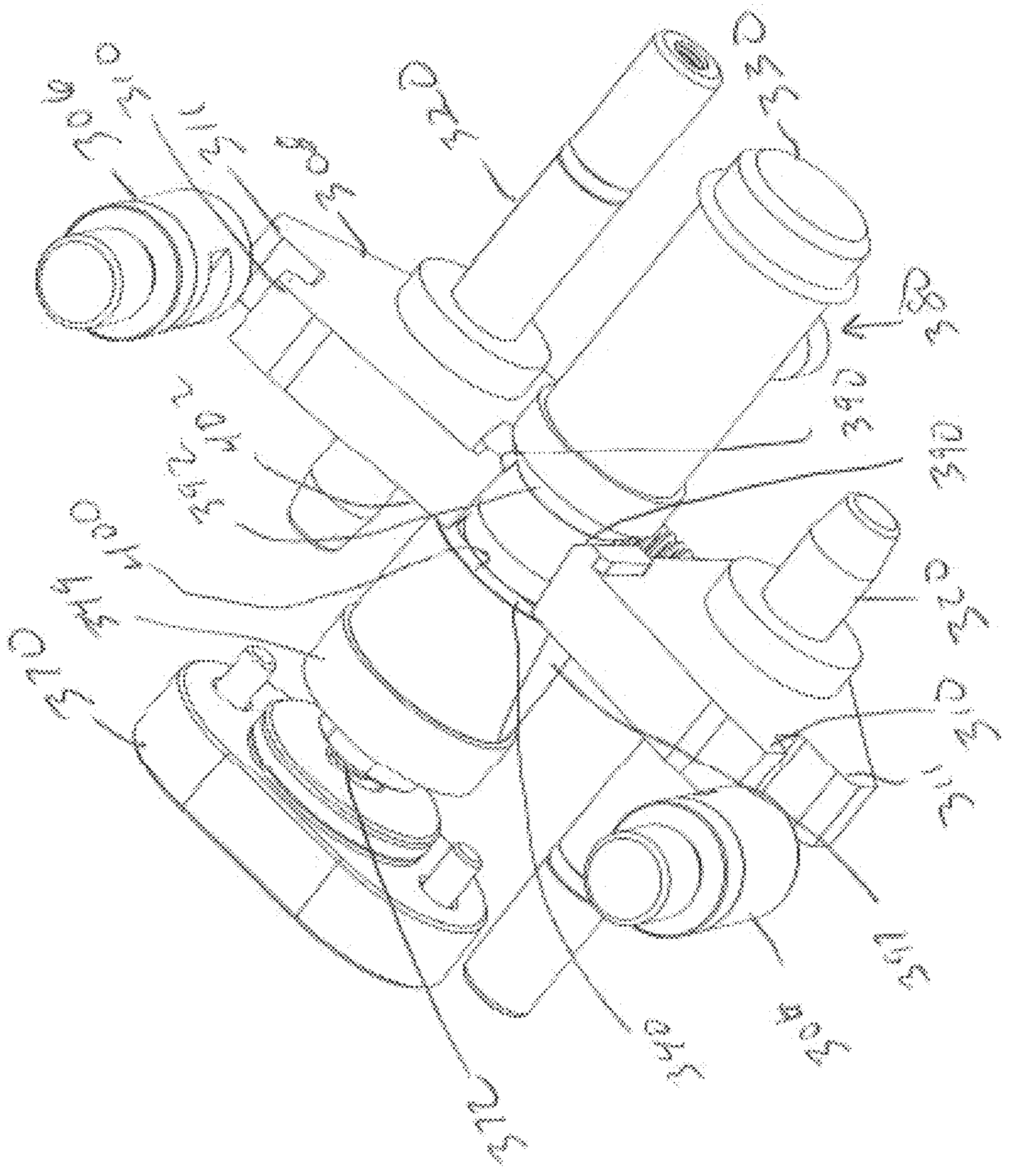
FIGS. 22 and 23 are perspective views of the fixture support with parts removed.
Figure 23:
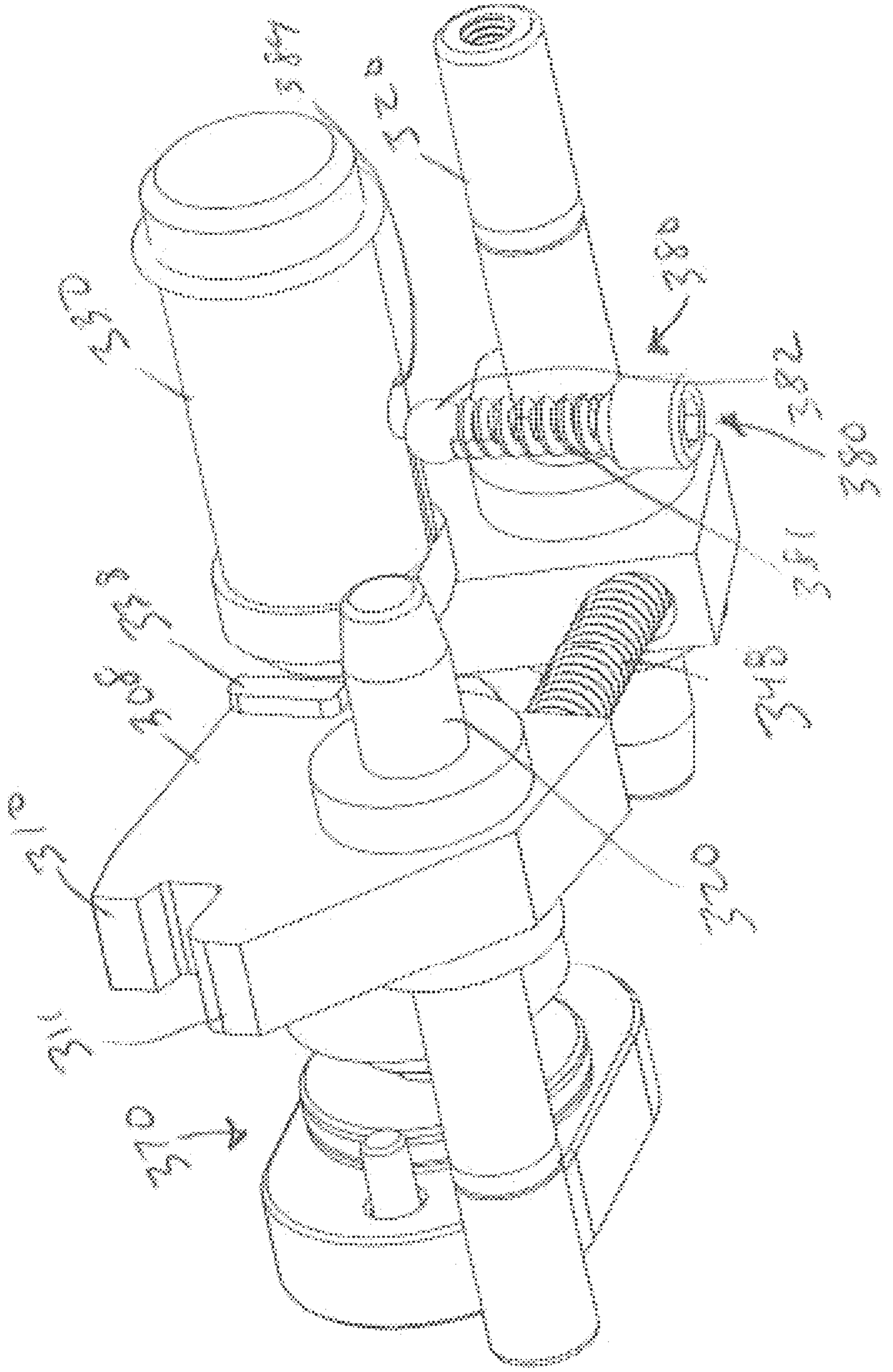

Referring to FIG. 22, at least one and preferably each of the retaining members 308 includes a drive flange 390 that can come into selective engagement with an annular flange 392 of the control pin 330. In particular, when the fixture 23 is lifted further away from the fixture support 24' such that the securing posts 306 further rotate the retaining members 308, each of the drive flanges 390 contact the annular flange 392 of the control pin 330 driving it outwardly with respect to the body 302. The driving force developed by the driving flanges 390 upon the annular flange 392 is sufficient to overcome the holding mechanism 380 thereby causing removal of the element 382 from the recess 384. However, although the spring 372 is urging the control pin 330 out of the body 302, further displacement of the control pin 330 out of the body 302 is inhibited by contact of portion 340 with each of the retaining members 308. In particular, an annular surface 400 of the portion 340 contacts surfaces 402 of the retaining members 308 because the ends 338 are positioned sufficiently close enough due to rotation of the retaining members 308. Such contact is present in the loading/unloading position.

When the fixture 23 is lowered upon the fixture support 24' in the loading/unloading position, the securing posts 306 enters the spaced apart apertures 304 and come into contact with portions 311 of the retaining members 308 below the projections 310. Further lowering of the securing posts 306 in the apertures 304 rotate each of the retaining members 308 causing the ends 338 to move away from each other and the projections 310 to come into engagement with the securing posts 306. With sufficient rotation, the portion 400 is no longer in engagement with the surfaces 402 of the retaining members 308 thereby allowing the control pin 330 to move further outwardly and where the portion 340 comes into further engagement with the ends 338. Preferably, portion 340 has inclined surfaces 397 relative to the longitudinal axis 332 of the control pin 330 that come into engagement with complementary inclined surfaces 399 provided on ends 338. When the fixture 23 is lowered so as to properly rest upon the fixture support 24', the control pin 330 and the retaining members 308 are in the locked position.

Although portion 340 can be rigidly secured to the control pin 330, in an advantageous embodiment, the portion 340 is allowed to move a limited amount transversely with respect to axis 332. Such movement of the portion 340 ensures that balanced forces are provided on the ends 338 thereby ensuring that substantially balanced forces are being applied to each of the securing posts 306.

Figure 27:
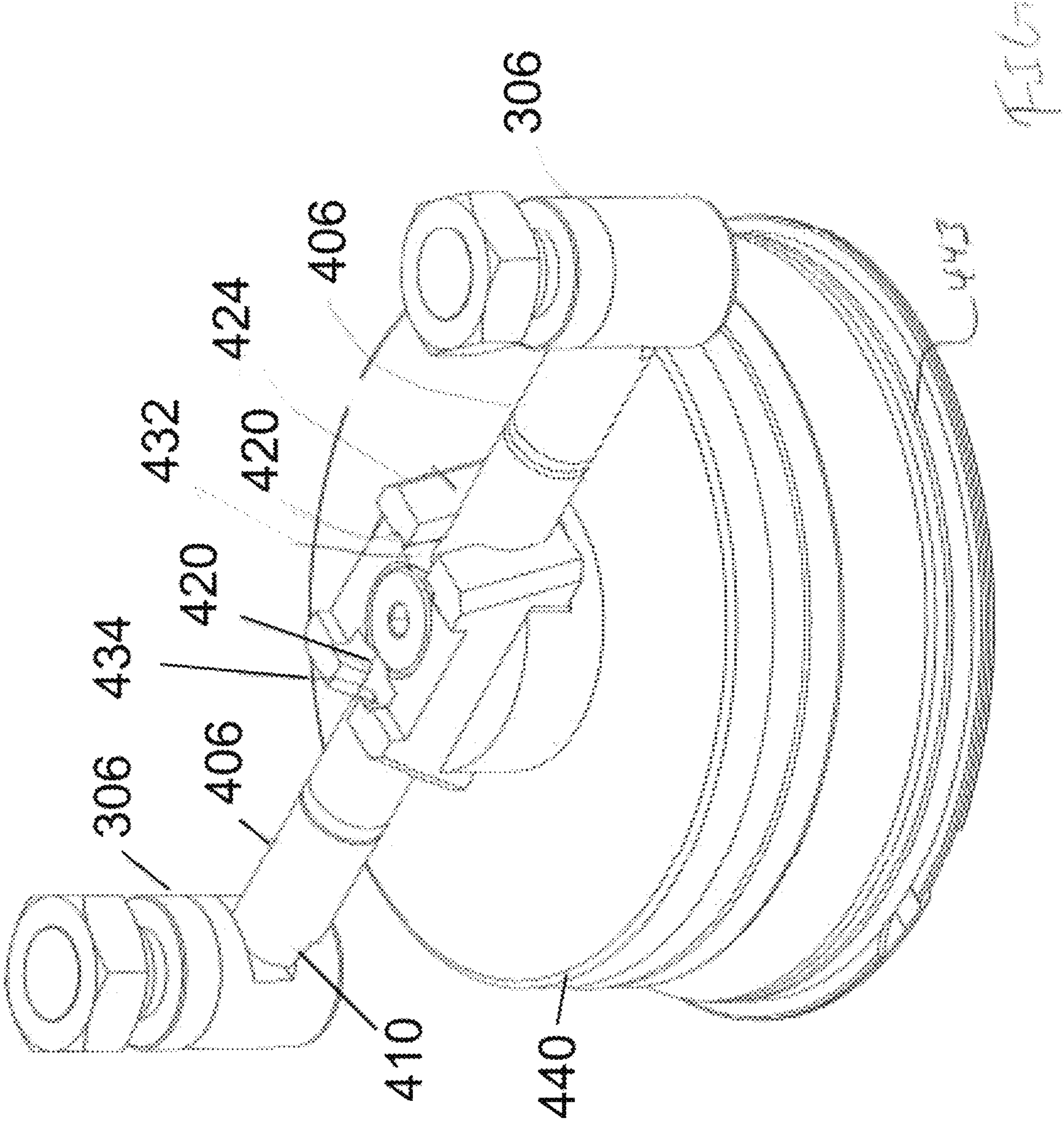
FIG. 27 is a perspective view of the fixture support of FIG. 25 with parts removed.
Figure 28:
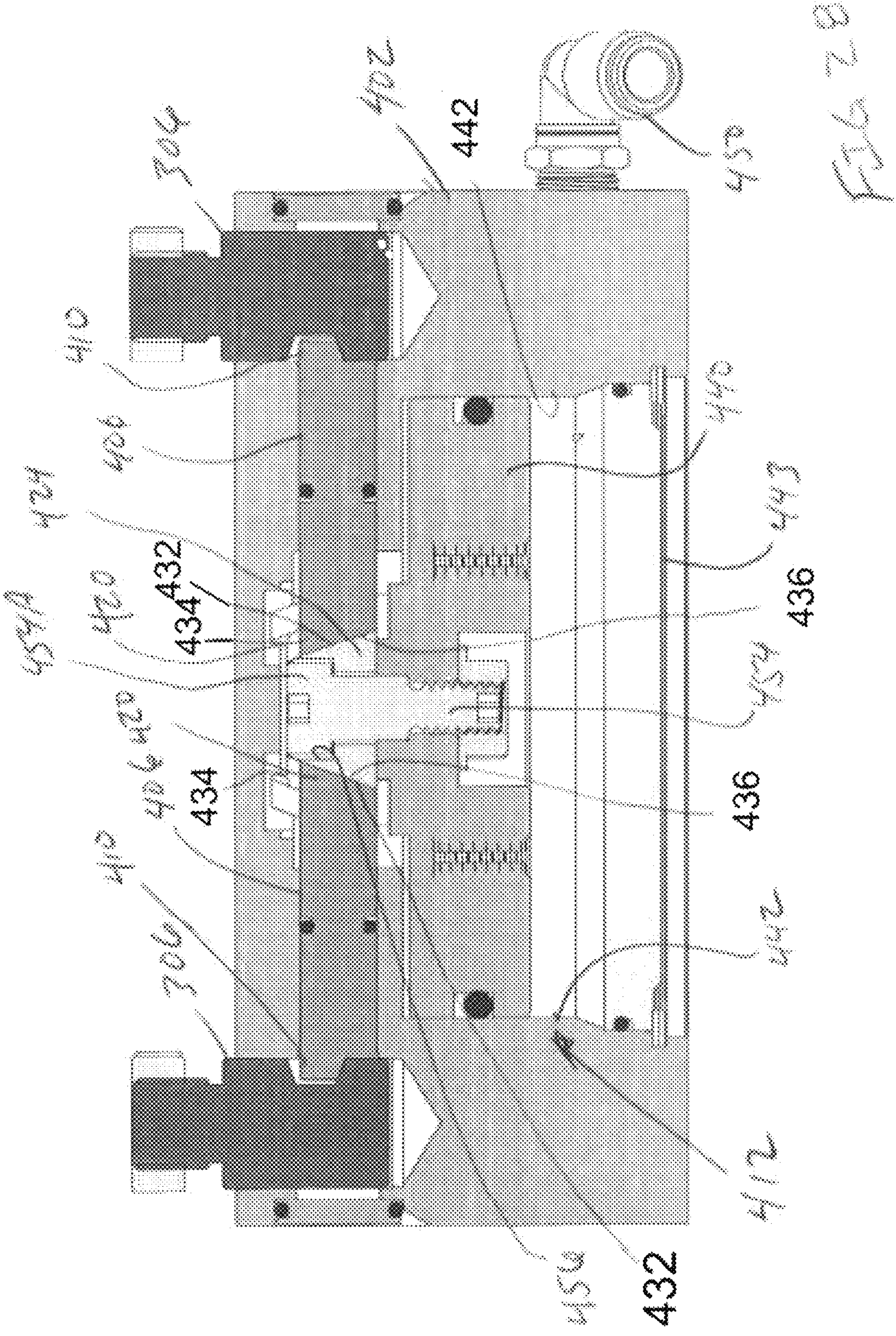
FIG. 28 is a sectional view of the fixture support of FIG. 25.
Figure 29:
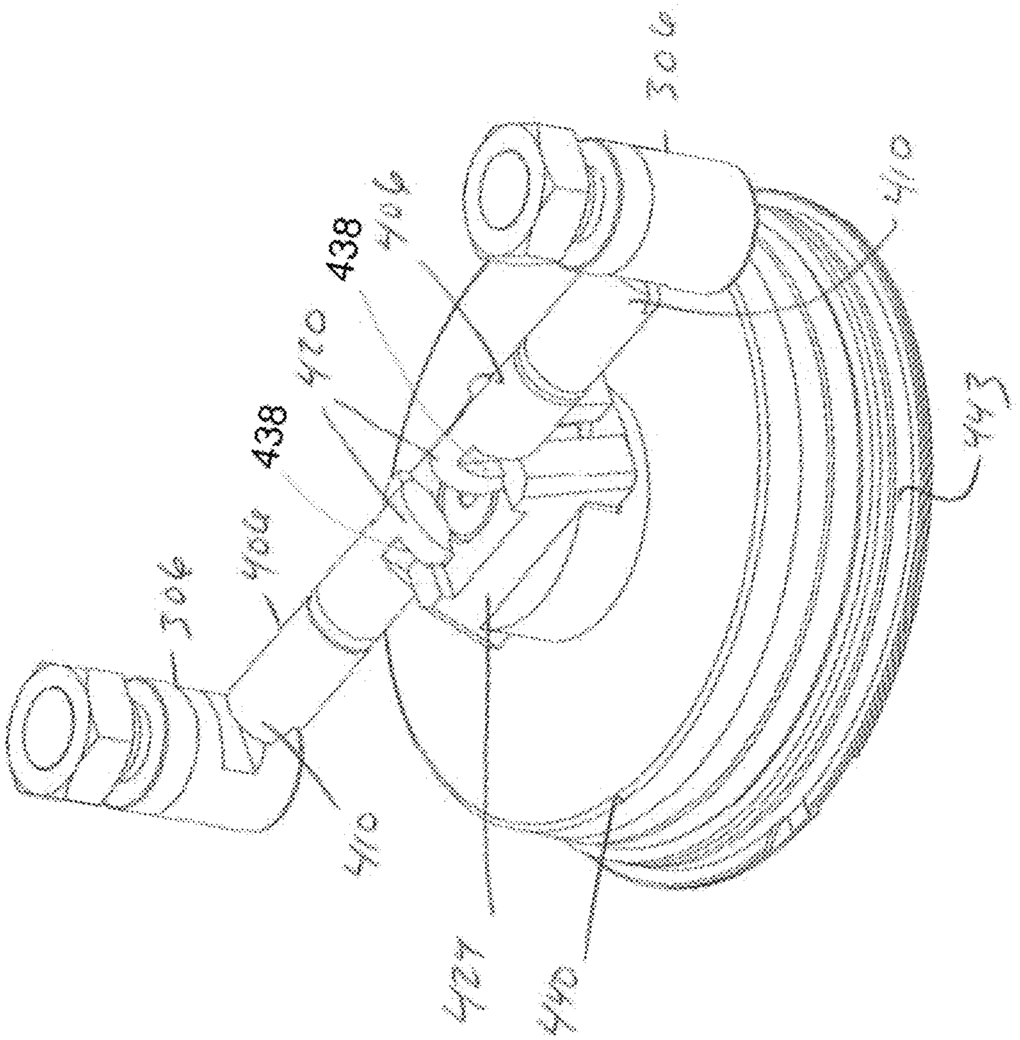
FIG. 29 is a perspective view of the fixture support of FIG. 25 with parts removed.
Figure 30:
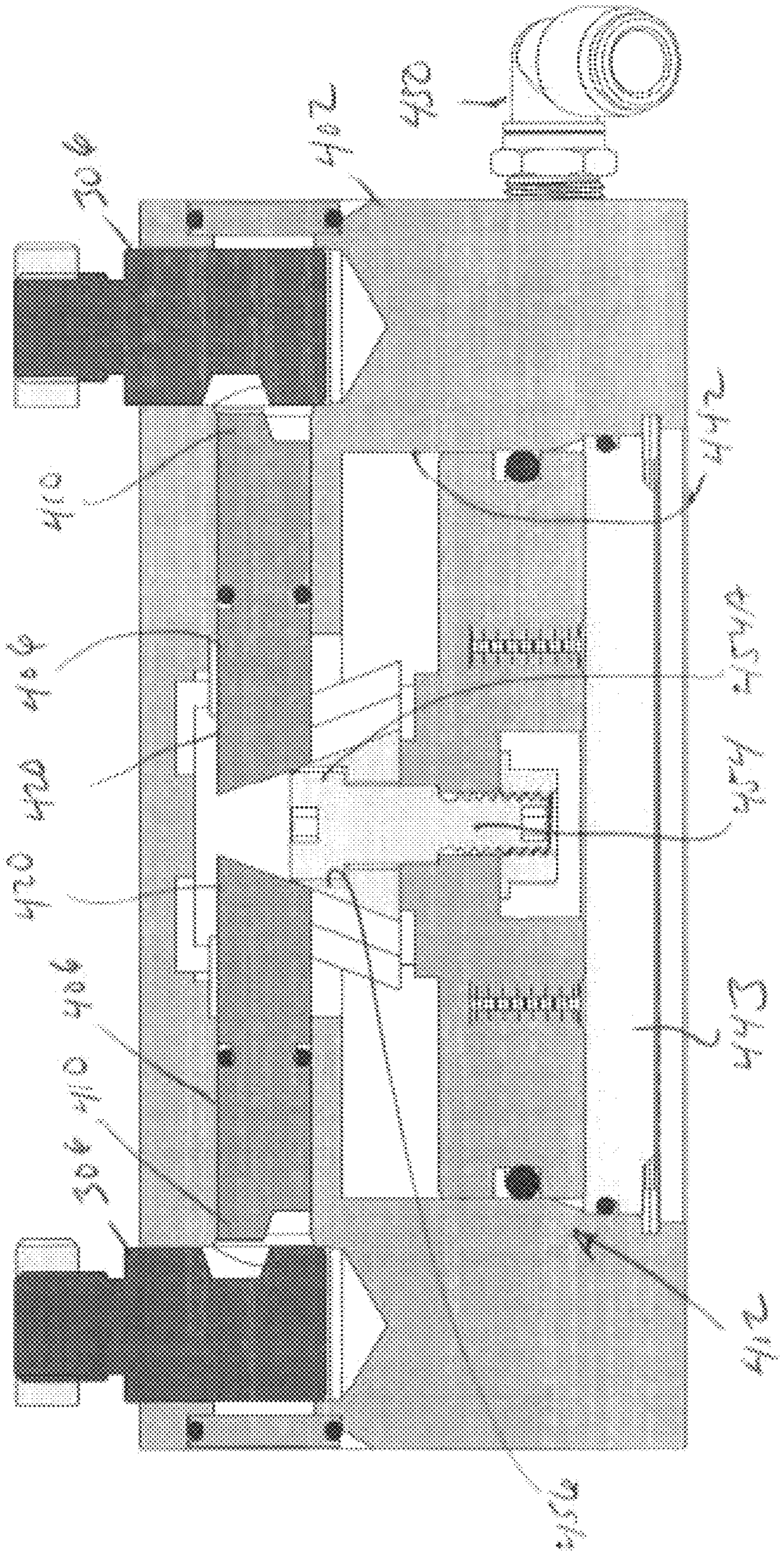
FIG. 30 is a sectional view of the fixture support of FIG. 25.
Figure 37:
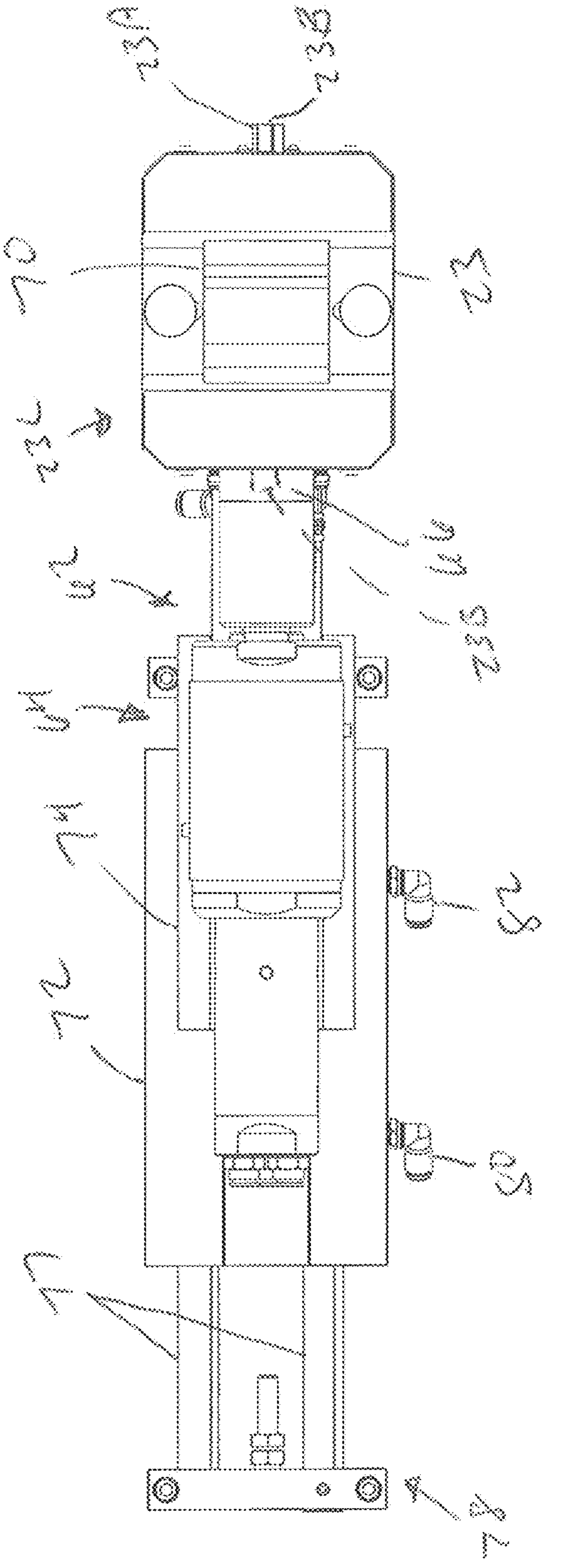
FIGS. 37 and 38 are enlarged perspective views of the fixture with parts removed.

FIGS. 25-30 illustrate another fixture support 24" used to support a fixture 23 such as a vise herein partially illustrated. The fixture support 24" includes a body 402 having spaced apart holes 404 configured to receive portions of securing posts 306. Referring to FIG. 27, a pair of locking slides 406 is configured for sliding movement in the body 402. Each locking slide 406 has a first end 410 configured to engage a portion of the securing post 306 when the securing post 306 is disposed in one of the holes 404. An actuator 412 is configured to drive the locking slides 406 toward and away from each other. Each locking slide 406 includes a second end 420. The second ends 420 are disposed in the body 402 closer to each other than the first ends 410. A drive member 424 is disposed between the second ends 420 and is configured to drive the locking slides 406 such that the first ends 410 extend into each corresponding hole 404 and engage one of the securing posts 306 to secure the fixture 23 to the body 402. At least one actuator 412 is coupled to the drive member 424 and operated to selectively displace the drive member 424.

The drive member 424 has inclined surfaces 432, 434 on each side that slidably engaged surfaces 436, 438 of the locking slides 406. In particular, sliding engagement of surfaces 432, 436 between the drive member 424 and each of the locking slides 406 causes the locking slides 406 to move away from each other with movement of the drive member 424 upwardly in FIG. 28, while sliding engagement of the surfaces 434, 438 of the drive member 424 and the locking slides 406 with movement of the drive member 424 downwardly causes the locking slides 406 to move toward each other. Like the actuators described above, the actuator 412 includes the first portion coupled to the drive member 424 and the second portion that the first portion moves relative thereto. In the embodiment illustrated, the actuator 412 comprises a fluid operated actuator having a piston 440 and a chamber 442 formed in the body 402. An end cap 443 seals the chamber 442. Fluid pressure from a first port 450 causes movement of the piston 440 and the drive member 424 to move so as to drive the locking slides 406 away from each other. Similarly, fluid pressure provided to port 452 causes the piston 440 and drive member 424 to move in the opposite direction thereby driving the locking slides 406 towards each other.

In a manner similar to coupling of the drive member 200 to the piston 210, the drive member 424 is also coupled to the piston 440 so as to allow slight radial (translational) relative to a longitudinal axis of movement of the piston 440 and/or rotational movement relative to an axis that is orthogonal to movement of the piston 440. In this embodiment, a fastener 454 is secured to the drive member 424 and has an enlarged head 454A that engages the piston 440, herein being disposed in a recess 456 formed in the drive member 424. The recess 456 is slightly larger than the head 454A and the fastener 454 is secured to the drive member such that the enlarged head 454A can move relative to the drive member 424. Again, this coupling ensures that the forces between the drive member 424 and each of the locking slides 406 is substantially balanced and prevents any substantial torque from being developed that would tend to otherwise rotate the piston 440 within the cylindrical chamber 442.

FIGS. 31-32 illustrate drive 34 positioned so as to operate the fixture 23 for holding and releasing workpieces 70. Not shown in these figures is the surface 18 upon which the drive 34 and fixture 23 and/or fixture support 24 are mounted upon. Generally, drive 34 includes a moveable support 60 supporting a driving mechanism 62 herein exemplified as a motor 64 having an end 66 selectively coupled to the fixture 23 in a manner to cause operation thereof. In this embodiment, the fixture 23 comprises a vise having a vise screw 23A having an end 23B similar to that illustrated in FIG. 31 on the opposite side facing ends 66 of drive 34. End 66 includes a receiver 68 configured to receive the end of the vise screw 23A so as to rotate the vise screw 23A and operate opposing jaws 23C used to hold and release a workpiece 70.

The drive mechanism 62 is mounted on a moveable stage 72 using an adapter 74 if necessary to mount the drive mechanism 62 to the stage 72. The stage 72 is translatable along a longitudinal axis so as to displace the drive mechanism 62 into engagement with the vise screw 23A and release the vise screw 23A when desired. A suitable actuator (electric, pneumatic or hydraulic) is provided so as to displace the stage relative to a frame 78 that is supported on the work surface 18. In the embodiment illustrated, the actuator comprises an internal pneumatic actuator with chamber(s) formed in the stage 72. The stage 72 is movable on at least one rail 77 of the fixed stage 78, which extends through the stage 72. The rail(s) 77 each include an enlarged portion that is complementary to and disposed in the chamber so as to provide a portion of the chamber on each side of the enlarged portion. A port 80 is fluidly coupled to one of the chamber portions, while a port 82 is fluidly coupled to the other chamber portion. Selective pressurization of the ports 80, 82 causes each respective chamber portion volume to increase because of movement of the stage 72 on the rail(s) 77. Although illustrated with one fixture 23 and fixture support 24, it should be noted that multiple fixture supports 24 can be provided allowing the drive 34 to selectively operate different fixtures 23 mounted to the plurality of fixture supports 24. In one embodiment, the frame 78 can be mounted on rails 79 allowing the drive 34 to be positioned adjacent a selected fixture 23 to operate. A suitable actuator 79A (electric, pneumatic or hydraulic) schematically represented (for example, be of the form of the internal actuator in the stage 72) displaces the frame 78 and drive 34 in the directions indicated by double arrow 79B as desired.

Figure 33:
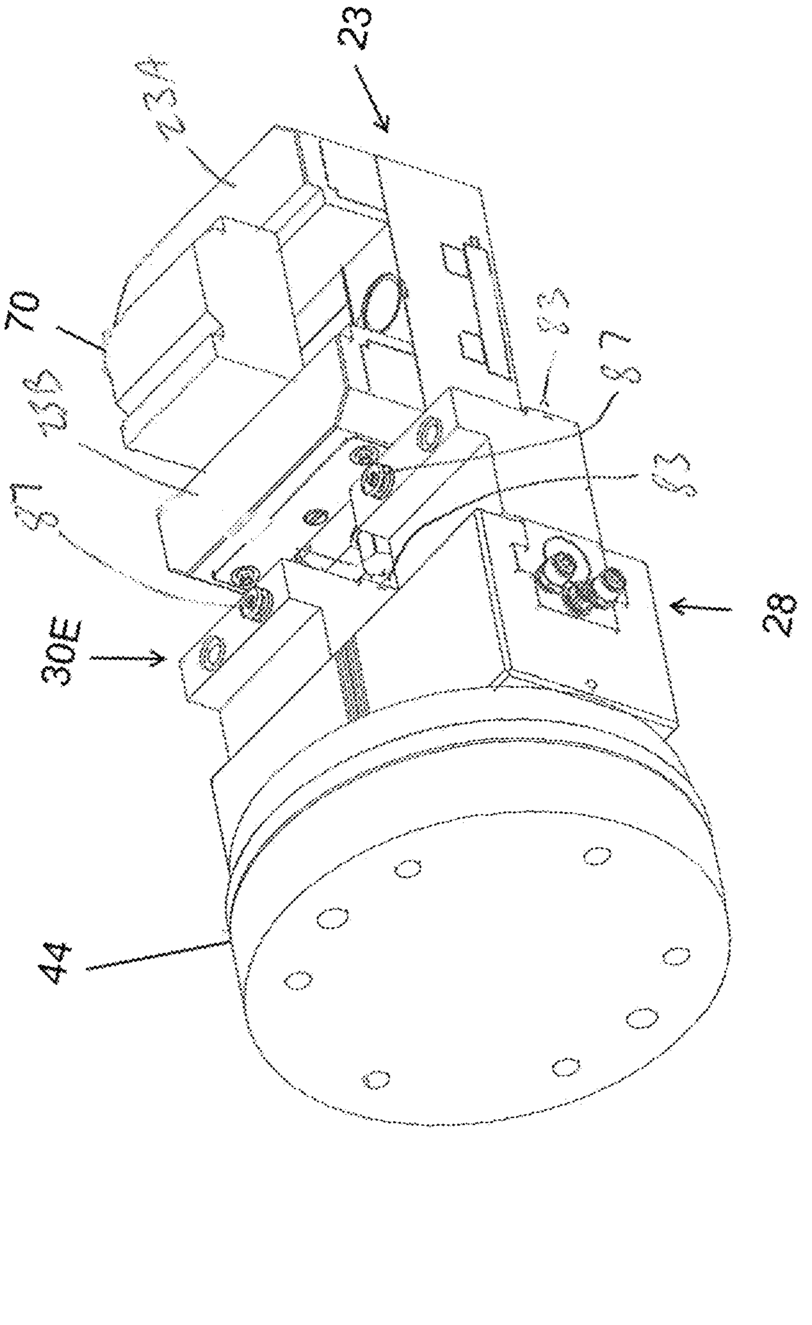
FIG. 33 is a perspective view of a fixture secured to a gripping assembly.
Figure 34:
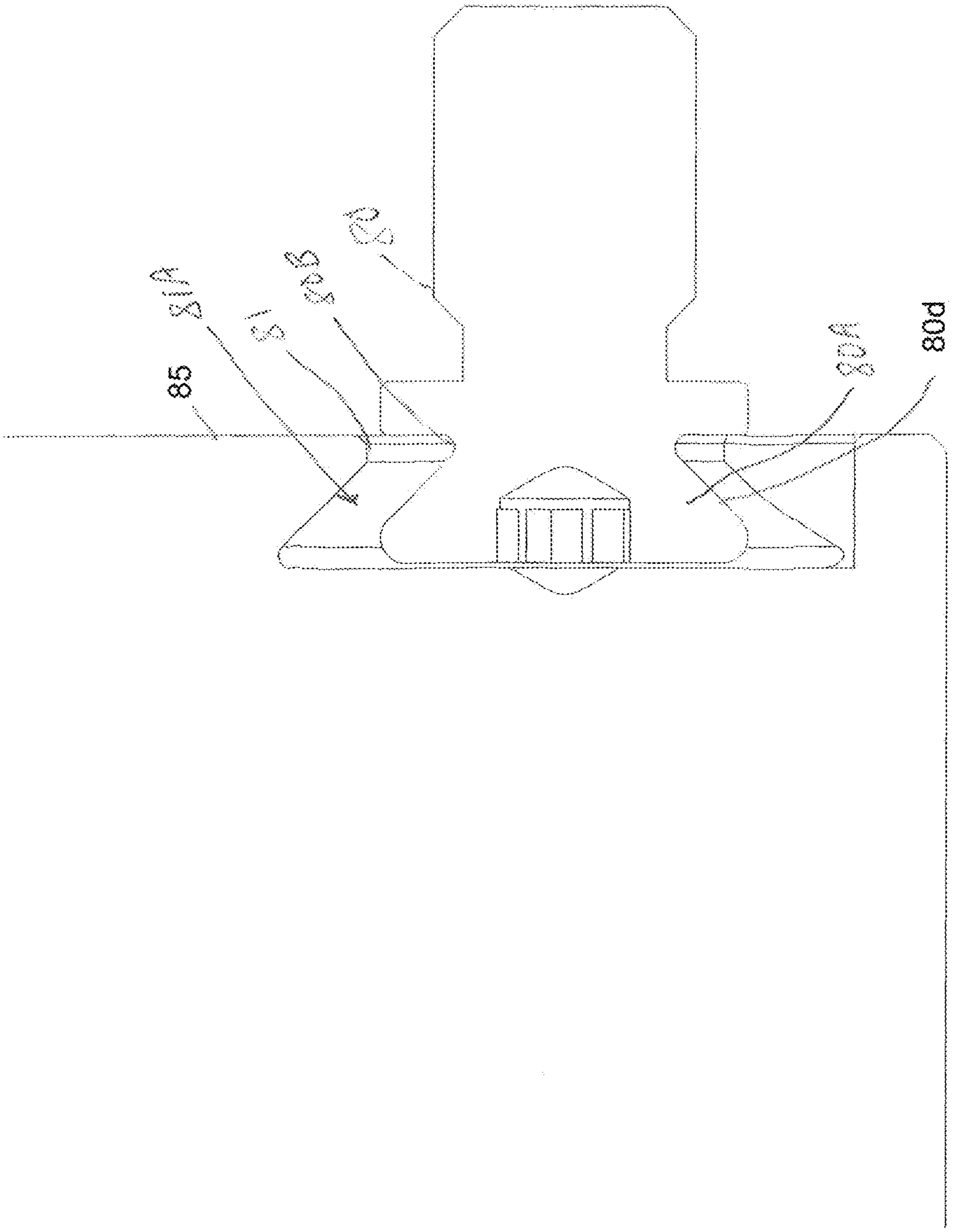
FIG. 34 is an enlarged sectional view of a pull stud in an aperture of the fixture.
Figure 35:
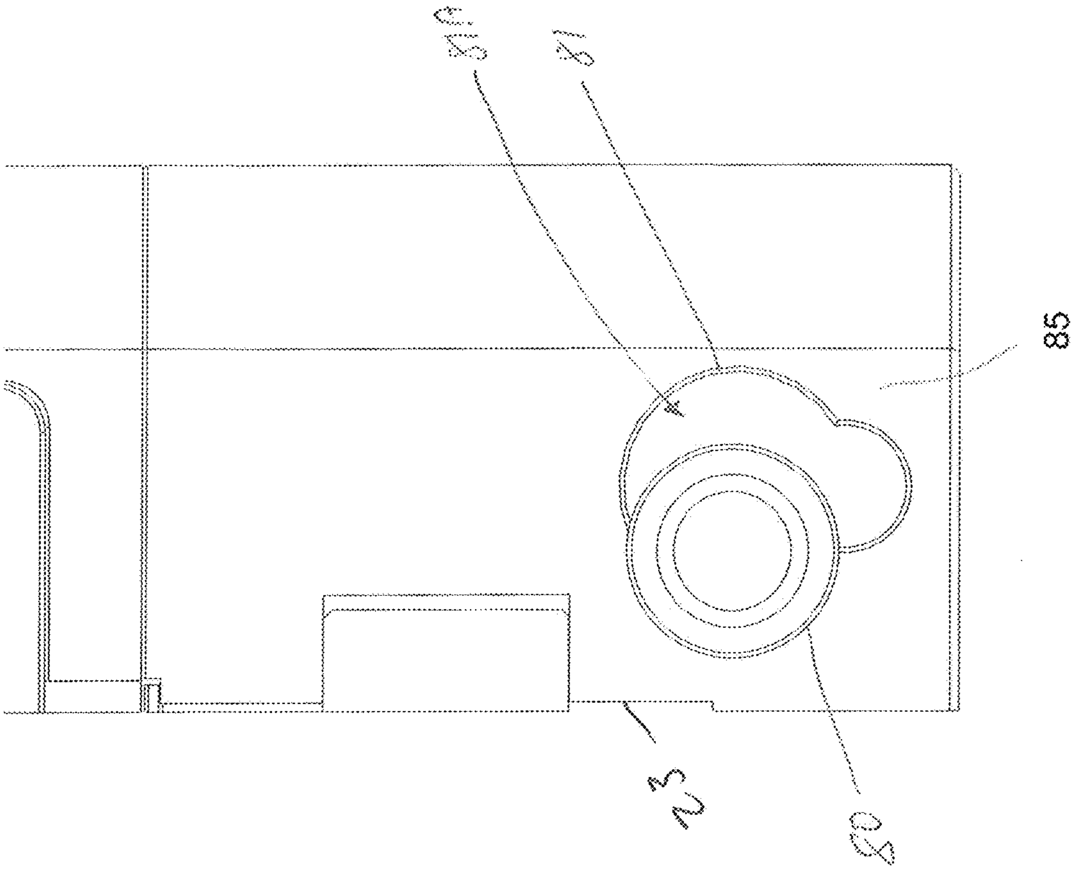
FIG. 35 is a partial side-elevational view of the pull stud in the aperture of the fixture.
Figure 36:
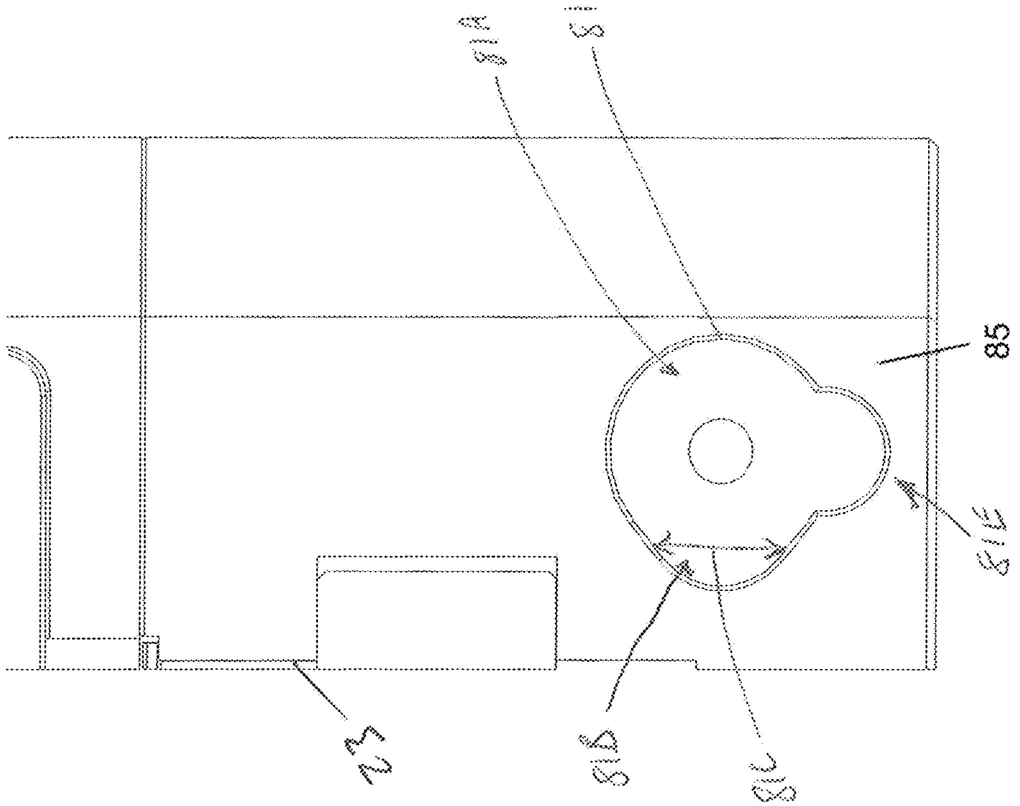
FIG. 36 is a partial side elevational view of the fixture.
Figure 37:
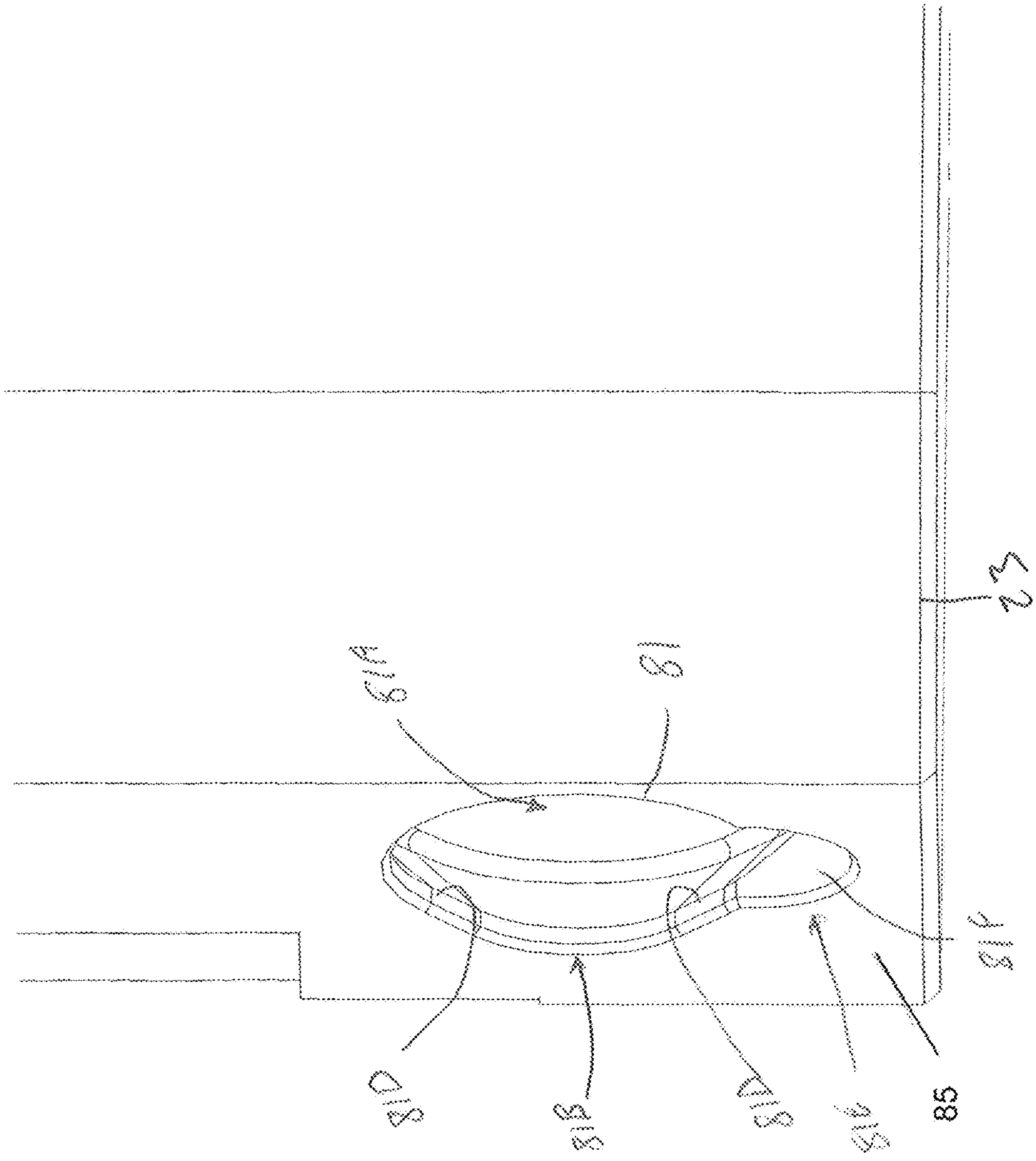
Figure 38:
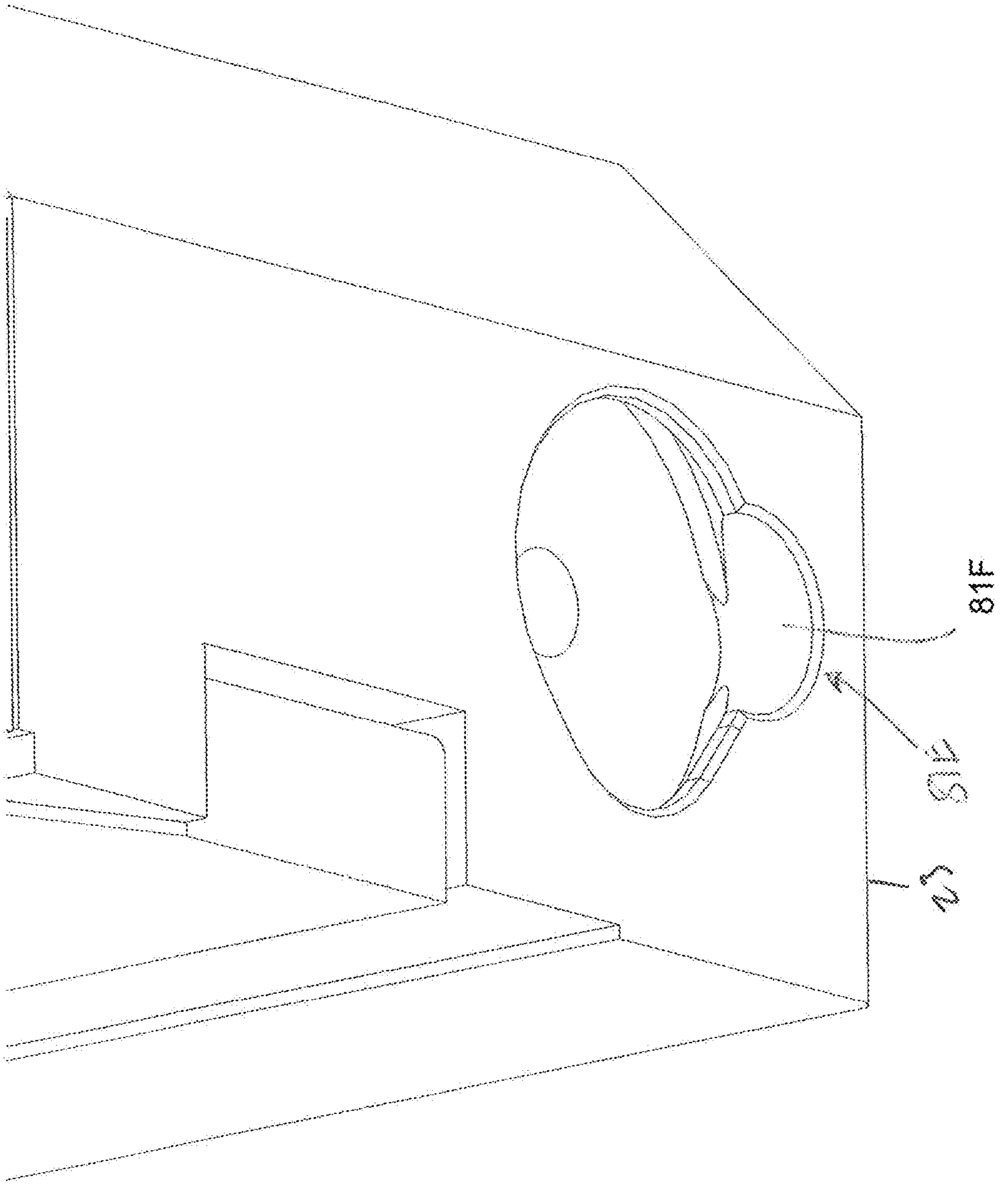
Figure 39:
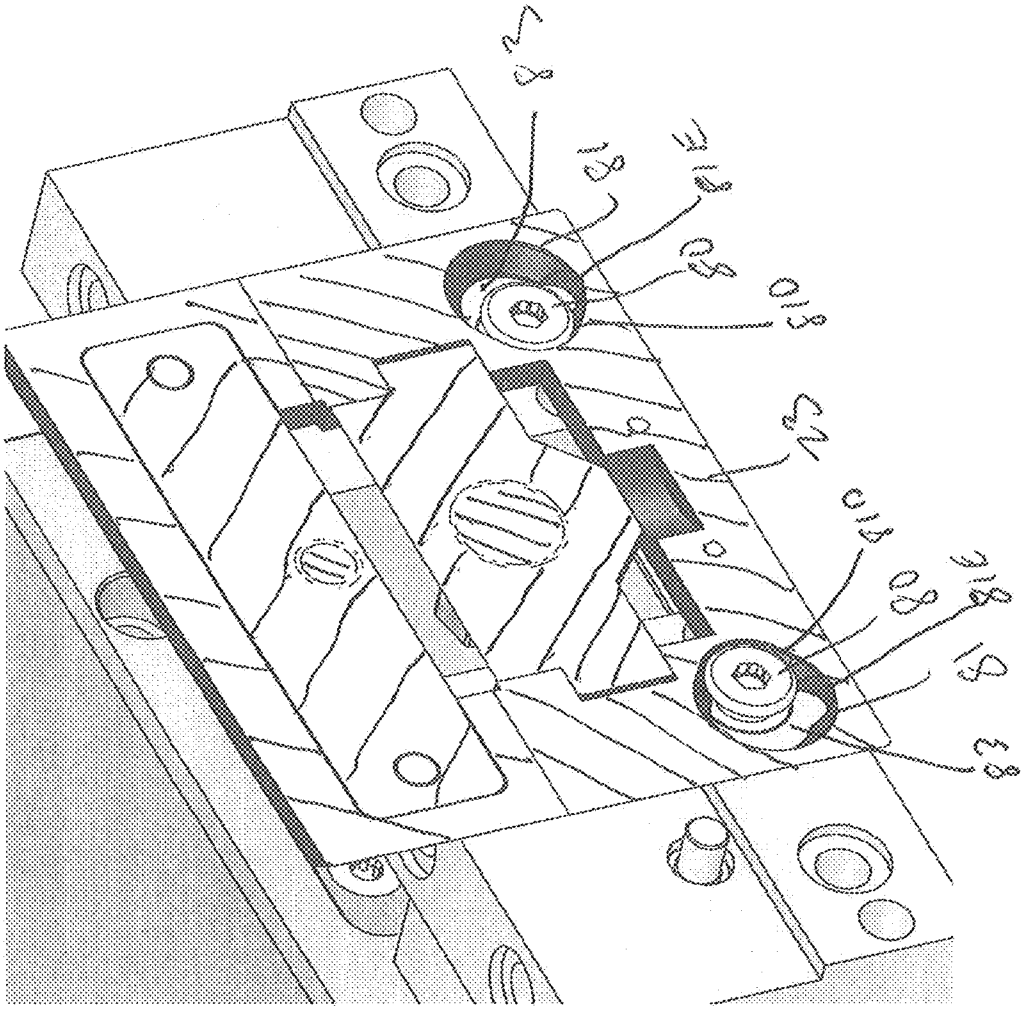
FIG. 39 is a sectional view of the fixture and pull studs.
Figure 40:
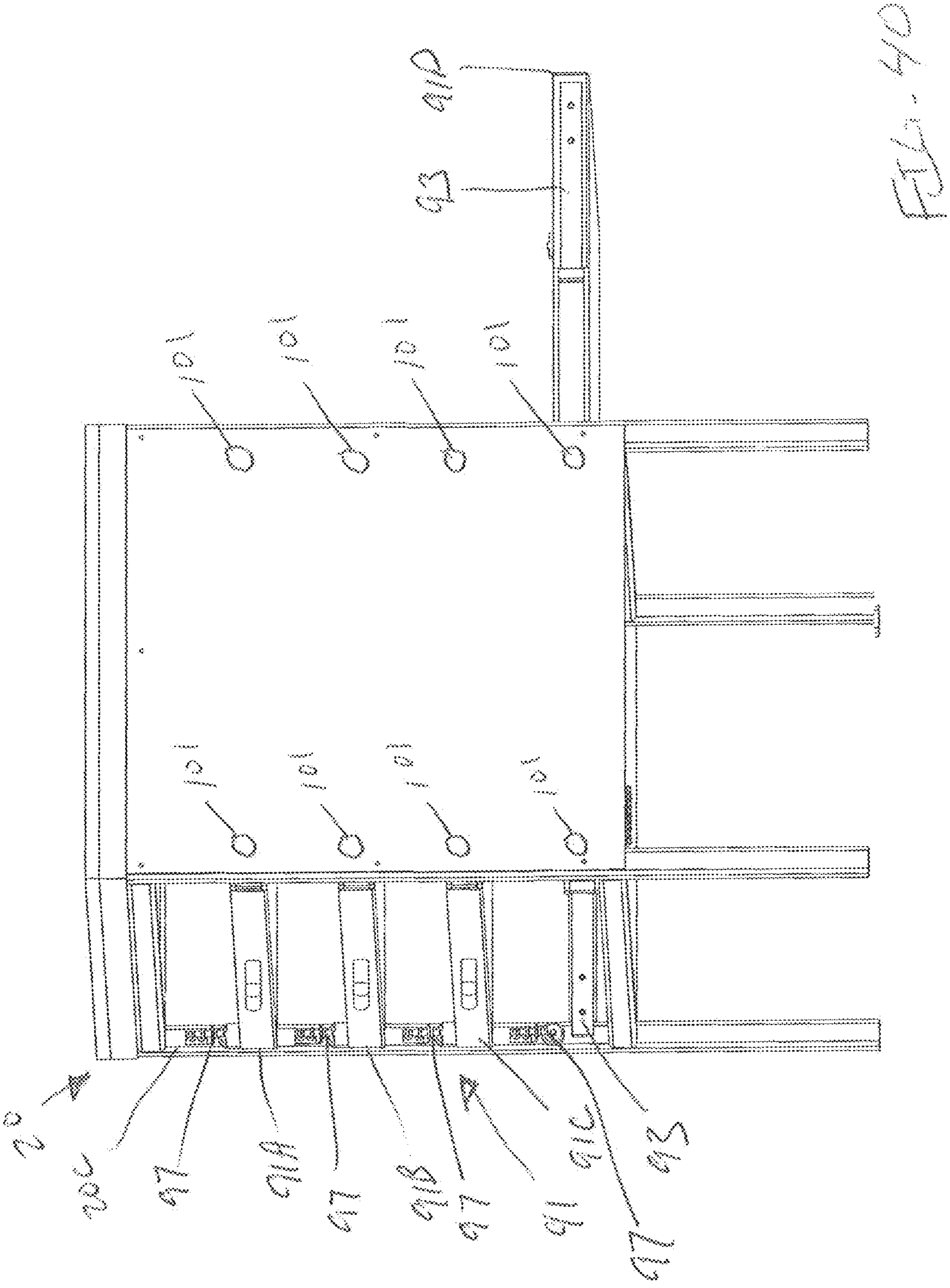
FIGS. 40 and 41 are perspective views of a work table.

FIGS. 33-39 illustrate an advantageous coupling formed between the gripping device 28 and the fixture 23 for selectively moving the fixture 23 and, if present, the workpiece 70. As indicated above, the gripping device 28 (also representing all the gripping devices herein disclosed) can be selectively equipped with jaws for moving workpieces or jaws for moving fixtures. FIG. 33 illustrates exemplary jaws 30E for coupling to the fixture 23. Generally, a pull stud and complementary receiving aperture are provided to couple the jaws 30E to the fixture 23. In the embodiment illustrated, pull studs 80 are provided on the jaws 30E while complementary apertures 81 are provided in the fixture 23. Nevertheless it should be understood this is but one configuration between the pull studs and complementary apertures. In particular, if desired, the pull studs could be mounted to the fixture 23 with the complementary apertures provided on the jaws 30E. Typically, two or more pull studs 80 and complementary apertures 81 are provided to couple the jaws 30E as a pair to the fixture 23 wherein at least one pull stud 80 or complementary aperture 81 are provided on each jaw 30E. The jaws 30E have two sets of pull studs 80 and 87. The first set of pull studs 80 are used to form the coupling with the fixture 23. Pull studs 80 extend outwardly from an end surface 33 on each jaw 30E that faces and engages an end surface 85 of the fixture 23 when, in this exemplary embodiment, the pull stud 80 from each jaw 30E extends into one of the apertures 81. The second set of pull studs 87 on jaws 30E illustrate that one or more pairs of pull studs can be provided on the jaws 30E, allowing the jaws 30E to engage the fixture 23 with different orientations, or be used on different fixtures. In other words, the pull studs 80 in FIG. 34 can be used to cause the gripping device 28 to be secured to the fixture 23 as shown in FIG. 33, while pull studs 87 shown can be inserted in the apertures 81 to obtain a different orientation between the gripping device 28 and the fixture 23.

FIGS. 34-39 illustrate enlarged views of one of the pull studs 80 and corresponding complementary aperture 81. In FIGS. 34-39 the pull stud 80 is not shown coupled to a jaw, but it should be understood that such a jaw would be present.

Each aperture 81 has a portion 81A of sufficient size such that an enlarged head 80A of the pull stud 80 can be inserted into the aperture 81 and thus the fixture 23. A second portion 81B of the aperture 81 has an opening width indicated by double arrow 81C that is smaller than the enlarged head 80A of the pull stud 80 sufficient to accommodate a stem or support 80B of reduced diameter present on the enlarged head 80A. At least some portions of the internal annular surfaces 81D of portion 81B are inclined within the fixture 23 so as to accommodate the size of the enlarged head 80A and are generally complementary to inclined surfaces 80D provided on the enlarged head 80A. The inclined surfaces 81D and 80D of the fixture 23 and the enlarged head 80A, respectively, ensure that the fixture 23 mates securely with the pull studs 80 (end surfaces 83 of the jaws 30E engage the end surfaces 85 of the fixture 23) where the interaction of the mating inclined surfaces 81D and 80D as the enlarged heads 80A are pushed into portions 81B of the apertures urges the fixture 23 against the jaws 30E.

In operation, the robot 12 positions the gripping device 28 such that the pull studs 80, 87 on the jaws 30E are proximate to and face the portion of the fixture 23 having the apertures 81. The gripping device 28 is operated such that the jaw supports 108 move until the spacing between the pull studs 80, 87 matches the spacing of the portions 81A of the apertures 81. The gripping device 28 is then displaced with the robot 12 such that the pull studs 80, 87 enter each of the portions 81A. The gripping device 28 is then operated such that the jaws 30E are displaced towards each other wherein the pull studs 80, 87 slide towards the portions 81B of reduced width such that the inclined surfaces 80D and 81D of the enlarged head 80A and the fixture 23 mate with each other urging the fixture 23 securely against the jaws 30E. Due to the securing forces generated between the enlarged heads 80A and fixture 23, the fixture 23 is restrained in all degrees of freedom on the jaws 30E. To release the jaws 30E from the fixture 23, the jaw supports 108 of the gripping device are moved towards each other such that the enlarged heads 80A are repositioned in the portions 81A of the apertures 81.

Preferably, each of the apertures 81 include portions 81E having internal surface portions 81F that are inclined in a manner opposite to surfaces 81D such that debris and/or processing or cutting fluid does not accumulate in the apertures 81 but tends to fall out.

Although illustrated wherein the portions 81B of reduced width are disposed so as to be closer to each other than the enlarged portions 81A in the embodiment illustrated, if desired, the portions 81B of reduced width can be arranged so as to be farther apart from each other than the portions 81A. Hence in such a configuration, the jaws are operated in the opposite manner to secure and release the fixture 23 from the jaws.

Figure 41:
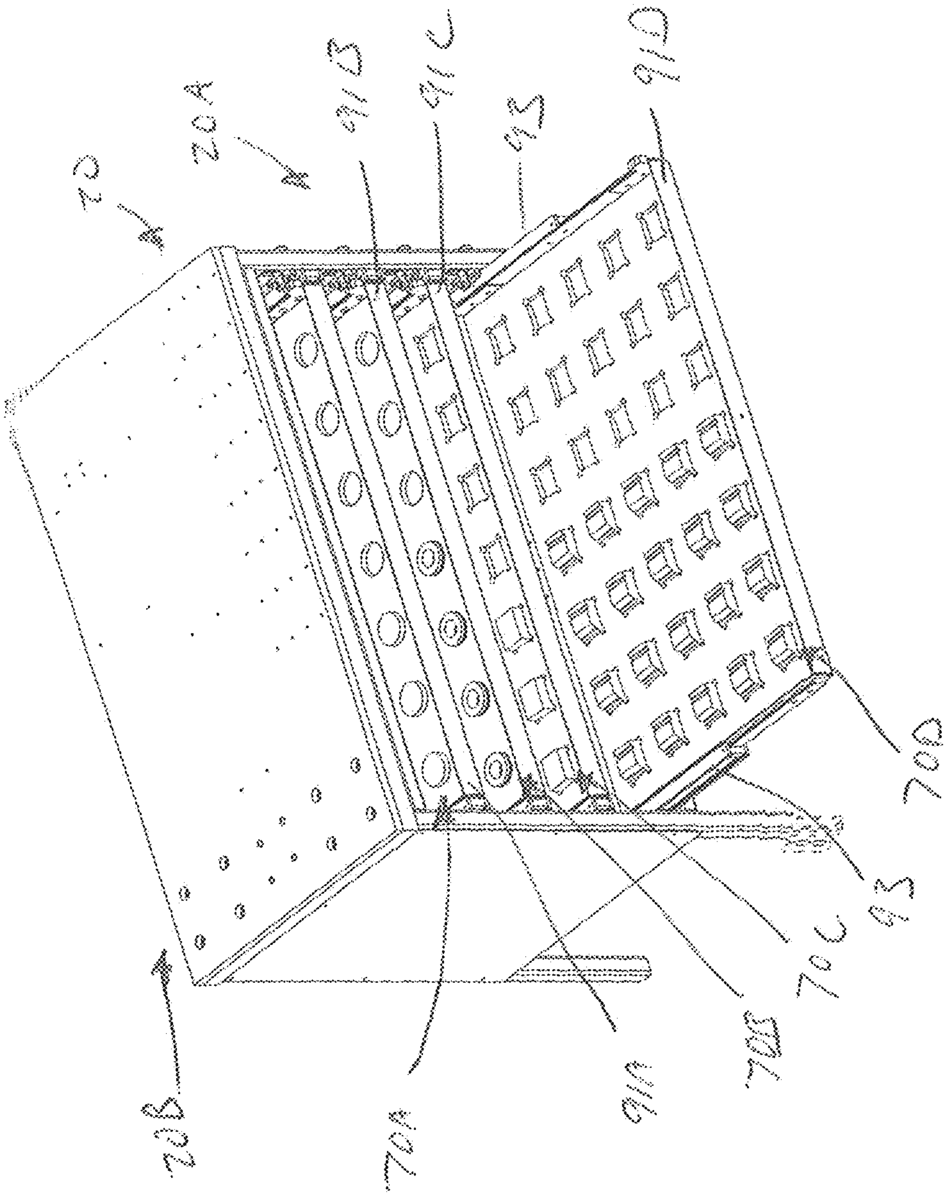

FIGS. 40-44 illustrate the work table 20 having a plurality of drawers 91. Each of the drawers 91 are slidable at least to a first positon allowing the robot 12 with a gripping device 28 attached thereto with suitable jaws to pick up an unprocessed workpiece or return to a drawer a processed workpiece. FIG. 41 illustrates a first drawer 91A having a first type of unprocessed workpieces 70A, while drawer 91B includes processed workpieces 70B of the first type. Drawer 91C illustrates a second type of unprocessed workpieces 70C, while drawer 91D illustrates processed workpieces 70D of a second type. Each of the drawers 91A-91D include a pair of drawer slides or rails 93 allowing the drawer to be moved in and out of the work table 20 at least to one side of the work table 20, but in further embodiment, the drawer slides or rails 93 allow each drawer 91A-91D to be moved to an open position on opposite sides 20A, 20B of the work table 20. This is particularly advantageous because it allows an operator to access the workpieces 70A-70D without having to enter the workspace or side of the work table 20A that the robot 12 is operating in.

Figure 42:
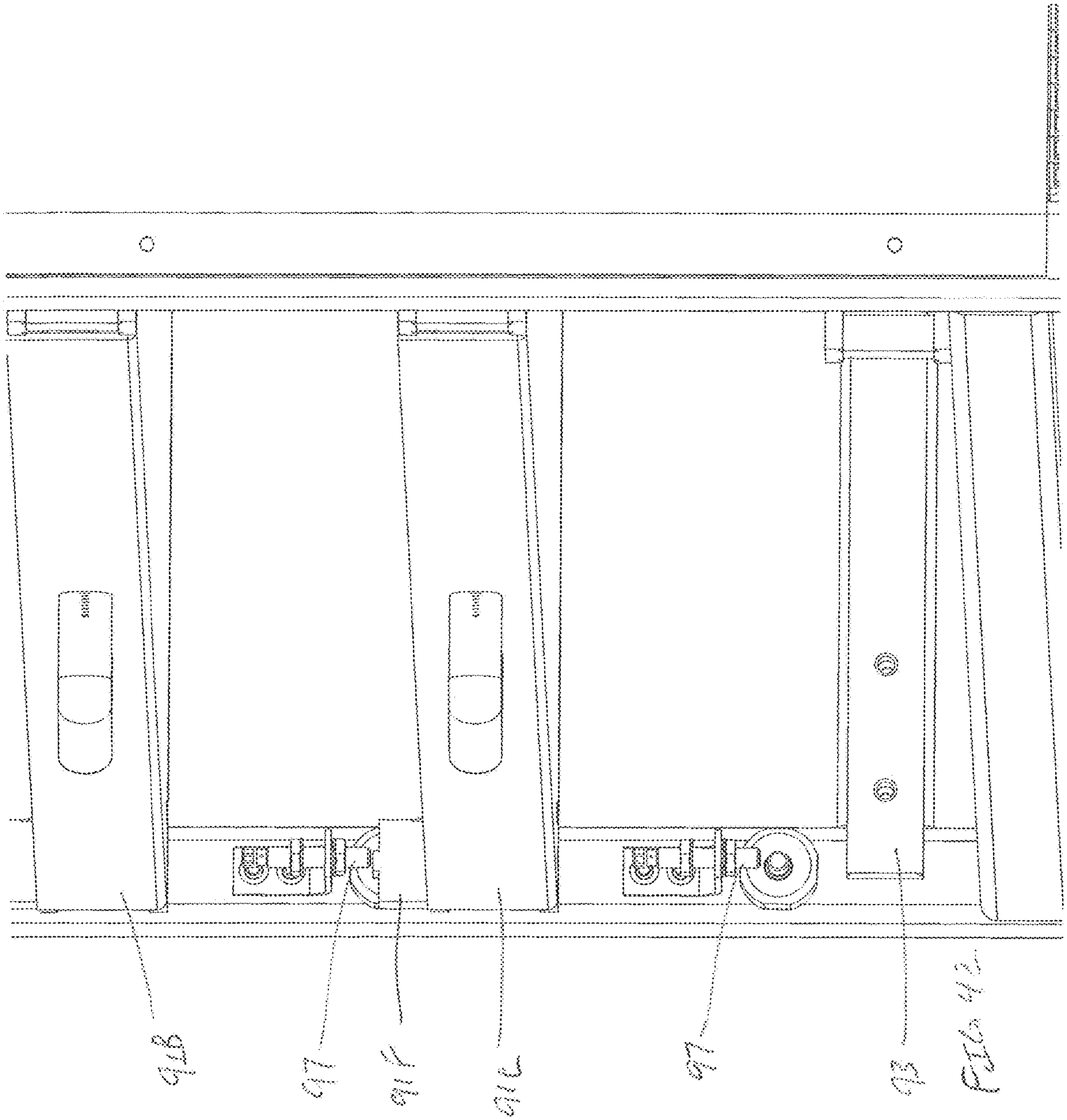
FIGS. 42-44 are enlarged perspective views of different portions of the work table.
Figure 43:
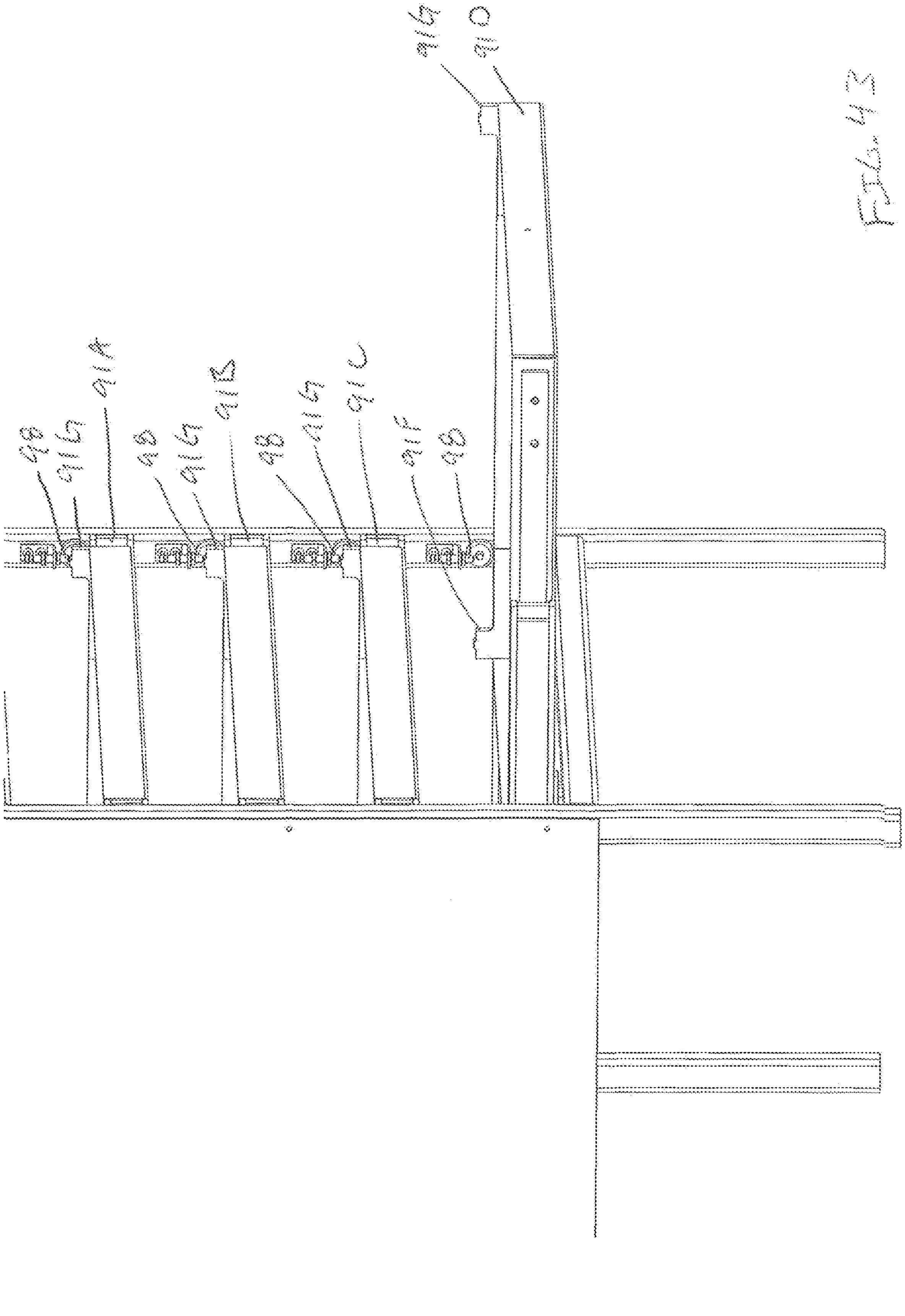
Figure 44:
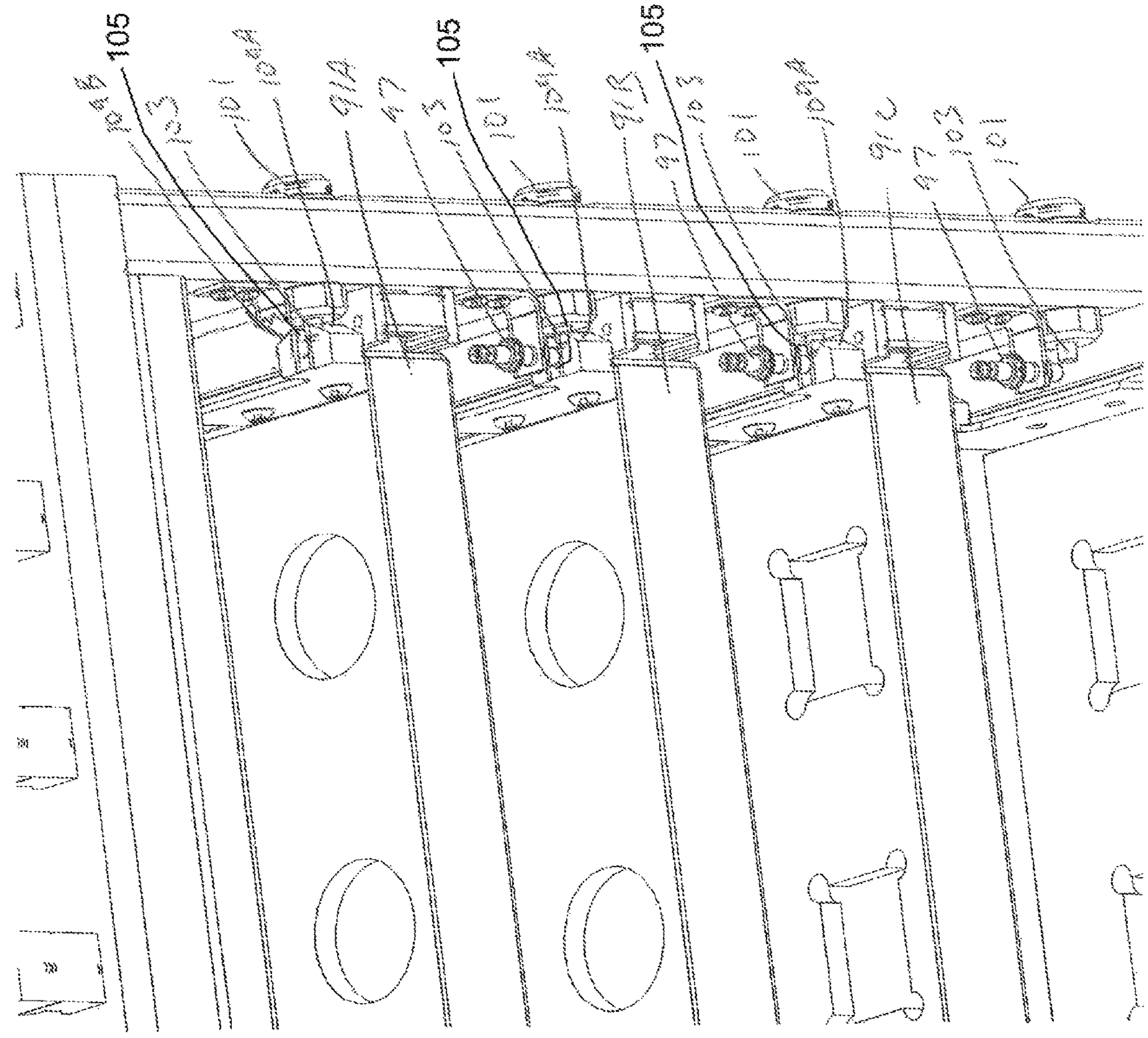

Sensors can be provided so as to provide an indication of the position of each drawer 91A-91B with respect to the work table 20 that being in a closed position or in the open positions on sides 20A and/or 20B of the work table. 20. Referring to FIG. 42, proximity sensors 97 are mounted to the frame 20C of the work table 20 and arranged so as to detect the presence or absence of each associated drawer 91A-91D. Each drawer includes at least one portion 91F that is positioned proximate the sensor 97 when the drawer is in the closed position. If the slides or rails 93 of a drawer 91A-91D allows the drawer 91A-91B to be opened to only one side 20A of the work table 20, then only one sensor 97 is needed, where the sensor 97 detects the portion 91F when the drawer 91A-91D is closed. If however, one or more of the drawers 91A-91D are configured with slides or rails 93 that allows the drawer 91A-91D to open to each side 20A and 20B of the work table 20, then a second sensor 98 is disposed on the frame 20A on side 20B, where each drawer 91A-91D is configured with a second portion 91G that the sensor 98 is arranged to detect. Thus, if one or more of the drawers 91A-91D are arranged to open to both sides 20A and 20B of the work table, sensors 97 and 98 detect the presence of portions 91F and 91G based on the open position of each drawer. For instance, when a drawer is open to side 20A, sensor 97 does not detect any of the portions 91F or 91G, while sensor 98 detects the presence of portion 91F. Likewise, when the drawer is open to side 20B, sensor 97 detects the presence of portion 97G, but the associated sensor 98 does not detect either portion 91F or 91G.

In a preferred embodiment, drawer locks 101 are provided to selectively hold each of the drawers 91A-91D in fixed closed and at least one open state. If the drawers 91A-91B are openable in two directions, drawer locks 101 are further provided to hold each drawer 91A-91B in the second open state. Each drawer lock 101 includes an actuator (electric, pneumatic or hydraulic) for moving a rod or pin 103 that selectively engages the drawers 91A-91B. Each pin 103 is movable in a manner that is orthogonal to movement each respective drawer 91A-91D. An aperture or recess 105 is provided on each drawer 91A-91B and is of size to receive the pin 103. When the pin 103 is located in the aperture 105 sliding movement of the drawer 91A-91B is inhibited. In the embodiment illustrated, the actuators are operated so as to retract the pin 103 out of the aperture 105, thereby allowing the drawer 91A-91B to move. Although the actuators could be configured to be dual acting where each actuator is selectively operated to move the pin 103 into the aperture 105, in an advantageous embodiment, each of the actuators include a spring, not shown, but could be provided internally to bias the piston of each actuator such that the pins 103 are extended. Inclined surfaces 109A,109B are provided adjacent and on opposite sides of each aperture 105 and are arranged so as to come into contact with each pin 103 when the drawer 91A-91D is moved to the closed or open position (s). The inclined surfaces 109A, 109B drive each corresponding pin 103 into the actuator against the bias of the spring so as to be retracted. When the aperture 105 aligns with the pin 103, the bias spring urges the pin 103 to the extended position. Like the sensors 97 described above, if the drawers 91A-91D open in two directions, drawer locks are provided on each side of the work table 20, where each drawer lock 101 on the side that the drawer 91A-91D opens engages the drawer 91A-91D to hold it in an open state.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A gripping assembly for a robot comprising:
- a body;
- a pair of jaw supports supported for slidable movement on the body toward and away from each, each jaw support having a pair of spaced apart apertures for receiving spaced apart securing posts of a jaw, each jaw support comprising:
  - a support body;
  - a pair of locking slides, each locking slide having a first end configured to engage a securing post of the pair of spaced apart securing posts when the securing post is disposed in a corresponding aperture of the pair of spaced apart apertures; and at least one actuator configured to drive the locking slides away from each other to engage the spaced apart securing posts; and a jaw support actuator configured to drive the jaw supports toward and away from each other.

2. The gripping assembly of claim 1 and further comprising a first set of jaws couplable to each of the jaw supports, each jaw of the first set of jaws having a first pair of spaced apart securing posts configured to be inserted in one of the pairs of spaced apart apertures, the jaws of the first set being configured to hold a first element.

3. The gripping assembly of claim 2 and further comprising a second set of jaws couplable to each of the jaw supports, each jaw of the second set of jaws having a second pair of spaced apart securing posts configured to be inserted in one of the pairs of spaced apart apertures, the jaws of the second set being configured to hold a second element that is different than the first element.

4. The gripping assembly of claim 3 and further comprising a fixture, and wherein the jaws of the second set are configured to hold the fixture with a coupling formed between each jaw of the second set of jaws and the fixture, each coupling comprising a fixture securing post mounted to one of the jaws of the second set of jaws or the fixture and an aperture provided in the other of the jaws of the second set of jaws or the fixture.

5. The gripping assembly of claim 4 and wherein each fixture securing post includes an enlarged head having inclined head surfaces and each aperture comprises internal inclined wall surfaces, and wherein the inclined head surfaces and the internal inclined wall surfaces are configured to urge the fixture and the jaws of the second set together with relative movement between the fixture securing posts and the apertures and maintain a force that keeps a surface of each jaw in contact with a surface of the fixture.

6. The gripping assembly of claim 5 wherein the jaws of the second set and the fixture are secured together by the couplings in a plurality degrees of freedom.

7. The gripping assembly of claim 6 wherein each jaw includes one of the fixture securing posts and the apertures are provided on the fixture.

8. The gripping assembly of claim 3 and further comprising a fixture, and wherein the jaws of the second set are configured to hold the fixture with a coupling formed between each jaw of the second set of jaws and the fixture, each coupling comprising a fixture securing post mounted to one of the jaws of the second set of jaws or the fixture and an aperture provided in the other of the jaws of the second set of jaws or the fixture, wherein each fixture securing post includes an enlarged head having inclined head surfaces supported on a stem narrower than the enlarged head, and each aperture comprises a first portion of size to receive the enlarged head and internal inclined wall surfaces on a second portion narrower than the enlarged head and of size to receive the stem, and wherein the inclined head surfaces and the internal inclined wall surfaces are configured to urge the fixture and the jaws together with relative movement between the fixture securing posts and the apertures.

9. The gripping assembly of claim 2 wherein each jaw support includes a proximity sensor configured to sense the jaw when coupled to the associated jaw support.

10. The gripping assembly of claim 9 wherein each jaw support includes a second proximity sensor configured to sense a workpiece when coupled to the jaw.

11. The gripping assembly of claim 10 wherein the second proximity sensor comprises a movable portion disposed within the jaw.

12. The gripping assembly of claim 1 wherein each locking slide includes a second end, the second ends being disposed closer to each other than the first ends, each jaw support further comprising:

a drive member disposed between second ends and configured to drive the locking slides such that each first end extends into one of the spaced apart apertures; and wherein the at least one actuator is coupled to the drive member to selectively engage the second ends and displace the locking slides.

13. The gripping assembly of claim 12 wherein the locking slides are configured to move toward and away from each other.

14. The gripping assembly of claim 13 wherein longitudinal axis of the locking slides for each jaw support is aligned along a common axis.

15. The gripping assembly of claim 14 wherein an axis of the drive member is orthogonal to the longitudinal axes of the locking slides.

16. The gripping assembly of claim 12 wherein the at least one actuator includes a piston and cylinder.

17. A gripping assembly and a fixture, the gripping assembly having a pair of movable jaws configured to hold the fixture with a coupling formed between each jaw and the fixture, each coupling comprising a securing post mounted to one of the jaws or the fixture and an aperture provided in the other of the jaws or the fixture, wherein each securing post includes an enlarged head having inclined head surfaces supported on a stem narrower than the enlarged head, and each aperture comprises a first portion of size to receive the enlarged head and internal inclined wall surfaces on a second portion narrower than the enlarged head and of size to receive the stem, and wherein the inclined head surfaces and the internal inclined wall surfaces are configured to urge the fixture and the jaws together with linear relative movement between the securing posts and the apertures from the enlarged head being disposed in the first portion to the stem being received in the second portion.

18. The gripping assembly and fixture of claim 17 wherein the jaws and the fixture are secured together by the couplings in a plurality degrees of freedom.

19. The gripping assembly and fixture of claim 17 wherein one of the securing posts is provided on each jaw and the apertures are provided on the fixture.

20. The gripping assembly and fixture of claim 17 wherein one of the apertures is provided on each jaw and the securing posts are provided on the fixture.

* * * * *